US012401796B2

(12) United States Patent
Chen et al.

(10) Patent No.: US 12,401,796 B2
(45) Date of Patent: Aug. 26, 2025

(54) DECODER-SIDE MOTION VECTOR REFINEMENT AND BI-DIRECTIONAL OPTICAL FLOW IN SUBBLOCK-BASED TEMPORAL MOTION VECTOR PREDICTION (SBTMVP)

(71) Applicant: Tencent America LLC, Palo Alto, CA (US)

(72) Inventors: Lien-Fei Chen, Hsinchu (TW); Guichun Li, San Jose, CA (US); Xin Zhao, San Jose, CA (US); Shan Liu, San Jose, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 141 days.

(21) Appl. No.: 17/984,948

(22) Filed: Nov. 10, 2022

(65) Prior Publication Data
US 2024/0031578 A1    Jan. 25, 2024

Related U.S. Application Data

(60) Provisional application No. 63/389,657, filed on Jul. 15, 2022.

(51) Int. Cl.
*H04N 19/137* (2014.01)
*H04N 19/132* (2014.01)
(Continued)

(52) U.S. Cl.
CPC ......... *H04N 19/137* (2014.11); *H04N 19/132* (2014.11); *H04N 19/159* (2014.11); *H04N 19/176* (2014.11)

(58) Field of Classification Search
CPC .. H04N 19/137; H04N 19/132; H04N 19/159; H04N 19/176; H04N 19/52; H04N 19/577
See application file for complete search history.

(56) References Cited

U.S. PATENT DOCUMENTS 11,838,539 B2 * 12/2023 Liu ............... H04N 19/537
11,936,848 B2 *  3/2024 Chen ............. H04N 19/137
(Continued)

FOREIGN PATENT DOCUMENTS

JP    7080434 B2    6/2022

OTHER PUBLICATIONS

Chen); Algorithm description for Versatile Video Coding and Test Model 10 (VTM 10), JVET-S2002-v1, Jun.-Jul. 2020 (Year: 2020).*
(Continued)

*Primary Examiner* — Dramos Kalapodas
(74) *Attorney, Agent, or Firm* — ArentFox Schiff LLP

(57) ABSTRACT

Aspects of the disclosure provide a method and an apparatus including processing circuitry that obtaining prediction information indicating whether a current block is coded in a subblock-based temporal motion vector prediction (SbTMVP) mode. If the current block is coded in the SbTMVP mode, whether a subblock in a plurality of subblocks of the current block is bi-predicted is determined. If the subblock is bi-predicted, motion information of the subblock is determined based on the SbTMVP mode. At least one of (i) a bilateral matching (BM)-based motion vector (MV) refinement and (ii) a bi-directional optical flow (BDOF) mode is applied to the subblock to refine the motion information of the subblock. The current block is reconstructed based on refined motion information corresponding to one or more subblocks in the plurality of subblocks. The refined motion information corresponding to the one or more subblocks includes the refined motion information of the subblock.

20 Claims, 26 Drawing Sheets

(51) Int. Cl.
*H04N 19/159* (2014.01)
*H04N 19/176* (2014.01)

(56) References Cited

U.S. PATENT DOCUMENTS

| | | | | |
|---|---|---|---|---|
| 2019/0313091 | A1* | 10/2019 | Xu | H04N 19/105 |
| 2020/0228815 | A1* | 7/2020 | Xu | H04N 19/52 |
| 2022/0038728 | A1 | 2/2022 | Li et al. | |
| 2022/0159277 | A1* | 5/2022 | Urban | H04N 19/132 |
| 2022/0201315 | A1* | 6/2022 | Zhang | H04N 19/139 |
| 2022/0417522 | A1* | 12/2022 | Huang | H04N 19/513 |

OTHER PUBLICATIONS

International Search Report and Written Opinion issued in International Application No. PCT/US2022/079766 mailed Feb. 8, 2023, 13 pages.
High Efficiency Video Coding, Rec. ITU-T H.265 v4 Dec. 2016.
ITU-T and ISO/IEC, "Versatile Video Coding", ITU-T Rec. H.266 and ISO/IEC 23090-3, 2020.
A. Browne, Y. Ye, and S. H. Kim, "Algorithm description for Versatile Video Coding and Test Model 17 (VTM17)", ISO/IEC JTC1/SC29/WG5 JVET-Z2002, Apr. 2022.
M. Coban, et al., "Algorithm description of Enhanced Compression Model 5 (ECM5)", ISO/IEC JTC1/SC29/WG5 IVET-Z2025, Apr. 2022.
L. Zhao, K. Zhang, and L. Zhang, "Non-EE2: Enhanced temporal motion information derivation," ISO/IEC JTC1/SC29/WG5 JVET-AA0141, Jul. 2022.

* cited by examiner

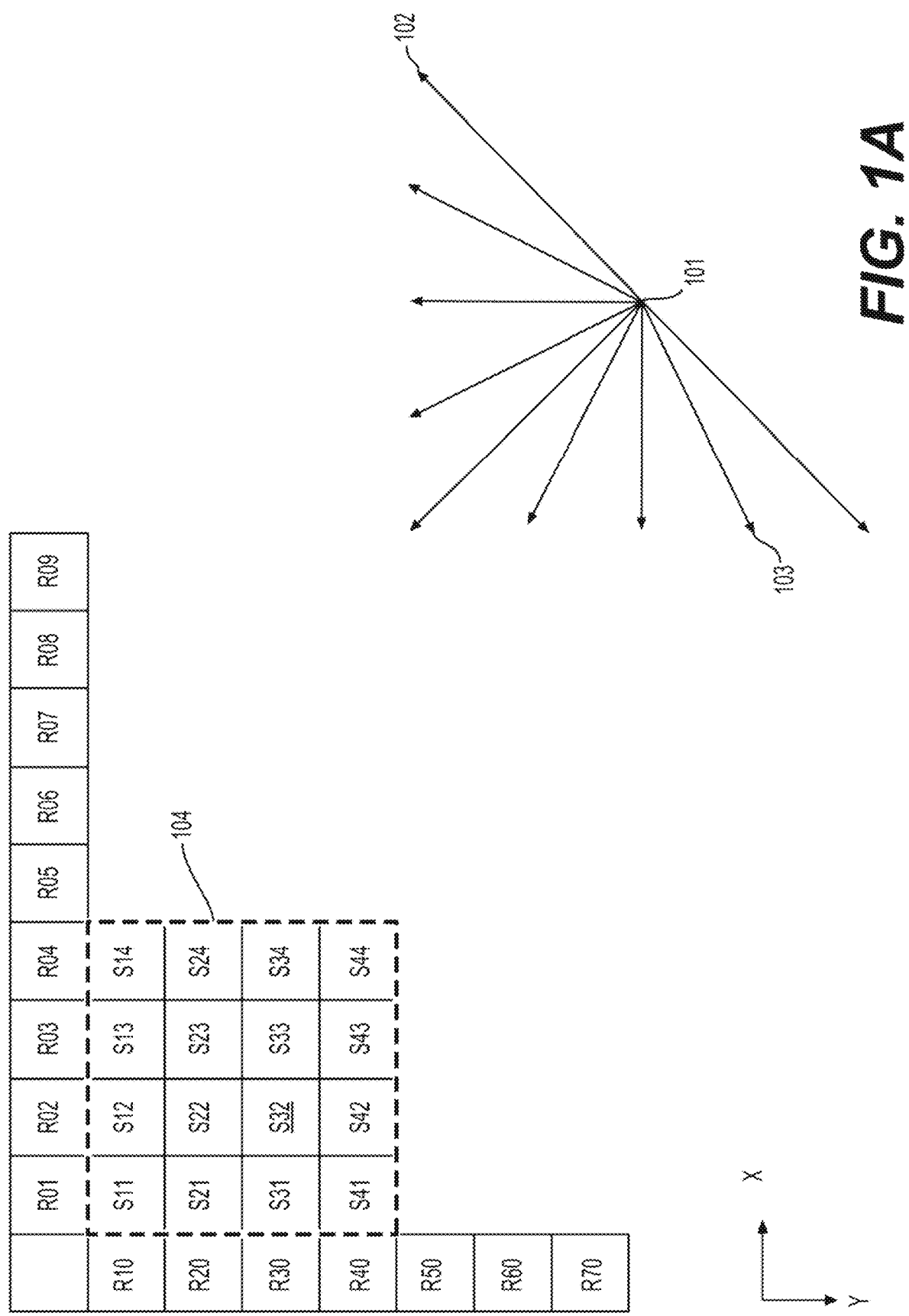

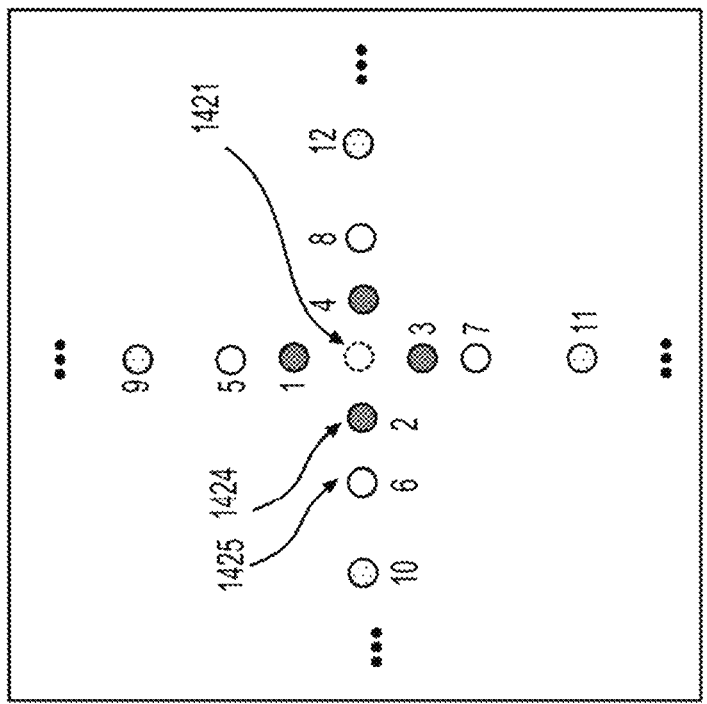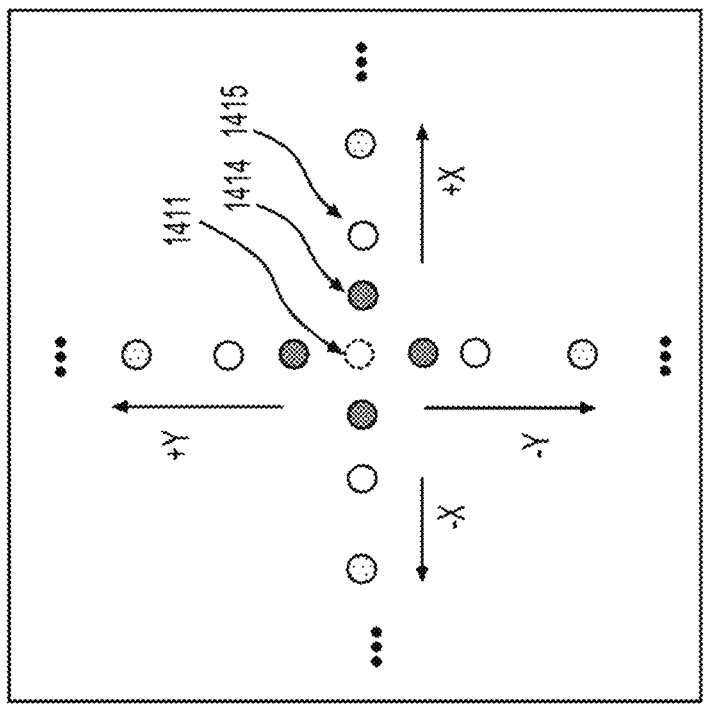
FIG. 14

DECODER-SIDE MOTION VECTOR REFINEMENT AND BI-DIRECTIONAL OPTICAL FLOW IN SUBBLOCK-BASED TEMPORAL MOTION VECTOR PREDICTION (SBTMVP)

INCORPORATION BY REFERENCE

The present application claims the benefit of priority to U.S. Provisional Application No. 63/389,657, "DECODER SIDE MOTION VECTOR REFINEMENT AND BI-DIRECTIONAL OPTICAL FLOW IN SBTMVP" filed on Jul. 15, 2022, which is incorporated by reference herein in its entirety.

TECHNICAL FIELD

The present disclosure describes embodiments generally related to video coding.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

Uncompressed digital images and/or video can include a series of pictures, each picture having a spatial dimension of, for example, 1920×1080 luminance samples and associated chrominance samples. The series of pictures can have a fixed or variable picture rate (informally also known as frame rate), of, for example 60 pictures per second or 60 Hz. Uncompressed image and/or video has specific bitrate requirements. For example, 1080p60 4:2:0 video at 8 bit per sample (1920×1080 luminance sample resolution at 60 Hz frame rate) requires close to 1.5 Gbit/s bandwidth. An hour of such video requires more than 600 GBytes of storage space.

One purpose of image and/or video coding and decoding can be the reduction of redundancy in the input image and/or video signal, through compression. Compression can help reduce the aforementioned bandwidth and/or storage space requirements, in some cases by two orders of magnitude or more. Although the descriptions herein use video encoding/decoding as illustrative examples, the same techniques can be applied to image encoding/decoding in similar fashion without departing from the spirit of the present disclosure. Both lossless compression and lossy compression, as well as a combination thereof can be employed. Lossless compression refers to techniques where an exact copy of the original signal can be reconstructed from the compressed original signal. When using lossy compression, the reconstructed signal may not be identical to the original signal, but the distortion between original and reconstructed signals is small enough to make the reconstructed signal useful for the intended application. In the case of video, lossy compression is widely employed. The amount of distortion tolerated depends on the application; for example, users of certain consumer streaming applications may tolerate higher distortion than users of television distribution applications. The compression ratio achievable can reflect that: higher allowable/tolerable distortion can yield higher compression ratios.

A video encoder and decoder can utilize techniques from several broad categories, including, for example, motion compensation, transform processing, quantization, and entropy coding.

Video codec technologies can include techniques known as intra coding. In intra coding, sample values are represented without reference to samples or other data from previously reconstructed reference pictures. In some video codecs, the picture is spatially subdivided into blocks of samples. When all blocks of samples are coded in intra mode, that picture can be an intra picture. Intra pictures and their derivations such as independent decoder refresh pictures, can be used to reset the decoder state and can, therefore, be used as the first picture in a coded video bitstream and a video session, or as a still image. The samples of an intra block can be exposed to a transform, and the transform coefficients can be quantized before entropy coding. Intra prediction can be a technique that minimizes sample values in the pre-transform domain. In some cases, the smaller the DC value after a transform is, and the smaller the AC coefficients are, the fewer the bits that are required at a given quantization step size to represent the block after entropy coding.

Traditional intra coding used in, for example, MPEG-2 generation coding technologies, does not use intra prediction. However, some newer video compression technologies include techniques that attempt to perform prediction based on, for example, surrounding sample data and/or metadata obtained during the encoding and/or decoding of blocks of data. Such techniques are henceforth called "intra prediction" techniques. Note that in at least some cases, intra prediction is using reference data only from the current picture under reconstruction and not from reference pictures.

There can be many different forms of intra prediction. When more than one of such techniques can be used in a given video coding technology, a specific technique in use can be coded as a specific intra prediction mode that uses the specific technique. In certain cases, intra prediction modes can have submodes and/or parameters, where the submodes and/or parameters can be coded individually or included in a mode codeword, which defines the prediction mode being used. Which codeword to use for a given mode, submode, and/or parameter combination can have an impact in the coding efficiency gain through intra prediction, and so can the entropy coding technology used to translate the codewords into a bitstream.

A certain mode of intra prediction was introduced with H.264, refined in H.265, and further refined in newer coding technologies such as joint exploration model (JEM), versatile video coding (VVC), and benchmark set (BMS). A predictor block can be formed using neighboring sample values of already available samples. Sample values of neighboring samples are copied into the predictor block according to a direction. A reference to the direction in use can be coded in the bitstream or may itself be predicted.

Referring to FIG. 1A, depicted in the lower right is a subset of nine predictor directions known from the 33 possible predictor directions (corresponding to the 33 angular modes of the 35 intra modes) defined in H.265. The point where the arrows converge (101) represents the sample being predicted. The arrows represent the direction from which the sample is being predicted. For example, arrow (102) indicates that sample (101) is predicted from a sample or samples to the upper right, at a 45 degree angle from the horizontal. Similarly, arrow (103) indicates that sample (101) is predicted from a sample or samples to the lower left of sample (101), in a 22.5 degree angle from the horizontal.

Still referring to FIG. 1A, on the top left there is depicted a square block (104) of 4×4 samples (indicated by a dashed, boldface line). The square block (104) includes 16 samples, each labelled with an "S", its position in the Y dimension (e.g., row index) and its position in the X dimension (e.g., column index). For example, sample S21 is the second sample in the Y dimension (from the top) and the first (from the left) sample in the X dimension. Similarly, sample S44 is the fourth sample in block (104) in both the Y and X dimensions. As the block is 4×4 samples in size, S44 is at the bottom right. Further shown are reference samples that follow a similar numbering scheme. A reference sample is labelled with an R, its Y position (e.g., row index) and X position (column index) relative to block (104). In both H.264 and H.265, prediction samples neighbor the block under reconstruction; therefore, no negative values need to be used.

Intra picture prediction can work by copying reference sample values from the neighboring samples indicated by the signaled prediction direction. For example, assume the coded video bitstream includes signaling that, for this block, indicates a prediction direction consistent with arrow (102)—that is, samples are predicted from samples to the upper right, at a 45 degree angle from the horizontal. In that case, samples S41, S32, S23, and S14 are predicted from the same reference sample R05. Sample S44 is then predicted from reference sample R08.

In certain cases, the values of multiple reference samples may be combined, for example through interpolation, in order to calculate a reference sample; especially when the directions are not evenly divisible by 45 degrees.

The number of possible directions has increased as video coding technology has developed. In H.264 (year 2003), nine different direction could be represented. That increased to 33 in H.265 (year 2013). Currently, JEM/VVC/BMS can support up to 65 directions. Experiments have been conducted to identify the most likely directions, and certain techniques in the entropy coding are used to represent those likely directions in a small number of bits, accepting a certain penalty for less likely directions. Further, the directions themselves can sometimes be predicted from neighboring directions used in neighboring, already decoded, blocks.

FIG. 1B shows a schematic (110) that depicts 65 intra prediction directions according to JEM to illustrate the increasing number of prediction directions over time.

The mapping of intra prediction direction bits that represent the direction in the coded video bitstream can be different from video coding technology to video coding technology. Such mapping can range, for example, from simple direct mappings, to codewords, to complex adaptive schemes involving most probable modes, and similar techniques. In most cases, however, there can be certain directions that are statistically less likely to occur in video content than certain other directions. As the goal of video compression is the reduction of redundancy, those less likely directions will, in a well working video coding technology, be represented by a larger number of bits than more likely directions.

Image and/or video coding and decoding can be performed using inter-picture prediction with motion compensation. Motion compensation can be a lossy compression technique and can relate to techniques where a block of sample data from a previously reconstructed picture or part thereof (reference picture), after being spatially shifted in a direction indicated by a motion vector (MV henceforth), is used for the prediction of a newly reconstructed picture or picture part. In some cases, the reference picture can be the same as the picture currently under reconstruction. MVs can have two dimensions X and Y, or three dimensions, the third being an indication of the reference picture in use (the latter, indirectly, can be a time dimension).

In some video compression techniques, an MV applicable to a certain area of sample data can be predicted from other MVs, for example from those related to another area of sample data spatially adjacent to the area under reconstruction, and preceding that MV in decoding order. Doing so can substantially reduce the amount of data required for coding the MV, thereby removing redundancy and increasing compression. MV prediction can work effectively, for example, because when coding an input video signal derived from a camera (known as natural video) there is a statistical likelihood that areas larger than the area to which a single MV is applicable move in a similar direction and, therefore, can in some cases be predicted using a similar motion vector derived from MVs of neighboring area. That results in the MV found for a given area to be similar or the same as the MV predicted from the surrounding MVs, and that in turn can be represented, after entropy coding, in a smaller number of bits than what would be used if coding the MV directly. In some cases, MV prediction can be an example of lossless compression of a signal (namely: the MVs) derived from the original signal (namely: the sample stream). In other cases, MV prediction itself can be lossy, for example because of rounding errors when calculating a predictor from several surrounding MVs.

Various MV prediction mechanisms are described in H.265/HEVC (ITU-T Rec. H.265, "High Efficiency Video Coding", December 2016). Out of the many MV prediction mechanisms that H.265 offers, described with reference to FIG. 2 is a technique henceforth referred to as "spatial merge".

Referring to FIG. 2, a current block (201) comprises samples that have been found by the encoder during the motion search process to be predictable from a previous block of the same size that has been spatially shifted. Instead of coding that MV directly, the MV can be derived from metadata associated with one or more reference pictures, for example from the most recent (in decoding order) reference picture, using the MV associated with either one of five surrounding samples, denoted A0, A1, and B0, B1, B2 (202 through 206, respectively). In H.265, the MV prediction can use predictors from the same reference picture that the neighboring block is using.

SUMMARY

Aspects of the disclosure provide methods and apparatuses for video encoding/decoding. In some examples, an apparatus for video/image decoding includes processing circuitry that decodes prediction information of a current block in a current picture from a coded bitstream. The current block includes a plurality of subblocks to be reconstructed based on a subblock-based temporal motion vector prediction (SbTMVP) mode. The processing circuitry can determine motion information of a subblock in the plurality of subblocks based on the SbTMVP mode. The subblock is bi-predicted. The processing circuitry can apply at least one of (i) a bilateral matching (BM)-based motion vector (MV) refinement or (ii) a bi-directional optical flow (BDOF) mode to the subblock to update the motion information of the subblock and reconstruct the subblock based on the updated motion information.

The processing circuitry can apply the BM-based MV refinement to determine the refined motion information of the subblock. The BM-based MV refinement includes a decoder-side motion vector refinement (DMVR) or a multi-pass decoder-side motion vector refinement (MP-DMVR). The processing circuitry can reconstruct the subblock based on the refined motion information.

In an embodiment, the motion information includes an initial MV pair of the subblock, and the BM-based MV refinement includes the DMVR. The processing circuitry can apply the DMVR to an area in the subblock to determine a refined MV pair of the area based on the initial MV pair. The area can be less than or equal to an area of the subblock. The processing circuitry can reconstruct the area in the subblock based on the refined MV pair.

In an embodiment, the motion information includes an initial MV pair of the subblock, and the BM-based MV refinement includes the MP-DMVR. If a subblock size of the subblock is larger than a first threshold, the processing circuitry can apply at least one DMVR to the subblock to determine a first refined MV pair of the subblock and apply the BDOF mode to an area in the subblock to determine a second refined MV pair of the area based on the first refined MV pair. The area can be smaller than or equal to an area of the first subblock.

In an example, the motion information includes an initial MV pair of the subblock. The processing circuitry can apply the BDOF mode to each sample in the subblock to determine a refined MV pair of the respective sample. The BDOF mode can include a sample-based BDOF mode. The processing circuitry reconstructs each sample in the subblock based on the refined MV pair of the respective sample.

In an example, the refined motion information of the subblock includes one or more first refined MV pairs of respective one or more areas in the subblock. After applying the BM-based MV refinement, the processing circuitry applies the BDOF mode including a sample-based BDOF mode. A refined MV pair of each sample in an area in the one or more areas can be determined based on the BDOF mode and the first refined MV pair corresponding to the area. The processing circuitry reconstructs each sample in the area based on the refined MV pair of the respective sample.

In an example, the prediction information indicates that the at least one of (i) the BM-based MV refinement or (ii) the BDOF mode is applied to the subblock.

In an example, the prediction information includes a flag that indicates the at least one of (i) the BM-based MV refinement or (ii) the BDOF mode is applied to the subblock.

In an example, the BM-based MV refinement or the BDOF mode is applied based on a first reference picture and a second reference picture of the current picture. The first reference picture is prior to the current picture in a display order, and the second reference picture is after the current picture in the display order. Distances from the first reference picture and the second reference picture to the current picture are identical.

In an embodiment, the current block includes the plurality of subblocks to be reconstructed based on the SbTMVP mode. The processing circuitry determines motion information of each of one or more subblocks in the plurality of subblocks based on the SbTMVP mode. The one or more subblocks can be bi-predicted. The processing circuitry can apply the BM-based MV refinement to the current block based on an initial MV pair of the current block to determine updated motion information of the current block. The initial MV pair can be the motion information of one of the one or more subblocks. The processing circuitry can reconstruct the current block based on the updated motion information of the current block.

In an example, the one or more subblocks include multiple bi-predicted subblocks. The processing circuitry can determine the initial MV pair of the current block by (i) applying the BM-based MV refinement to the current block based on the motion information of each of the multiple bi-predicted subblocks to determine a bilateral matching cost associated with the respective bi-predicted subblock and (ii) determining the initial MV pair of the current block as the motion information of the subblock with the smallest bilateral matching cost in the bilateral matching costs of the respective multiple bi-predicted subblocks.

In an example, the processing circuitry determines the initial MV pair of the current block as the motion information of the one of the multiple bi-predicted subblocks based on syntax information in the coded bitstream.

In an example, the prediction information indicates that the BM-based MV refinement is applied to the current block based on the initial MV pair that is the motion information of the one of the one or more subblocks.

In an embodiment, the processing circuitry receives a coded bitstream comprising a current block in a current picture, wherein the current block includes a plurality of subblocks. The processing circuitry obtains prediction information indicating whether the current block is coded in a subblock-based temporal motion vector prediction (SbTMVP) mode. If the current block is coded in the SbTMVP mode, the processing circuitry determines whether a subblock in the plurality of subblocks of the current block is bi-predicted. If the subblock is bi-predicted, the processing circuitry determines motion information of the subblock based on the SbTMVP mode. The processing circuitry applies at least one of (i) a bilateral matching (BM)-based motion vector (MV) refinement and (ii) a bi-directional optical flow (BDOF) mode to the subblock to refine the motion information of the subblock. The processing circuitry reconstructs the current block based on refined motion information corresponding to one or more subblocks in the plurality of subblocks in the current block. The refined motion information corresponding to the one or more subblocks includes the refined motion information of the subblock.

Aspects of the disclosure also provide a non-transitory computer-readable medium storing instructions which when executed by a computer for video decoding cause the computer to perform the methods for video decoding.

BRIEF DESCRIPTION OF THE DRAWINGS

Further features, the nature, and various advantages of the disclosed subject matter will be more apparent from the following detailed description and the accompanying drawings in which:

FIG. 1A is a schematic illustration of an exemplary subset of intra prediction modes.

FIGS. 13-14 show an example of a search process in a merge motion vector difference (MMVD) mode.

DETAILED DESCRIPTION OF EMBODIMENTS

Figure 1B:
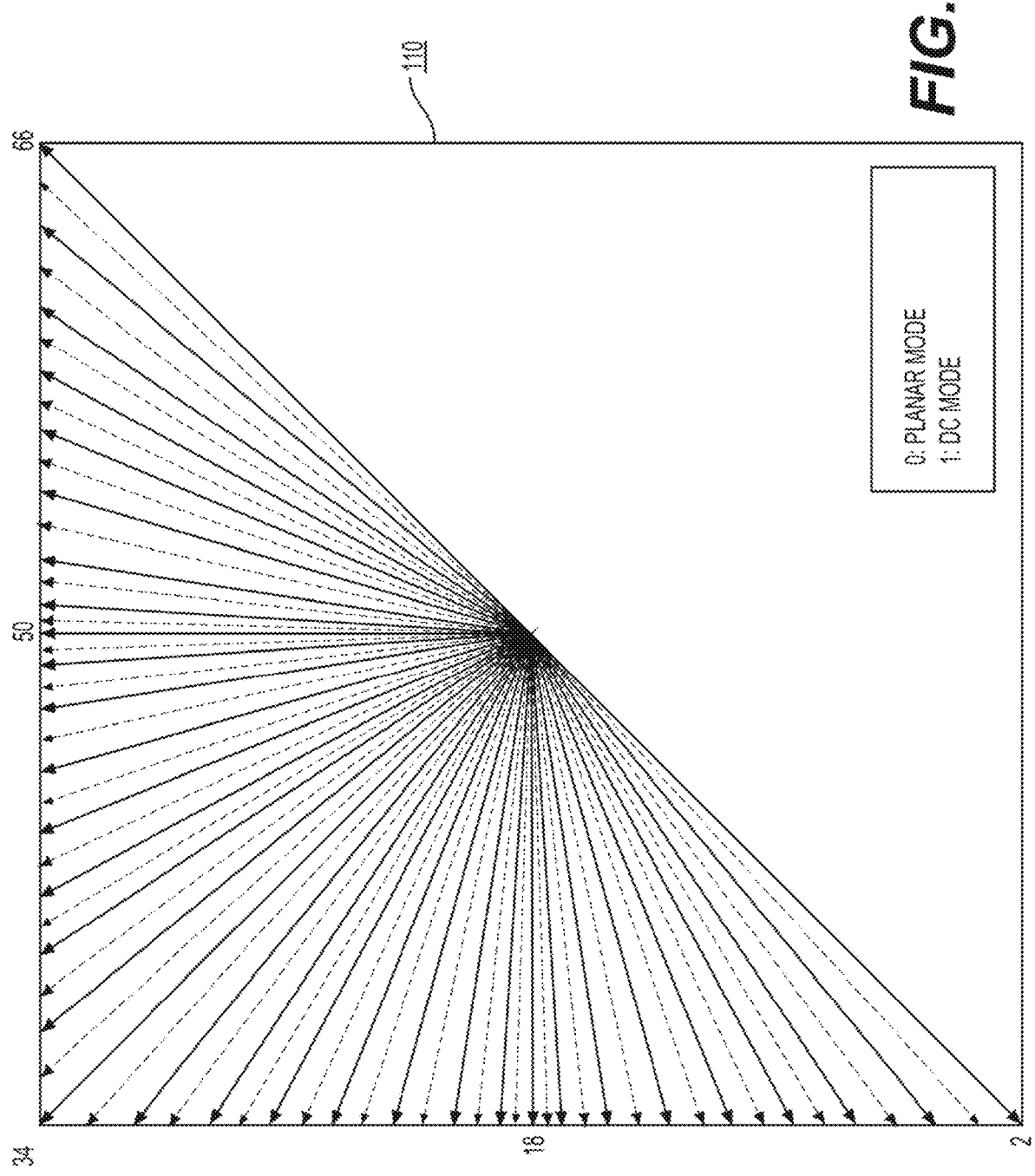
FIG. 1B is an illustration of exemplary intra prediction directions.
Figure 2:
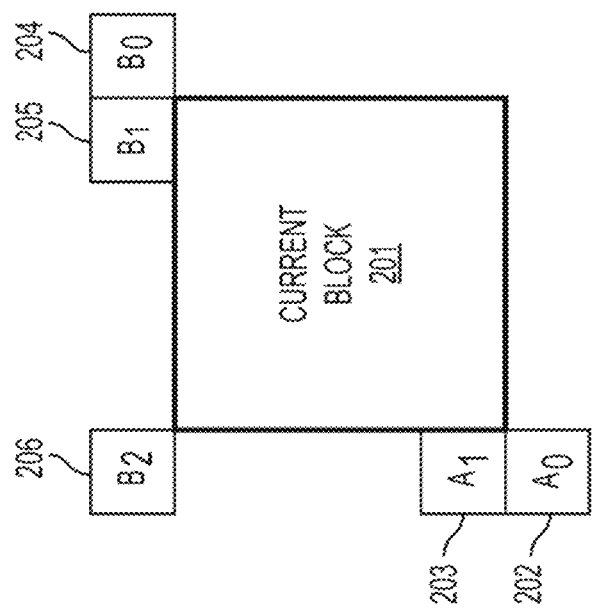
FIG. 2 shows an example of a current block (201) and surrounding samples.
Figure 3:
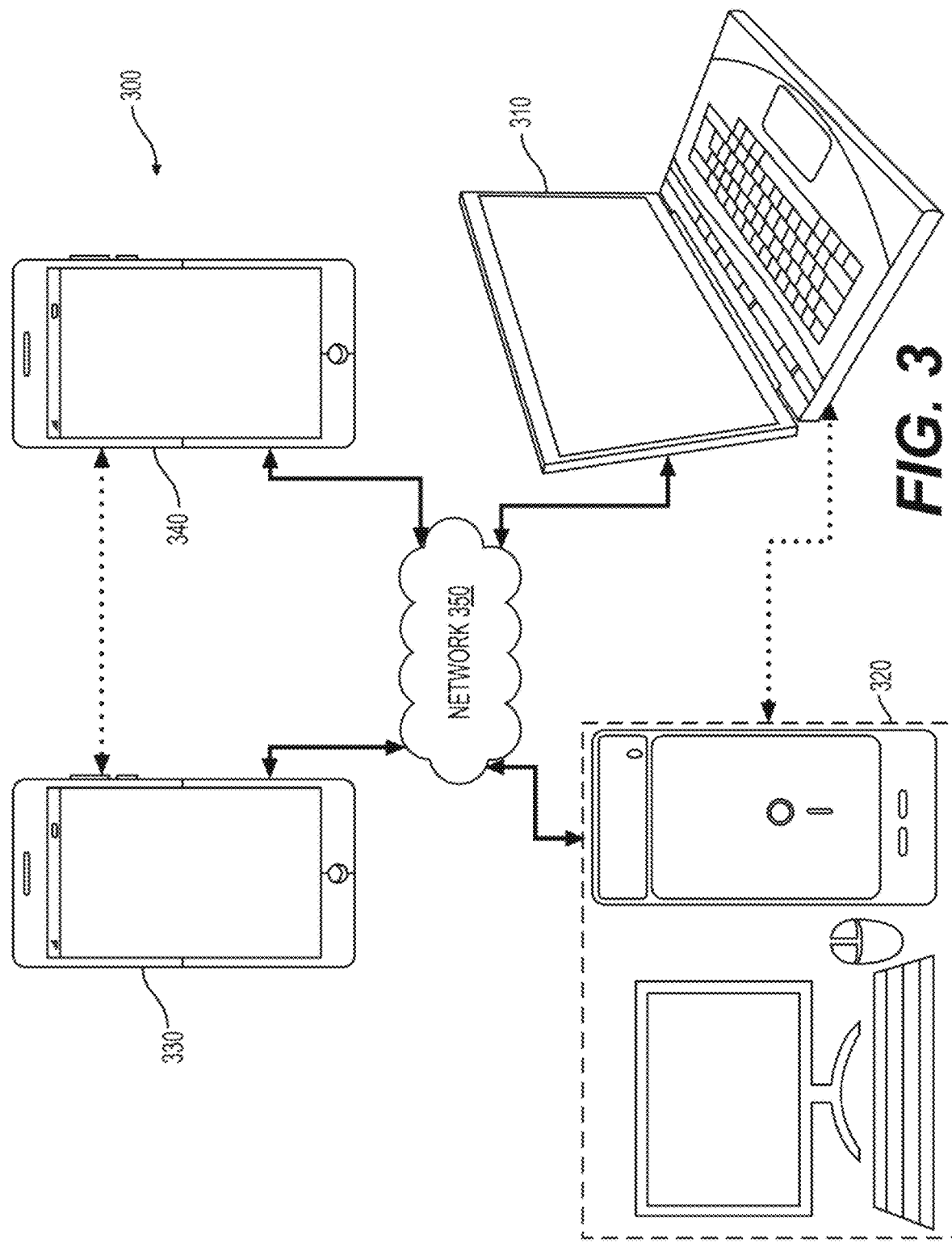
FIG. 3 is a schematic illustration of an exemplary block diagram of a communication system (300).

FIG. 3 illustrates an exemplary block diagram of a communication system (300). The communication system (300) includes a plurality of terminal devices that can communicate with each other, via, for example, a network (350). For example, the communication system (300) includes a first pair of terminal devices (310) and (320) interconnected via the network (350). In the FIG. 3 example, the first pair of terminal devices (310) and (320) performs unidirectional transmission of data. For example, the terminal device (310) may code video data (e.g., a stream of video pictures that are captured by the terminal device (310)) for transmission to the other terminal device (320) via the network (350). The encoded video data can be transmitted in the form of one or more coded video bitstreams. The terminal device (320) may receive the coded video data from the network (350), decode the coded video data to recover the video pictures and display video pictures according to the recovered video data. Unidirectional data transmission may be common in media serving applications and the like.

In another example, the communication system (300) includes a second pair of terminal devices (330) and (340) that perform bidirectional transmission of coded video data, for example, during videoconferencing. For bidirectional transmission of data, in an example, each terminal device of the terminal devices (330) and (340) may code video data (e.g., a stream of video pictures that are captured by the terminal device) for transmission to the other terminal device of the terminal devices (330) and (340) via the network (350). Each terminal device of the terminal devices (330) and (340) also may receive the coded video data transmitted by the other terminal device of the terminal devices (330) and (340), and may decode the coded video data to recover the video pictures and may display video pictures at an accessible display device according to the recovered video data.

In the example of FIG. 3, the terminal devices (310), (320), (330) and (340) are respectively illustrated as servers, personal computers and smart phones but the principles of the present disclosure may be not so limited. Embodiments of the present disclosure find application with laptop computers, tablet computers, media players, and/or dedicated video conferencing equipment. The network (350) represents any number of networks that convey coded video data among the terminal devices (310), (320), (330) and (340), including for example wireline (wired) and/or wireless communication networks. The communication network (350) may exchange data in circuit-switched and/or packet-switched channels. Representative networks include telecommunications networks, local area networks, wide area networks and/or the Internet. For the purposes of the present discussion, the architecture and topology of the network (350) may be immaterial to the operation of the present disclosure unless explained herein below.

Figure 4:
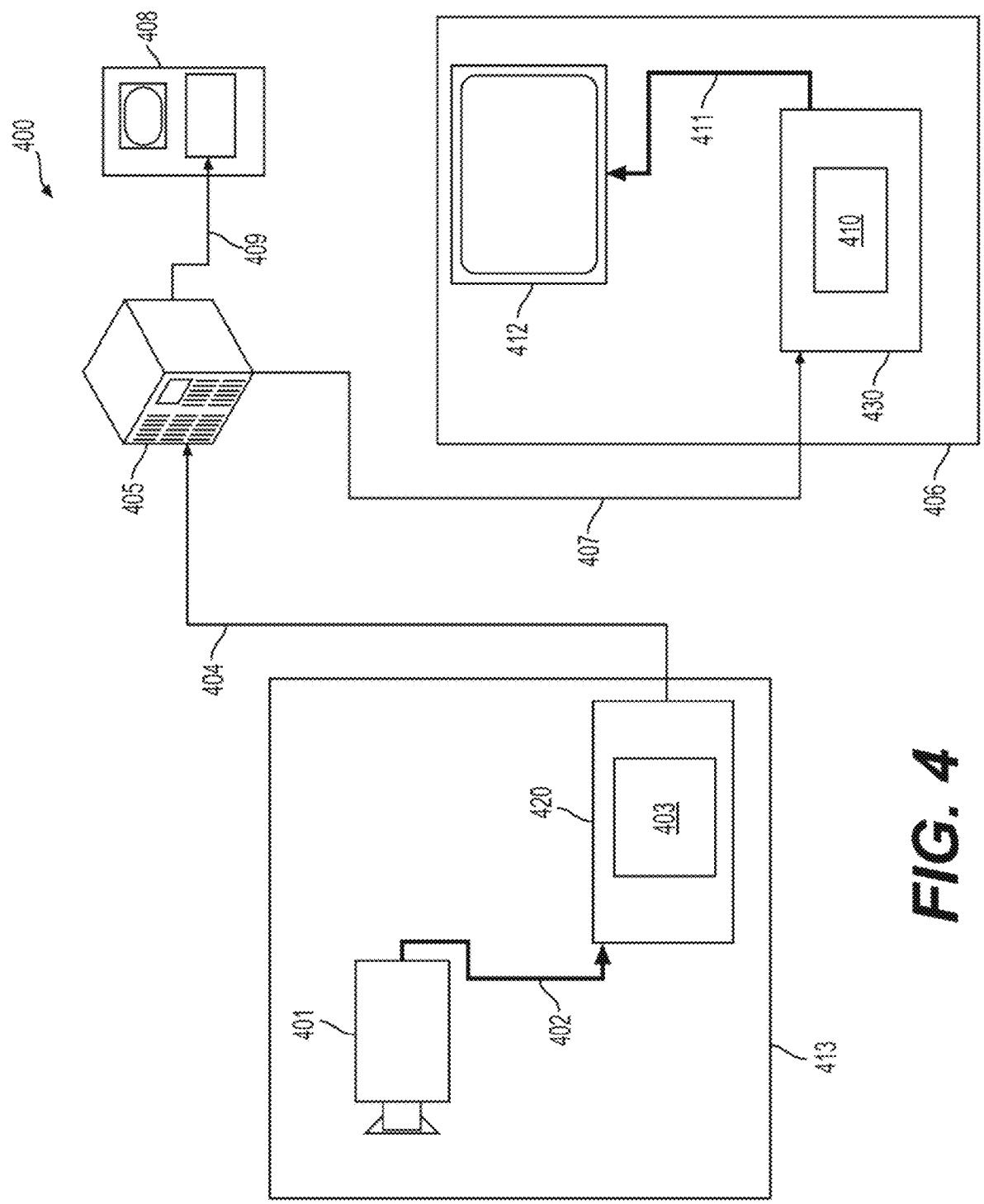
FIG. 4 is a schematic illustration of an exemplary block diagram of a communication system (400).

FIG. 4 illustrates, as an example of an application for the disclosed subject matter, a video encoder and a video decoder in a streaming environment. The disclosed subject matter can be equally applicable to other video enabled applications, including, for example, video conferencing, digital TV, streaming services, storing of compressed video on digital media including CD, DVD, memory stick and the like, and so on.

A streaming system may include a capture subsystem (413), that can include a video source (401), for example a digital camera, creating for example a stream of video pictures (402) that are uncompressed. In an example, the stream of video pictures (402) includes samples that are taken by the digital camera. The stream of video pictures (402), depicted as a bold line to emphasize a high data volume when compared to encoded video data (404) (or coded video bitstreams), can be processed by an electronic device (420) that includes a video encoder (403) coupled to the video source (401). The video encoder (403) can include hardware, software, or a combination thereof to enable or implement aspects of the disclosed subject matter as described in more detail below. The encoded video data (404) (or encoded video bitstream), depicted as a thin line to emphasize the lower data volume when compared to the stream of video pictures (402), can be stored on a streaming server (405) for future use. One or more streaming client subsystems, such as client subsystems (406) and (408) in FIG. 4 can access the streaming server (405) to retrieve copies (407) and (409) of the encoded video data (404). A client subsystem (406) can include a video decoder (410), for example, in an electronic device (430). The video decoder (410) decodes the incoming copy (407) of the encoded video data and creates an outgoing stream of video pictures (411) that can be rendered on a display (412) (e.g., display screen) or other rendering device (not depicted). In some streaming systems, the encoded video data (404), (407), and (409) (e.g., video bitstreams) can be encoded according to certain video coding/compression standards. Examples of those standards include ITU-T Recommendation H.265. In an example, a video coding standard under development is informally known as Versatile Video Coding (VVC). The disclosed subject matter may be used in the context of VVC.

It is noted that the electronic devices (420) and (430) can include other components (not shown). For example, the electronic device (420) can include a video decoder (not shown) and the electronic device (430) can include a video encoder (not shown) as well.

Figure 5:
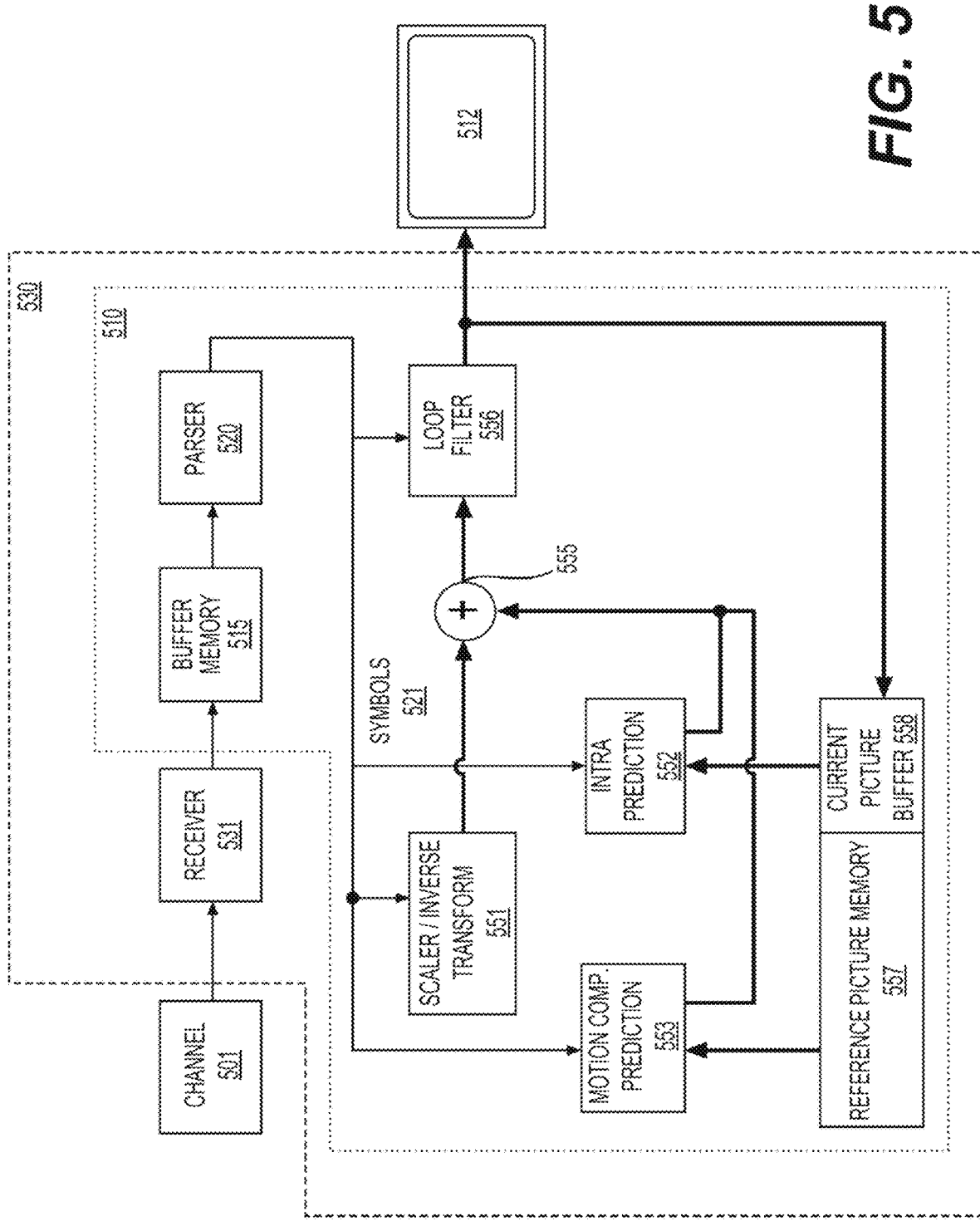
FIG. 5 is a schematic illustration of an exemplary block diagram of a decoder.

FIG. 5 shows an exemplary block diagram of a video decoder (510). The video decoder (510) can be included in an electronic device (530). The electronic device (530) can include a receiver (531) (e.g., receiving circuitry). The video decoder (510) can be used in the place of the video decoder (410) in the FIG. 4 example.

The receiver (531) may receive one or more coded video sequences to be decoded by the video decoder (510). In an embodiment, one coded video sequence is received at a time, where the decoding of each coded video sequence is independent from the decoding of other coded video sequences. The coded video sequence may be received from a channel (501), which may be a hardware/software link to a storage device which stores the encoded video data. The receiver (531) may receive the encoded video data with other data, for example, coded audio data and/or ancillary data streams, that may be forwarded to their respective using entities (not depicted). The receiver (531) may separate the coded video sequence from the other data. To combat network jitter, a buffer memory (515) may be coupled in between the receiver (531) and an entropy decoder/parser (520) ("parser (520)" henceforth). In certain applications, the buffer memory (515) is part of the video decoder (510). In others, it can be outside of the video decoder (510) (not depicted). In still others, there can be a buffer memory (not depicted) outside of the video decoder (510), for example to combat network jitter, and in addition another buffer memory (515) inside the video decoder (510), for example to handle playout timing. When the receiver (531) is receiving data from a store/forward device of sufficient bandwidth and controllability, or from an isosynchronous network, the buffer memory (515) may not be needed, or can be small. For use on best effort packet networks such as the Internet, the buffer memory (515) may be required, can be comparatively large and can be advantageously of adaptive size, and may at least partially be implemented in an operating system or similar elements (not depicted) outside of the video decoder (510).

The video decoder (510) may include the parser (520) to reconstruct symbols (521) from the coded video sequence. Categories of those symbols include information used to manage operation of the video decoder (510), and potentially information to control a rendering device such as a render device (512) (e.g., a display screen) that is not an integral part of the electronic device (530) but can be coupled to the electronic device (530), as shown in FIG. 5. The control information for the rendering device(s) may be in the form of Supplemental Enhancement Information (SEI) messages or Video Usability Information (VUI) parameter set fragments (not depicted). The parser (520) may parse/entropy-decode the coded video sequence that is received. The coding of the coded video sequence can be in accordance with a video coding technology or standard, and can follow various principles, including variable length coding, Huffman coding, arithmetic coding with or without context sensitivity, and so forth. The parser (520) may extract from the coded video sequence, a set of subgroup parameters for at least one of the subgroups of pixels in the video decoder, based upon at least one parameter corresponding to the group. Subgroups can include Groups of Pictures (GOPs), pictures, tiles, slices, macroblocks, Coding Units (CUs), blocks, Transform Units (TUs), Prediction Units (PUs) and so forth. The parser (520) may also extract from the coded video sequence information such as transform coefficients, quantizer parameter values, motion vectors, and so forth.

The parser (520) may perform an entropy decoding/parsing operation on the video sequence received from the buffer memory (515), so as to create symbols (521).

Reconstruction of the symbols (521) can involve multiple different units depending on the type of the coded video picture or parts thereof (such as: inter and intra picture, inter and intra block), and other factors. Which units are involved, and how, can be controlled by subgroup control information parsed from the coded video sequence by the parser (520). The flow of such subgroup control information between the parser (520) and the multiple units below is not depicted for clarity.

Beyond the functional blocks already mentioned, the video decoder (510) can be conceptually subdivided into a number of functional units as described below. In a practical implementation operating under commercial constraints, many of these units interact closely with each other and can, at least partly, be integrated into each other. However, for the purpose of describing the disclosed subject matter, the conceptual subdivision into the functional units below is appropriate.

A first unit is the scaler/inverse transform unit (551). The scaler/inverse transform unit (551) receives a quantized transform coefficient as well as control information, including which transform to use, block size, quantization factor, quantization scaling matrices, etc. as symbol(s) (521) from the parser (520). The scaler/inverse transform unit (551) can output blocks comprising sample values, that can be input into aggregator (555).

In some cases, the output samples of the scaler/inverse transform unit (551) can pertain to an intra coded block. The intra coded block is a block that is not using predictive information from previously reconstructed pictures, but can use predictive information from previously reconstructed parts of the current picture. Such predictive information can be provided by an intra picture prediction unit (552). In some cases, the intra picture prediction unit (552) generates a block of the same size and shape of the block under reconstruction, using surrounding already reconstructed information fetched from the current picture buffer (558). The current picture buffer (558) buffers, for example, partly reconstructed current picture and/or fully reconstructed current picture. The aggregator (555), in some cases, adds, on a per sample basis, the prediction information the intra prediction unit (552) has generated to the output sample information as provided by the scaler/inverse transform unit (551).

In other cases, the output samples of the scaler/inverse transform unit (551) can pertain to an inter coded, and potentially motion compensated, block. In such a case, a motion compensation prediction unit (553) can access reference picture memory (557) to fetch samples used for prediction. After motion compensating the fetched samples in accordance with the symbols (521) pertaining to the block, these samples can be added by the aggregator (555) to the output of the scaler/inverse transform unit (551) (in this case called the residual samples or residual signal) so as to generate output sample information. The addresses within the reference picture memory (557) from where the motion compensation prediction unit (553) fetches prediction samples can be controlled by motion vectors, available to the motion compensation prediction unit (553) in the form of symbols (521) that can have, for example X, Y, and reference picture components. Motion compensation also can include interpolation of sample values as fetched from the reference picture memory (557) when sub-sample exact motion vectors are in use, motion vector prediction mechanisms, and so forth.

The output samples of the aggregator (555) can be subject to various loop filtering techniques in the loop filter unit (556). Video compression technologies can include in-loop filter technologies that are controlled by parameters included in the coded video sequence (also referred to as coded video bitstream) and made available to the loop filter unit (556) as symbols (521) from the parser (520). Video compression can also be responsive to meta-information obtained during the decoding of previous (in decoding order) parts of the coded picture or coded video sequence, as well as responsive to previously reconstructed and loop-filtered sample values.

The output of the loop filter unit (556) can be a sample stream that can be output to the render device (512) as well as stored in the reference picture memory (557) for use in future inter-picture prediction.

Certain coded pictures, once fully reconstructed, can be used as reference pictures for future prediction. For example, once a coded picture corresponding to a current picture is fully reconstructed and the coded picture has been identified as a reference picture (by, for example, the parser (520)), the current picture buffer (558) can become a part of the reference picture memory (557), and a fresh current picture buffer can be reallocated before commencing the reconstruction of the following coded picture.

The video decoder (510) may perform decoding operations according to a predetermined video compression technology or a standard, such as ITU-T Rec. H.265. The coded video sequence may conform to a syntax specified by the video compression technology or standard being used, in the sense that the coded video sequence adheres to both the syntax of the video compression technology or standard and the profiles as documented in the video compression technology or standard. Specifically, a profile can select certain tools as the only tools available for use under that profile from all the tools available in the video compression technology or standard. Also necessary for compliance can be that the complexity of the coded video sequence is within bounds as defined by the level of the video compression technology or standard. In some cases, levels restrict the maximum picture size, maximum frame rate, maximum reconstruction sample rate (measured in, for example megasamples per second), maximum reference picture size, and so on. Limits set by levels can, in some cases, be further restricted through Hypothetical Reference Decoder (HRD) specifications and metadata for HRD buffer management signaled in the coded video sequence.

In an embodiment, the receiver (531) may receive additional (redundant) data with the encoded video. The additional data may be included as part of the coded video sequence(s). The additional data may be used by the video decoder (510) to properly decode the data and/or to more accurately reconstruct the original video data. Additional data can be in the form of, for example, temporal, spatial, or signal noise ratio (SNR) enhancement layers, redundant slices, redundant pictures, forward error correction codes, and so on.

Figure 6:
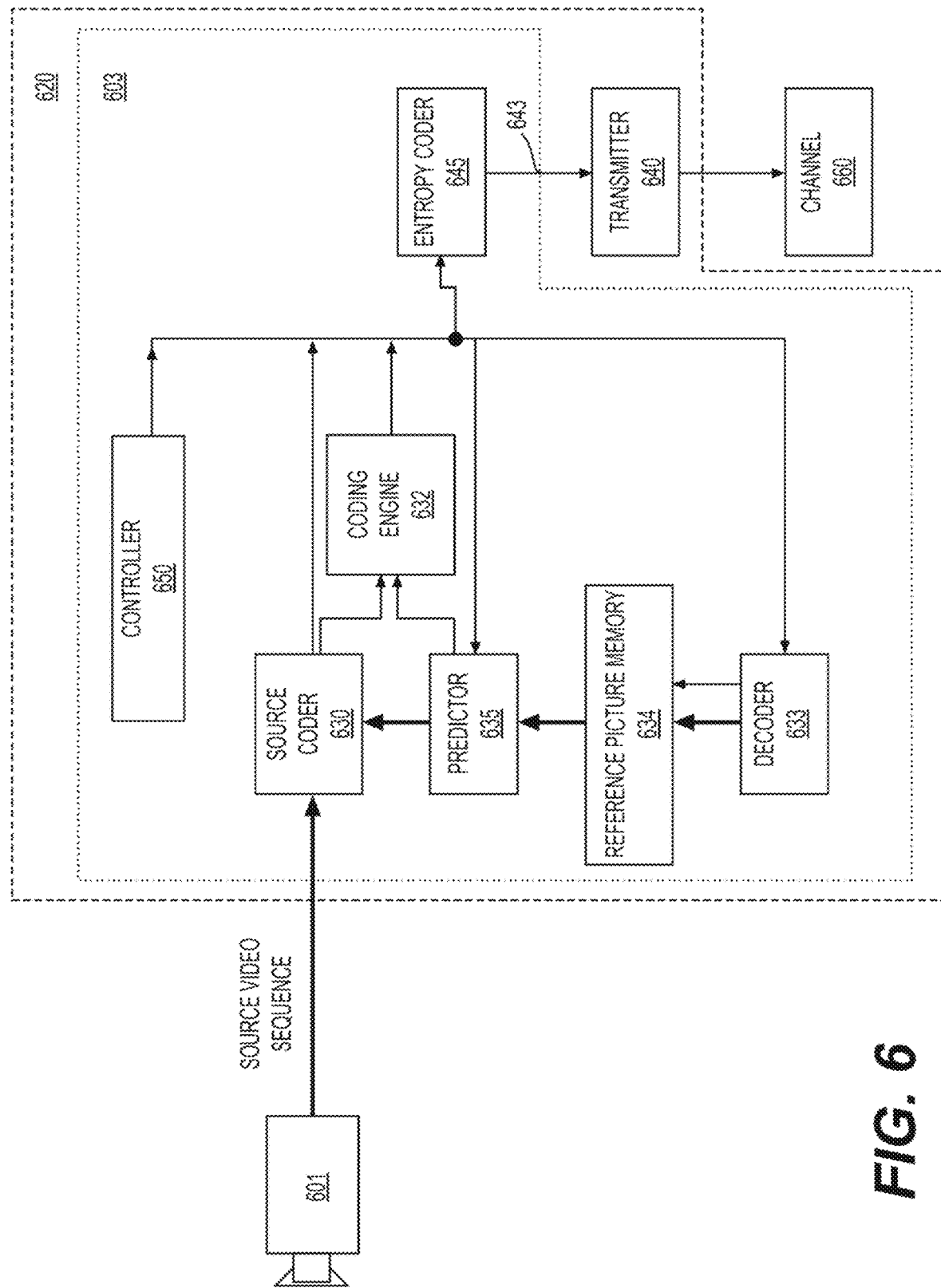
FIG. 6 is a schematic illustration of an exemplary block diagram of an encoder.

FIG. 6 shows an exemplary block diagram of a video encoder (603). The video encoder (603) is included in an electronic device (620). The electronic device (620) includes a transmitter (640) (e.g., transmitting circuitry). The video encoder (603) can be used in the place of the video encoder (403) in the FIG. 4 example.

The video encoder (603) may receive video samples from a video source (601) (that is not part of the electronic device (620) in the FIG. 6 example) that may capture video image(s) to be coded by the video encoder (603). In another example, the video source (601) is a part of the electronic device (620).

The video source (601) may provide the source video sequence to be coded by the video encoder (603) in the form of a digital video sample stream that can be of any suitable bit depth (for example: 8 bit, 10 bit, 12 bit, . . . ), any colorspace (for example, BT.601 Y CrCB, RGB, . . . ), and any suitable sampling structure (for example Y CrCb 4:2:0, Y CrCb 4:4:4). In a media serving system, the video source (601) may be a storage device storing previously prepared video. In a videoconferencing system, the video source (601) may be a camera that captures local image information as a video sequence. Video data may be provided as a plurality of individual pictures that impart motion when viewed in sequence. The pictures themselves may be organized as a spatial array of pixels, wherein each pixel can comprise one or more samples depending on the sampling structure, color space, etc. in use. A person skilled in the art can readily understand the relationship between pixels and samples. The description below focuses on samples.

According to an embodiment, the video encoder (603) may code and compress the pictures of the source video sequence into a coded video sequence (643) in real time or under any other time constraints as required. Enforcing appropriate coding speed is one function of a controller (650). In some embodiments, the controller (650) controls other functional units as described below and is functionally coupled to the other functional units. The coupling is not depicted for clarity. Parameters set by the controller (650) can include rate control related parameters (picture skip, quantizer, lambda value of rate-distortion optimization techniques, . . . ), picture size, group of pictures (GOP) layout, maximum motion vector search range, and so forth. The controller (650) can be configured to have other suitable functions that pertain to the video encoder (603) optimized for a certain system design.

In some embodiments, the video encoder (603) is configured to operate in a coding loop. As an oversimplified description, in an example, the coding loop can include a source coder (630) (e.g., responsible for creating symbols, such as a symbol stream, based on an input picture to be coded, and a reference picture(s)), and a (local) decoder (633) embedded in the video encoder (603). The decoder (633) reconstructs the symbols to create the sample data in a similar manner as a (remote) decoder also would create. The reconstructed sample stream (sample data) is input to the reference picture memory (634). As the decoding of a symbol stream leads to bit-exact results independent of decoder location (local or remote), the content in the reference picture memory (634) is also bit exact between the local encoder and remote encoder. In other words, the prediction part of an encoder "sees" as reference picture samples exactly the same sample values as a decoder would "see" when using prediction during decoding. This fundamental principle of reference picture synchronicity (and resulting drift, if synchronicity cannot be maintained, for example because of channel errors) is used in some related arts as well.

The operation of the "local" decoder (633) can be the same as of a "remote" decoder, such as the video decoder (510), which has already been described in detail above in conjunction with FIG. 5. Briefly referring also to FIG. 5, however, as symbols are available and encoding/decoding of symbols to a coded video sequence by an entropy coder (645) and the parser (520) can be lossless, the entropy decoding parts of the video decoder (510), including the buffer memory (515), and parser (520) may not be fully implemented in the local decoder (633).

In an embodiment, a decoder technology except the parsing/entropy decoding that is present in a decoder is present, in an identical or a substantially identical functional form, in a corresponding encoder. Accordingly, the disclosed subject matter focuses on decoder operation. The description of encoder technologies can be abbreviated as they are the inverse of the comprehensively described decoder technologies. In certain areas a more detail description is provided below.

During operation, in some examples, the source coder (630) may perform motion compensated predictive coding, which codes an input picture predictively with reference to one or more previously coded picture from the video sequence that were designated as "reference pictures." In this manner, the coding engine (632) codes differences between pixel blocks of an input picture and pixel blocks of reference picture(s) that may be selected as prediction reference(s) to the input picture.

The local video decoder (633) may decode coded video data of pictures that may be designated as reference pictures, based on symbols created by the source coder (630). Operations of the coding engine (632) may advantageously be lossy processes. When the coded video data may be decoded at a video decoder (not shown in FIG. 6), the reconstructed video sequence typically may be a replica of the source video sequence with some errors. The local video decoder (633) replicates decoding processes that may be performed by the video decoder on reference pictures and may cause reconstructed reference pictures to be stored in the reference picture memory (634). In this manner, the video encoder (603) may store copies of reconstructed reference pictures locally that have common content as the reconstructed reference pictures that will be obtained by a far-end video decoder (absent transmission errors).

The predictor (635) may perform prediction searches for the coding engine (632). That is, for a new picture to be coded, the predictor (635) may search the reference picture memory (634) for sample data (as candidate reference pixel blocks) or certain metadata such as reference picture motion vectors, block shapes, and so on, that may serve as an appropriate prediction reference for the new pictures. The predictor (635) may operate on a sample block-by-pixel block basis to find appropriate prediction references. In some cases, as determined by search results obtained by the predictor (635), an input picture may have prediction references drawn from multiple reference pictures stored in the reference picture memory (634).

The controller (650) may manage coding operations of the source coder (630), including, for example, setting of parameters and subgroup parameters used for encoding the video data.

Output of all aforementioned functional units may be subjected to entropy coding in the entropy coder (645). The entropy coder (645) translates the symbols as generated by the various functional units into a coded video sequence, by applying lossless compression to the symbols according to technologies such as Huffman coding, variable length coding, arithmetic coding, and so forth.

The transmitter (640) may buffer the coded video sequence(s) as created by the entropy coder (645) to prepare for transmission via a communication channel (660), which may be a hardware/software link to a storage device which would store the encoded video data. The transmitter (640) may merge coded video data from the video encoder (603) with other data to be transmitted, for example, coded audio data and/or ancillary data streams (sources not shown).

The controller (650) may manage operation of the video encoder (603). During coding, the controller (650) may assign to each coded picture a certain coded picture type, which may affect the coding techniques that may be applied to the respective picture. For example, pictures often may be assigned as one of the following picture types:

An Intra Picture (I picture) may be one that may be coded and decoded without using any other picture in the sequence as a source of prediction. Some video codecs allow for different types of intra pictures, including, for example Independent Decoder Refresh ("IDR") Pictures. A person skilled in the art is aware of those variants of I pictures and their respective applications and features.

A predictive picture (P picture) may be one that may be coded and decoded using intra prediction or inter prediction using at most one motion vector and reference index to predict the sample values of each block.

A bi-directionally predictive picture (B Picture) may be one that may be coded and decoded using intra prediction or inter prediction using at most two motion vectors and reference indices to predict the sample values of each block. Similarly, multiple-predictive pictures can use more than two reference pictures and associated metadata for the reconstruction of a single block.

Source pictures commonly may be subdivided spatially into a plurality of sample blocks (for example, blocks of 4×4, 8×8, 4×8, or 16×16 samples each) and coded on a block-by-block basis. Blocks may be coded predictively with reference to other (already coded) blocks as determined by the coding assignment applied to the blocks' respective pictures. For example, blocks of I pictures may be coded non-predictively or they may be coded predictively with reference to already coded blocks of the same picture (spatial prediction or intra prediction). Pixel blocks of P pictures may be coded predictively, via spatial prediction or via temporal prediction with reference to one previously coded reference picture. Blocks of B pictures may be coded predictively, via spatial prediction or via temporal prediction with reference to one or two previously coded reference pictures.

The video encoder (603) may perform coding operations according to a predetermined video coding technology or standard, such as ITU-T Rec. H.265. In its operation, the video encoder (603) may perform various compression operations, including predictive coding operations that exploit temporal and spatial redundancies in the input video sequence. The coded video data, therefore, may conform to a syntax specified by the video coding technology or standard being used.

In an embodiment, the transmitter (640) may transmit additional data with the encoded video. The source coder (630) may include such data as part of the coded video sequence. Additional data may comprise temporal/spatial/SNR enhancement layers, other forms of redundant data such as redundant pictures and slices, SEI messages, VUI parameter set fragments, and so on.

A video may be captured as a plurality of source pictures (video pictures) in a temporal sequence. Intra-picture prediction (often abbreviated to intra prediction) makes use of spatial correlation in a given picture, and inter-picture prediction makes uses of the (temporal or other) correlation between the pictures. In an example, a specific picture under encoding/decoding, which is referred to as a current picture, is partitioned into blocks. When a block in the current picture is similar to a reference block in a previously coded and still buffered reference picture in the video, the block in the current picture can be coded by a vector that is referred to as a motion vector. The motion vector points to the reference block in the reference picture, and can have a third dimension identifying the reference picture, in case multiple reference pictures are in use.

In some embodiments, a bi-prediction technique can be used in the inter-picture prediction. According to the bi-prediction technique, two reference pictures, such as a first reference picture and a second reference picture that are both prior in decoding order to the current picture in the video (but may be in the past and future, respectively, in display order) are used. A block in the current picture can be coded by a first motion vector that points to a first reference block in the first reference picture, and a second motion vector that points to a second reference block in the second reference picture. The block can be predicted by a combination of the first reference block and the second reference block.

Further, a merge mode technique can be used in the inter-picture prediction to improve coding efficiency.

According to some embodiments of the disclosure, predictions, such as inter-picture predictions and intra-picture predictions, are performed in the unit of blocks. For example, according to the HEVC standard, a picture in a sequence of video pictures is partitioned into coding tree units (CTU) for compression, the CTUs in a picture have the same size, such as 64×64 pixels, 32×32 pixels, or 16×16 pixels. In general, a CTU includes three coding tree blocks (CTBs), which are one luma CTB and two chroma CTBs. Each CTU can be recursively quadtree split into one or multiple coding units (CUs). For example, a CTU of 64×64 pixels can be split into one CU of 64×64 pixels, or 4 CUs of 32×32 pixels, or 16 CUs of 16×16 pixels. In an example, each CU is analyzed to determine a prediction type for the CU, such as an inter prediction type or an intra prediction type. The CU is split into one or more prediction units (PUs) depending on the temporal and/or spatial predictability. Generally, each PU includes a luma prediction block (PB), and two chroma PBs. In an embodiment, a prediction operation in coding (encoding/decoding) is performed in the unit of a prediction block. Using a luma prediction block as an example of a prediction block, the prediction block includes a matrix of values (e.g., luma values) for pixels, such as 8×8 pixels, 16×16 pixels, 8×16 pixels, 16×8 pixels, and the like.

Figure 7:
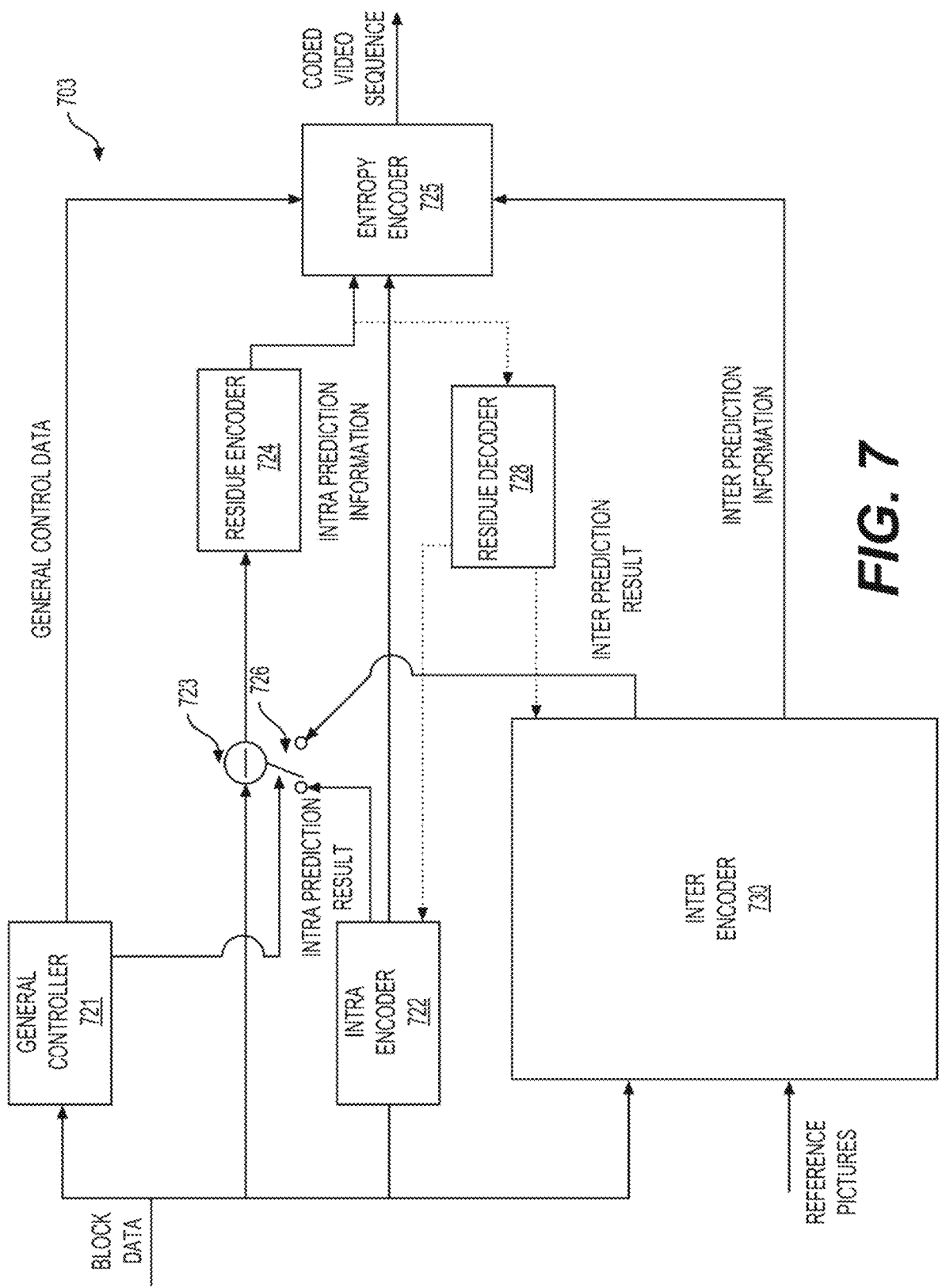
FIG. 7 shows a block diagram of an exemplary encoder.

FIG. 7 shows an exemplary diagram of a video encoder (703). The video encoder (703) is configured to receive a processing block (e.g., a prediction block) of sample values within a current video picture in a sequence of video pictures, and encode the processing block into a coded picture that is part of a coded video sequence. In an example, the video encoder (703) is used in the place of the video encoder (403) in the FIG. 4 example.

In an HEVC example, the video encoder (703) receives a matrix of sample values for a processing block, such as a prediction block of 8×8 samples, and the like. The video encoder (703) determines whether the processing block is best coded using intra mode, inter mode, or bi-prediction mode using, for example, rate-distortion optimization. When the processing block is to be coded in intra mode, the video encoder (703) may use an intra prediction technique to encode the processing block into the coded picture; and when the processing block is to be coded in inter mode or bi-prediction mode, the video encoder (703) may use an inter prediction or bi-prediction technique, respectively, to encode the processing block into the coded picture. In certain video coding technologies, merge mode can be an inter picture prediction submode where the motion vector is derived from one or more motion vector predictors without the benefit of a coded motion vector component outside the predictors. In certain other video coding technologies, a motion vector component applicable to the subject block may be present. In an example, the video encoder (703) includes other components, such as a mode decision module (not shown) to determine the mode of the processing blocks.

In the FIG. 7 example, the video encoder (703) includes an inter encoder (730), an intra encoder (722), a residue calculator (723), a switch (726), a residue encoder (724), a general controller (721), and an entropy encoder (725) coupled together as shown in FIG. 7.

The inter encoder (730) is configured to receive the samples of the current block (e.g., a processing block), compare the block to one or more reference blocks in reference pictures (e.g., blocks in previous pictures and later pictures), generate inter prediction information (e.g., description of redundant information according to inter encoding technique, motion vectors, merge mode information), and calculate inter prediction results (e.g., predicted block) based on the inter prediction information using any suitable technique. In some examples, the reference pictures are decoded reference pictures that are decoded based on the encoded video information.

The intra encoder (722) is configured to receive the samples of the current block (e.g., a processing block), in some cases compare the block to blocks already coded in the same picture, generate quantized coefficients after transform, and in some cases also generate intra prediction information (e.g., an intra prediction direction information according to one or more intra encoding techniques). In an example, the intra encoder (722) also calculates intra prediction results (e.g., predicted block) based on the intra prediction information and reference blocks in the same picture.

The general controller (721) is configured to determine general control data and control other components of the video encoder (703) based on the general control data. In an example, the general controller (721) determines the mode of the block, and provides a control signal to the switch (726) based on the mode. For example, when the mode is the intra mode, the general controller (721) controls the switch (726) to select the intra mode result for use by the residue calculator (723), and controls the entropy encoder (725) to select the intra prediction information and include the intra prediction information in the bitstream; and when the mode is the inter mode, the general controller (721) controls the switch (726) to select the inter prediction result for use by the residue calculator (723), and controls the entropy encoder (725) to select the inter prediction information and include the inter prediction information in the bitstream.

The residue calculator (723) is configured to calculate a difference (residue data) between the received block and prediction results selected from the intra encoder (722) or the inter encoder (730). The residue encoder (724) is configured to operate based on the residue data to encode the residue data to generate the transform coefficients. In an example, the residue encoder (724) is configured to convert the residue data from a spatial domain to a frequency domain, and generate the transform coefficients. The transform coefficients are then subject to quantization processing to obtain quantized transform coefficients. In various embodiments, the video encoder (703) also includes a residue decoder (728). The residue decoder (728) is configured to perform inverse-transform, and generate the decoded residue data. The decoded residue data can be suitably used by the intra encoder (722) and the inter encoder (730). For example, the inter encoder (730) can generate decoded blocks based on the decoded residue data and inter prediction information, and the intra encoder (722) can generate decoded blocks based on the decoded residue data and the intra prediction information. The decoded blocks are suitably processed to generate decoded pictures and the decoded pictures can be buffered in a memory circuit (not shown) and used as reference pictures in some examples.

The entropy encoder (725) is configured to format the bitstream to include the encoded block. The entropy encoder (725) is configured to include various information in the bitstream according to a suitable standard, such as the HEVC standard. In an example, the entropy encoder (725) is configured to include the general control data, the selected prediction information (e.g., intra prediction information or inter prediction information), the residue information, and other suitable information in the bitstream. Note that, according to the disclosed subject matter, when coding a block in the merge submode of either inter mode or bi-prediction mode, there is no residue information.

Figure 8:
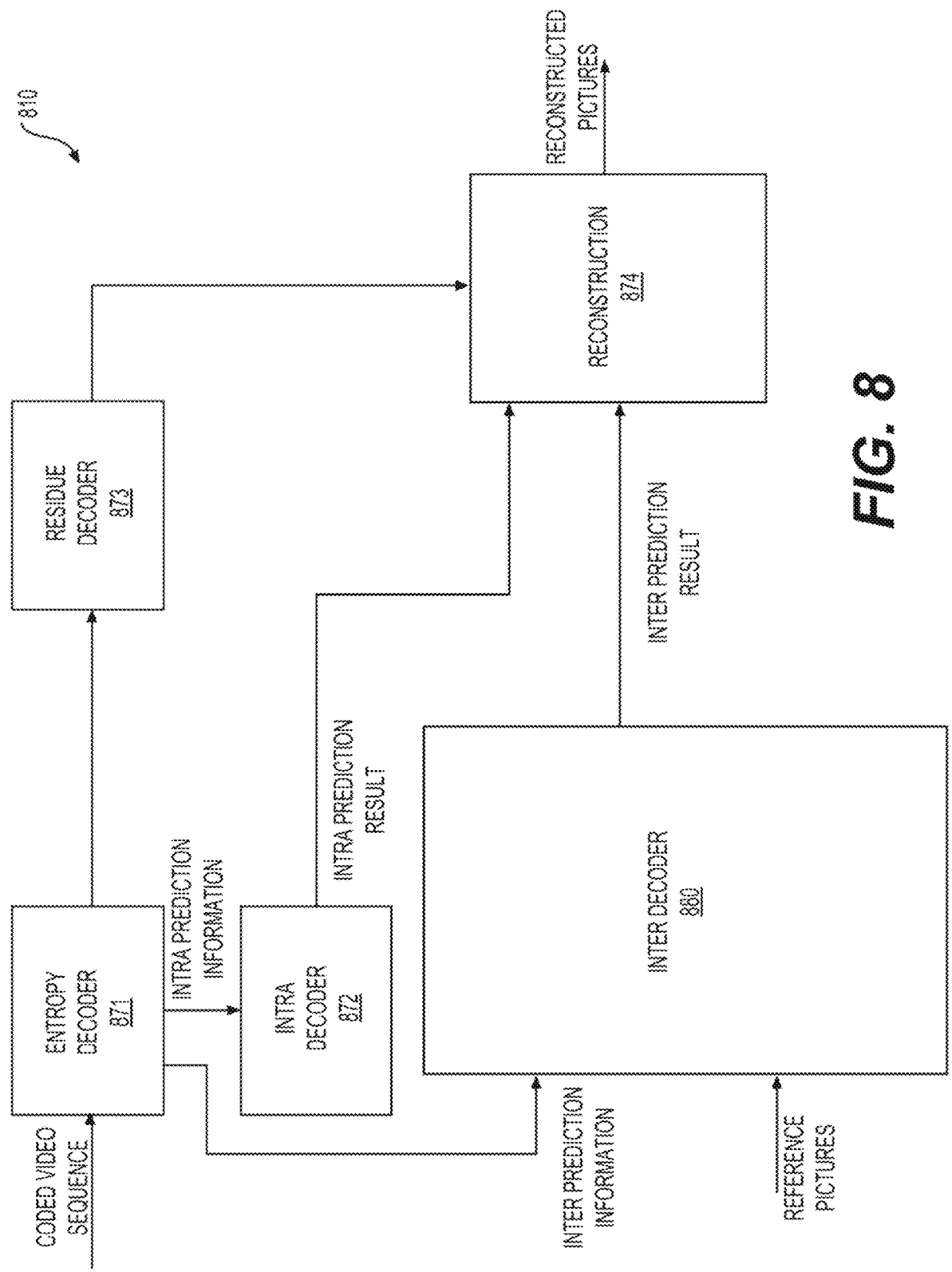
FIG. 8 shows a block diagram of an exemplary decoder.

FIG. 8 shows an exemplary diagram of a video decoder (810). The video decoder (810) is configured to receive coded pictures that are part of a coded video sequence, and decode the coded pictures to generate reconstructed pictures. In an example, the video decoder (810) is used in the place of the video decoder (410) in the FIG. 4 example.

In the FIG. 8 example, the video decoder (810) includes an entropy decoder (871), an inter decoder (880), a residue decoder (873), a reconstruction module (874), and an intra decoder (872) coupled together as shown in FIG. 8.

The entropy decoder (871) can be configured to reconstruct, from the coded picture, certain symbols that represent the syntax elements of which the coded picture is made up. Such symbols can include, for example, the mode in which a block is coded (such as, for example, intra mode, inter mode, bi-predicted mode, the latter two in merge submode or another submode) and prediction information (such as, for example, intra prediction information or inter prediction information) that can identify certain sample or metadata that is used for prediction by the intra decoder (872) or the inter decoder (880), respectively. The symbols can also include residual information in the form of, for example, quantized transform coefficients, and the like. In an example, when the prediction mode is inter or bi-predicted mode, the inter prediction information is provided to the inter decoder (880); and when the prediction type is the intra prediction type, the intra prediction information is provided to the intra decoder (872). The residual information can be subject to inverse quantization and is provided to the residue decoder (873).

The inter decoder (880) is configured to receive the inter prediction information, and generate inter prediction results based on the inter prediction information.

The intra decoder (872) is configured to receive the intra prediction information, and generate prediction results based on the intra prediction information.

The residue decoder (873) is configured to perform inverse quantization to extract de-quantized transform coefficients, and process the de-quantized transform coefficients to convert the residual information from the frequency domain to the spatial domain. The residue decoder (873) may also require certain control information (to include the Quantizer Parameter (QP)), and that information may be provided by the entropy decoder (871) (data path not depicted as this may be low volume control information only).

The reconstruction module (874) is configured to combine, in the spatial domain, the residual information as output by the residue decoder (873) and the prediction results (as output by the inter or intra prediction modules as the case may be) to form a reconstructed block, that may be part of the reconstructed picture, which in turn may be part of the reconstructed video. It is noted that other suitable operations, such as a deblocking operation and the like, can be performed to improve the visual quality.

It is noted that the video encoders (403), (603), and (703), and the video decoders (410), (510), and (810) can be implemented using any suitable technique. In an embodiment, the video encoders (403), (603), and (703), and the video decoders (410), (510), and (810) can be implemented using one or more integrated circuits. In another embodiment, the video encoders (403), (603), and (603), and the video decoders (410), (510), and (810) can be implemented using one or more processors that execute software instructions.

Various inter prediction modes can be used in VVC. For an inter-predicted CU, motion parameters can include MV(s), one or more reference picture indices, a reference picture list usage index, and additional information for certain coding features to be used for inter-predicted sample generation. A motion parameter can be signaled explicitly or implicitly. When a CU is coded with a skip mode, the CU can be associated with a PU and can have no significant residual coefficients, no coded motion vector delta or MV difference (e.g., MVD) or a reference picture index. A merge mode can be specified where the motion parameters for the current CU are obtained from neighboring CU(s), including spatial and/or temporal candidates, and optionally additional information such as introduced in VVC. The merge mode can be applied to an inter-predicted CU, not only for skip mode. In an example, an alternative to the merge mode is the explicit transmission of motion parameters, where MV(s), a corresponding reference picture index for each reference picture list and a reference picture list usage flag and other information are signaled explicitly per CU.

In an embodiment, such as in VVC, VVC Test model (VTM) reference software includes one or more refined inter prediction coding tools that include: an extended merge prediction, a merge motion vector difference (MMVD) mode, an adaptive motion vector prediction (AMVP) mode with symmetric MVD signaling, an affine motion compensated prediction, a subblock-based temporal motion vector prediction (SbTMVP), an adaptive motion vector resolution (AMVR), a motion field storage (1/16th luma sample MV storage and 8×8 motion field compression), a bi-prediction with CU-level weights (BCW), a bi-directional optical flow (BDOF), a prediction refinement using optical flow (PROF), a decoder side motion vector refinement (DMVR), a combined inter and intra prediction (CIIP), a geometric partitioning mode (GPM), and the like. Inter predictions and related methods are described in detail below.

Extended merge prediction can be used in some examples. In an example, such as in VTM4, a merge candidate list is constructed by including the following five types of candidates in order: spatial motion vector predictor(s) (MVP(s)) from spatial neighboring CU(s), temporal MVP(s) from collocated CU(s), history-based MVP(s) (HMVP(s)) from a first-in-first-out (FIFO) table, pairwise average MVP(s), and zero MV(s).

A size of the merge candidate list can be signaled in a slice header. In an example, the maximum allowed size of the merge candidate list is 6 in VTM4. For each CU coded in the merge mode, an index (e.g., a merge index) of a best merge candidate can be encoded using truncated unary binarization (TU). The first bin of the merge index can be coded with context (e.g., context-adaptive binary arithmetic coding (CABAC)) and a bypass coding can be used for other bins.

Figure 9:
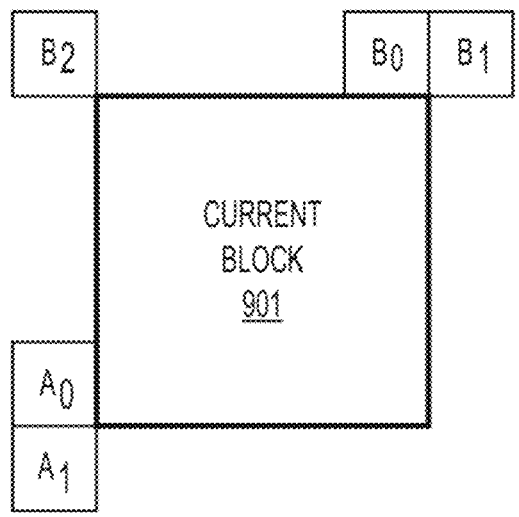
FIG. 9 shows positions of spatial merge candidates according to an embodiment of the disclosure.

Some examples of a generation process of each category of merge candidates are provided below. In an embodiment, spatial candidate(s) are derived as follows. The derivation of spatial merge candidates in VVC can be identical to that in HEVC. In an example, a maximum of four merge candidates are selected among candidates located in positions depicted in FIG. 9. FIG. 9 shows positions of spatial merge candidates according to an embodiment of the disclosure. Referring to FIG. 9, an order of derivation is B1, A1, B0, A0, and B2. The position B2 is considered only when any CU of positions A0, B0, B1, and A1 is not available (e.g., because the CU belongs to another slice or another tile) or is intra coded. After a candidate at the position A1 is added, the addition of the remaining candidates is subject to a redundancy check which ensures that candidates with same motion information are excluded from the candidate list so that coding efficiency is improved.

Figure 10:
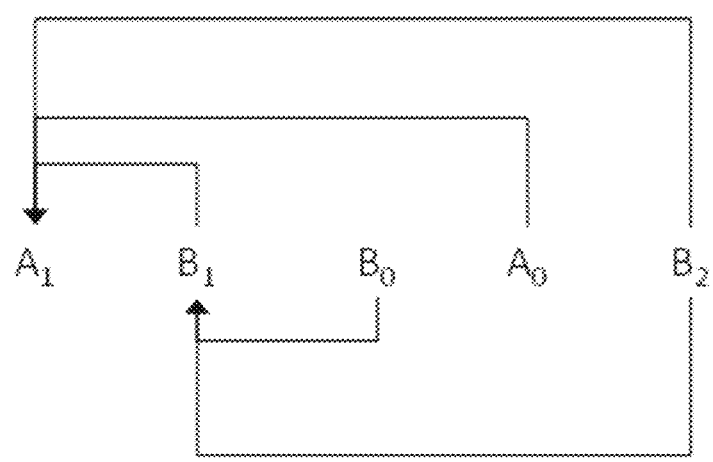
FIG. 10 shows candidate pairs that are considered for a redundancy check of spatial merge candidates according to an embodiment of the disclosure.

To reduce computational complexity, not all possible candidate pairs are considered in the mentioned redundancy check. Instead, only pairs linked with an arrow in FIG. 10 are considered and a candidate is only added to the candidate list if the corresponding candidate used for the redundancy check does not have the same motion information. FIG. 10 shows candidate pairs that are considered for a redundancy check of spatial merge candidates according to an embodiment of the disclosure. Referring to FIG. 10, the pairs linked with respective arrows include A1 and B1, A1 and A0, A1 and B2, B1 and B0, and B1 and B2. Thus, candidates at the positions B1, A0, and/or B2 can be compared with the candidate at the position A1, and candidates at the positions B0 and/or B2 can be compared with the candidate at the position B1.

Figure 11:
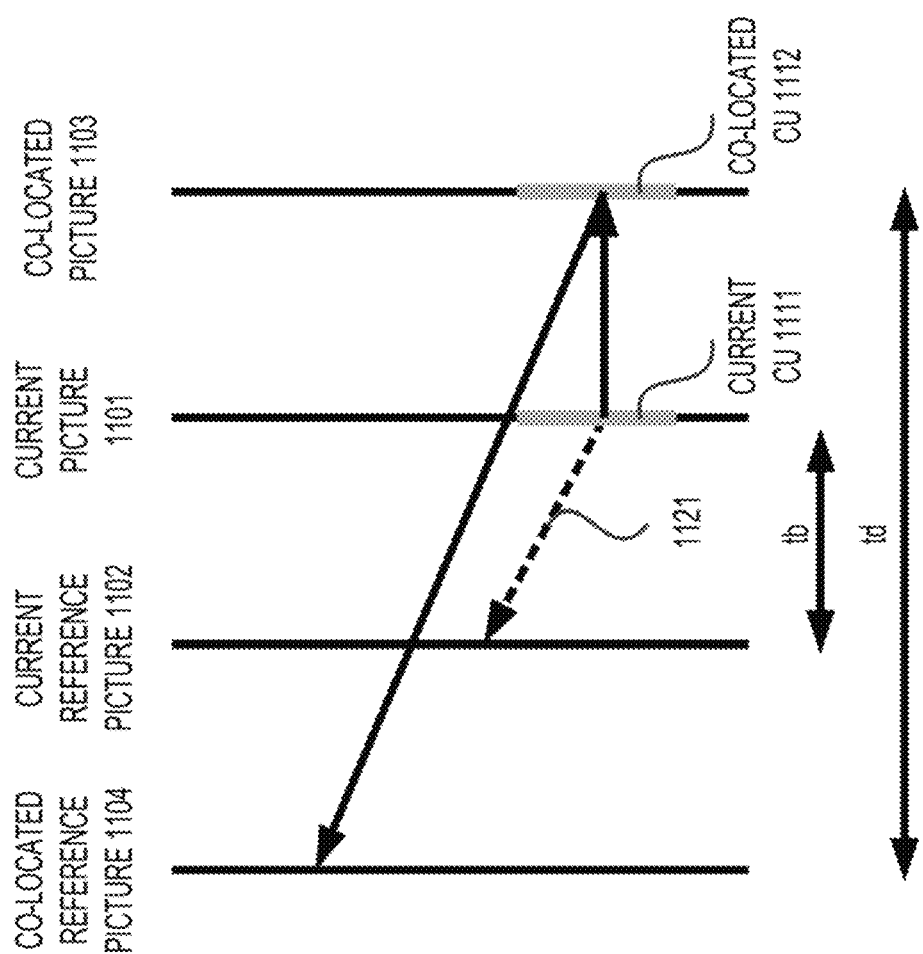
FIG. 11 shows exemplary motion vector scaling for a temporal merge candidate.

In an embodiment, temporal candidate(s) are derived as follows. In an example, only one temporal merge candidate is added to the candidate list. FIG. 11 shows exemplary motion vector scaling for a temporal merge candidate. To derive the temporal merge candidate of a current CU (1111) in a current picture (1101), a scaled MV (1121) (e.g., shown by a dotted line in FIG. 11) can be derived based on a collocated CU (1112) belonging to a collocated reference picture (1104). In an example, the collocated reference picture (also referred to as the collocated picture) is a particular reference picture, for example, used for temporal motion vector prediction. The collocated reference picture used for the temporal motion vector prediction can be indicated by a reference index in a syntax, such as a high-level syntax (e.g., a picture header, a slice header).

A reference picture list used to derive the collocated CU (1112) can be explicitly signaled in a slice header. The scaled MV (1121) for the temporal merge candidate can be obtained as shown by the dotted line in FIG. 11. The scaled MV (1121) can be scaled from the MV of the collocated CU (1112) using picture order count (POC) distances tb and td. The POC distance tb can be defined to be the POC difference between a current reference picture (1102) of the current picture (1101) and the current picture (1101). The POC distance td can be defined to be the POC difference between the collocated reference picture (1104) of the collocated reference picture (1103) and the collocated reference picture (1103). A reference picture index of the temporal merge candidate can be set to zero.

Figure 12:
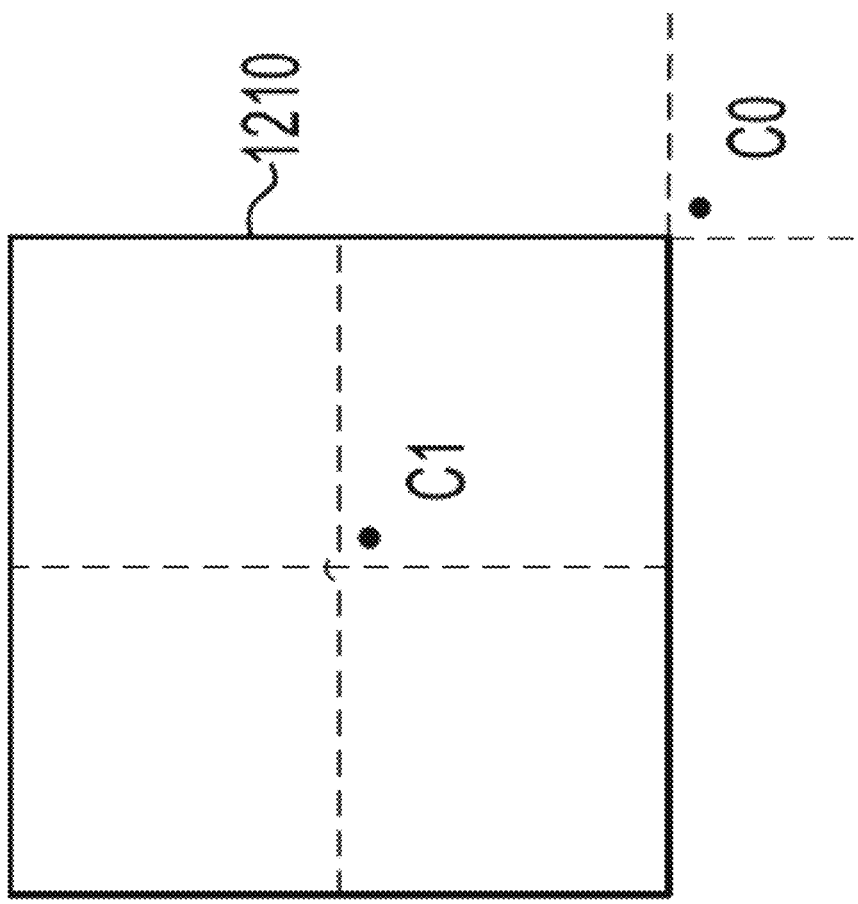
FIG. 12 shows exemplary candidate positions for a temporal merge candidate of a current coding unit.

FIG. 12 shows exemplary candidate positions (e.g., C0 and C1) for a temporal merge candidate of a current CU. A position for the temporal merge candidate can be selected from the candidate positions C0 and C1. The candidate position C0 is located at a bottom-right corner of a co-located CU (1210) of the current CU. The candidate position C1 is located at a center of the co-located CU (1210) of the current CU. If a CU at the candidate position C0 is not available, is intra coded, or is outside of a current row of CTUs, the candidate position C1 is used to derive the temporal merge candidate. Otherwise, for example, the CU at the candidate position C0 is available, intra coded, and in the current row of CTUs, the candidate position C0 is used to derive the temporal merge candidate.

A merge with motion vector difference (MMVD) mode can be used for a skip mode or a merge mode with a motion vector expression method. Merge candidate(s), such as used in VVC, can be reused in the MMVD mode. A candidate can be selected among the merge candidates as a starting point (e.g., an MV predictor (MVP)), and can be further expanded by the MMVD mode. The MMVD mode can provide a new motion vector expression with simplified signaling. The motion vector expression method includes the starting point and an MV difference (MVD). In an example, the MVD is indicated by a magnitude (or a motion magnitude) of the MVD, and a direction (e.g., a motion direction) of the MVD.

The MMVD mode can use a merge candidate list, such as used in VVC. In an embodiment, only candidate(s) which are of a default merge type (e.g., MRG_TYPE_DEFAULT_N) are considered for the MMVD mode. The starting point can be indicated or defined by a base candidate index (IDX). The base candidate index can indicate a candidate (e.g., the best candidate) among the candidates (e.g., the base candidates) in the merge candidate list. Table 1 shows an exemplary relationship between the base candidate index and the corresponding starting point. The base candidate index being 0, 1, 2, or 3 indicates the corresponding starting point being a $1^{st}$ MVP, a $2^{nd}$ MVP, a $3^{rd}$ MVP, or a $4^{th}$ MVP. In an example, if a number of the base candidate(s) is equal to 1, the base candidate IDX is not signaled.

TABLE 1

| Base candidate IDX | | | | |
|---|---|---|---|---|
| Base candidate IDX | 0 | 1 | 2 | 3 |
| $N^{th}$ MVP | $1^{st}$ MVP | $2^{nd}$ MVP | $3^{rd}$ MVP | $4^{th}$ MVP |

A distance index can indicate motion magnitude information of the MVD, such as the magnitude of the MVD. For example, the distance index indicates a distance (e.g., a pre-defined distance) from the starting point (e.g., the MVP indicated by the base candidate index). In an example, the distance is one of a plurality of pre-defined distances, such as shown in Table 2. Table 2 shows an exemplary relationship between the distance index and the corresponding distance (in units of samples or pixels). 1 pel in Table 2 is one sample or one pixel. For example, the distance index being 1 indicates the distance to be ½-pel or ½ samples.

TABLE 2

| Distance IDX | | | | | | | |
|---|---|---|---|---|---|---|---|
| 0 | 1 | 2 | 3 | 4 | 5 | 6 | 7 |
| Pixel distance ¼-pel | ½-pel | 1-pel | 2-pel | 4-pel | 8-pel | 16-pel | 32-pel |

A direction index can represent the direction of the MVD relative to the starting point. The direction index can represent one of a plurality of directions, such as four directions as shown in Table 3. For example, the direction index being 00 indicates the direction of the MVD being along the positive x-axis.

TABLE 3

| Direction IDX | | | | |
|---|---|---|---|---|
| Direction IDX | 00 | 01 | 10 | 11 |
| x-axis | + | − | N/A | N/A |
| y-axis | N/A | N/A | + | − |

An MMVD flag can be signaled after sending a skip and merge flag. If the skip and merge flag is true, the MMVD flag can be parsed. In an example, if the MMVD flag is equal to 1, MMVD syntaxes (e.g., including a distance index and/or a direction index) can be parsed. If the MMVD flag is not equal to 1, an AFFINE flag can be parsed. If the AFFINE flag is equal to 1, the AFFINE mode is used to code the current block. If the AFFINE flag is not equal to 1, a skip/merge index can be parsed for a skip/merge mode, such as used in VTM.

Figure 13:
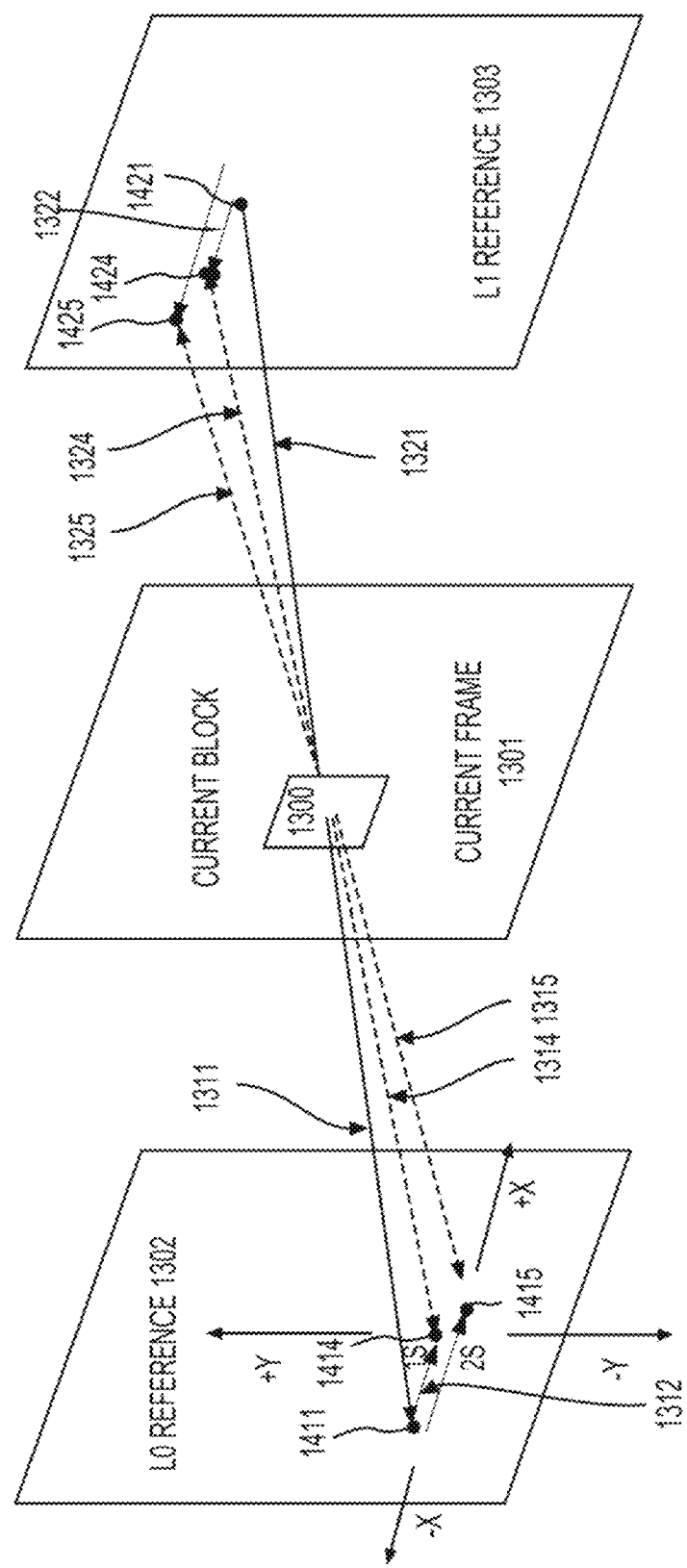

FIGS. 13-14 show an example of a search process in the MMVD mode. By performing the search process, indices including a base candidate index, a direction index, and/or a distance index can be determined for a current block (1300) in a current picture (or referred to as a current frame) (1301).

A first motion vector (MV) (1311) and a second MV (1321) belonging to a first merge candidate are shown. The first merge candidate can be a merge candidate in a merge candidate list constructed for the current block (1300). The first and second MVs (1311) and (1321) can be associated with two reference pictures (1302) and (1303) in reference picture lists L0 and L1, respectively. Accordingly, two starting points (1411) and (1421) in FIGS. 13-14 can be determined at the reference pictures (1302) and (1303), respectively.

In an example, based on the starting points (1411) and (1421), multiple predefined points (e.g., 1-12 shown in FIG. 14) extending from the starting points (1411) and (1421) in vertical directions (represented by +Y, or −Y) or horizontal directions (represented by +X and −X) in the reference pictures (1302) and (1303) can be evaluated. In one example, a pair of points mirroring each other with respect to the respective starting point (1411) or (1421), such as the pair of points (1414) and (1424), or the pair of points (1415) and (1425), can be used to determine a pair of MVs (1314) and (1324) or a pair of MVs (1315) and (1325) which may form MV predictor (MVP) candidates for the current block (1300). The MVP candidates determined based on the predefined points surrounding the starting points (1411) and/or (1421) can be evaluated. Referring to FIG. 13, an MVD (1312) between the first MV (1311) and the MV (1314) has a magnitude of 1S. An MVD (1322) between the second MV (1321) and the MV (1324) has a magnitude of 1S. Similarly, an MVD between the first MV (1311) and the MV (1315) has a magnitude of 2S. An MVD between the second MV (1321) and the MV (1325) has a magnitude of 2S.

In addition to the first merge candidate, other available or valid merge candidates in the merge candidate list of the current block (1300) can also be evaluated similarly. In one example, for a uni-predicted merge candidate, only one prediction direction associated with one of the two reference picture lists is evaluated.

In an example, based on the evaluations, a best MVP candidate can be determined. Accordingly, a best merge candidate corresponding to the best MVP candidate can be selected from the merge list, and a motion direction and a motion distance can also be determined. For example, based on the selected merge candidate and the Table 1, a base candidate index can be determined. Based on the selected MVP, such as that corresponding to the predefined point (1415) (or (1425)), a direction and a distance (e.g., 2S) of the point (1415) with respect to the starting point (1411) can be determined. According to Table 2 and Table 3, a direction index and a distance index can accordingly be determined.

As described above, two indices, such as a distance index and a direction index can be used to indicate an MVD in the MMVD mode. Alternatively, a single index can be used to indicate an MVD in the MMVD mode, for example, with a table that pairs the single index with the MVD.

Figure 15:
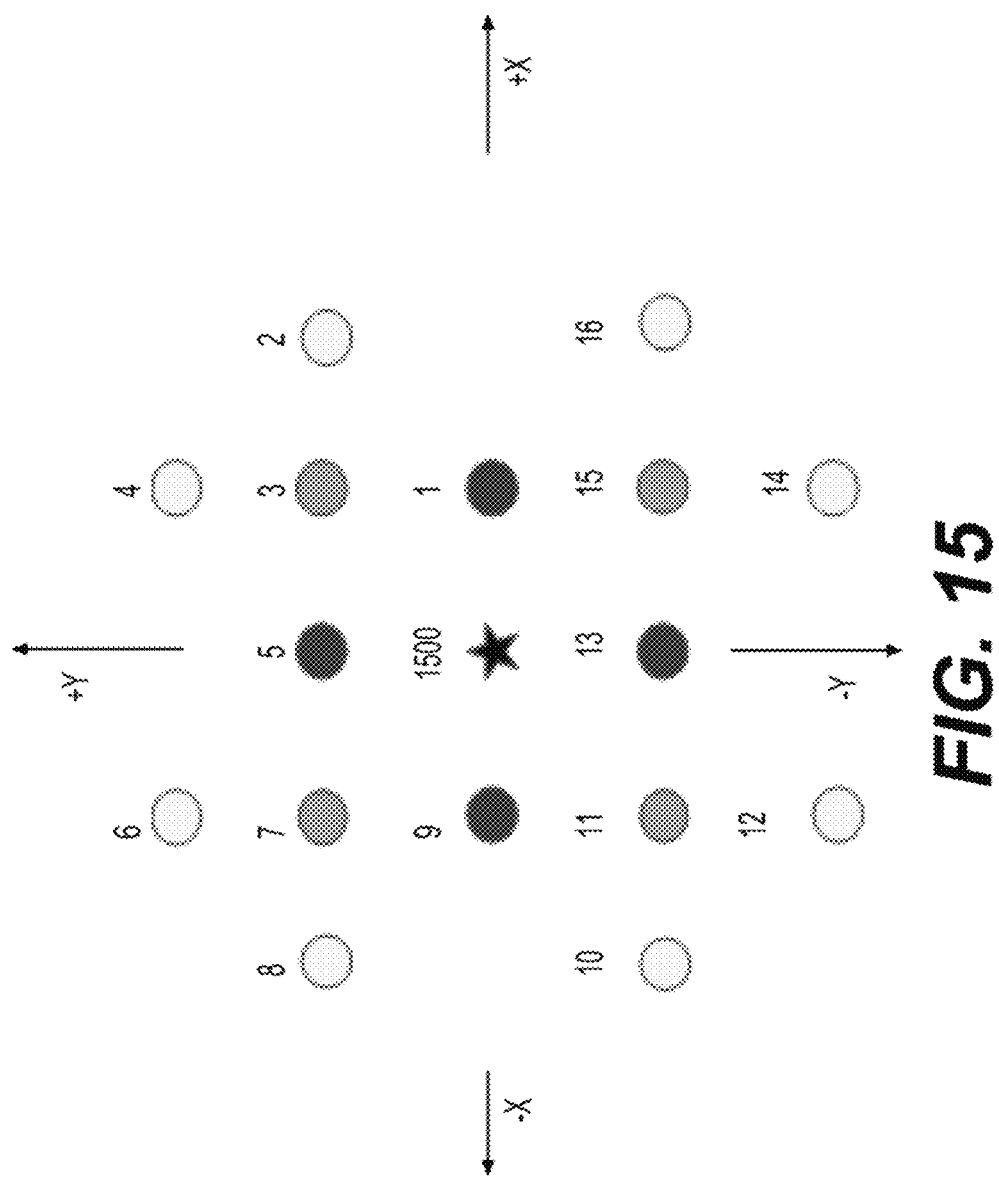
FIG. 15 shows exemplary additional refinement positions along multiple diagonal angles in the MMVD mode.

Template matching (TM) based candidate reordering can be used in some prediction modes, such as the MMVD mode and an affine MMVD mode. In an embodiment, MMVD offsets are extended for the MMVD mode and the affine MMVD mode. FIG. 15 shows additional refinement positions along multiple diagonal angles, such as k×π/8 diagonal angles where k is an integer from 0 to 15. The additional refinement positions along the multiple diagonal angles can increase a number of directions, for example, from 4 directions (e.g., +X, −X, +Y, and −Y) to 16 directions (e.g., k=0, 1, 2, ... , 15). In an example, each of the 16 directions is represented by an angle between the +X direction and a direction indicated by a center point (1500) and one of points 1-16. For example, the point 1 indicates +X direction with an angle of 0 (i.e., k=0), the point 2 indicates a direction along an angle of 1×π/8 (i.e., k=1), and the like.

The TM can be performed in the MMVD mode. In an example, for each MMVD refinement position, a TM cost can be determined based on a current template of a current block and one or more reference templates. The TM cost can be determined using any method, such as a sum of absolute difference (SAD) (e.g., an SAD cost), a sum of absolute transformed differences (SATD), sum of squared errors (SSE), a mean removed SAD/SATD/SSE, a variance, a partial SAD, a partial SSE, a partial SATD, or the like.

The current template of the current block can include any suitable samples, such as one row of samples above the current block and/or one column of samples to the left of the current block. Based on the TM costs (e.g., SAD costs) between the current template and corresponding reference templates for the refinement positions, MMVD refinement positions, for example, all possible MMVD refinement positions (e.g., 16×6 representing 16 directions and 6 magnitudes) for each base candidate (e.g., an MVP) can be reordered. In an example, top MMVD refinement positions with the smallest TM costs (e.g., the smallest SAD costs) are kept as available MMVD refinement positions for MMVD index coding. For example, a subset (e.g., 8) of the MMVD refinement positions with the smallest TM costs is used for the MMVD index coding. For example, an MMVD index indicates which one of the subset of the MMVD refinement positions with the smallest TM costs is selected to code the current block. In an example, an MMVD index of 0 indicates that an MVD (e.g., an MMVD refinement position) that corresponds to the smallest TM cost is used to code the current block. The MMVD index can be binarized, for example, by the Rice code with a parameter equal to 2.

In an embodiment, in addition to the MMVD offset extension described above, such as in FIG. 15, an affine MMVD reordering is extended where additional refinement positions along k×π/4 diagonal angles are added. After reordering, top ½ refinement positions with the smallest TM costs (e.g., SAD costs) are kept to code the current block To improve the coding efficiency and reduce the transmission overhead of MV(s), a subblock level MV refinement can be applied to extend a CU level temporal motion vector prediction (TMVP). In an example, a subblock-based TMVP (SbTMVP) mode allows inheriting motion information at a subblock-level from a collocated reference picture. The collocated reference picture can be indicated by a reference index in a syntax, such as a high-level syntax (e.g., a picture header, a slice header). Each subblock of a current CU (e.g., a current CU with a large size) in a current picture can have respective motion information without explicitly transmitting a block partition structure or the respective motion information. In the SbTMVP mode, motion information for each subblock can be obtained as follows, for example, in three steps. In the first step, a displacement vector (DV) of the current CU can be derived. The DV can indicate a block in the collocated reference picture, for example, the DV points from the current block in the current picture to the block in the collocated reference picture. Thus, the block indicated by the DV is considered as being collocated with the current block and is referred to as a collocated block of the current block. In the second step, availability of an SbTMVP candidate can be checked and a central motion (e.g., a central motion of the current CU) can be derived. In the third step, subblock motion information can be derived from a corresponding subblock in the collocated block using the DV. The three steps can be combined into one or two steps, and/or an order of the three steps may be adjusted.

Unlike TMVP candidate derivation which derives temporal MVs from a collocated block in a reference frame or a reference picture, in the SbTMVP mode, a DV (e.g., a DV derived from an MV of a left neighboring CU of the current CU) can be applied to locate a corresponding subblock in the collocated reference picture for each subblock in the current CU that is in the current picture. If the corresponding subblock is not inter-coded, motion information of the current subblock can be set to be the central motion of the collocated block.

The SbTMVP mode can be supported by various video coding standards including for example VVC. Similar to the TMVP mode, for example, in HEVC, in the SbTMVP mode, a motion field (also referred to as a motion information field or an MV field) in the collocated reference picture can be used to improve MV prediction and a merge mode for CUs in the current picture. In an example, the same collocated reference picture used by the TMVP mode is used in the SbTMVP mode. In an example, the SbTMVP mode differs from the TMVP mode in the following aspects: (i) the TMVP mode predicts motion information at the CU level while the SbTMVP mode predicts motion information at a sub-CU level; (ii) the TMVP mode fetches the temporal MVs from the collocated block in the collocated reference picture (e.g., the collocated block is the bottom-right or a center block relative to the current CU) while the SbTMVP mode can apply a motion shift before fetching the temporal motion information from the collocated reference picture. In an example, the motion shift used in the SbTMVP mode is obtained from an MV of one of spatial neighboring blocks of the current CU.

Figure 16:
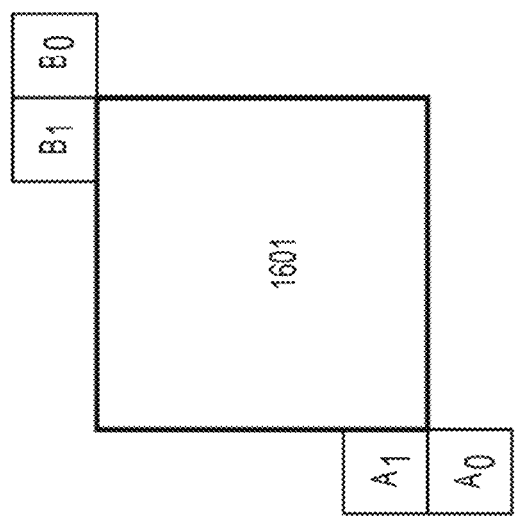
FIGS. 16-17 show an exemplary subblock-based temporal motion vector prediction (SbTMVP) process used in an SbTMVP mode.
Figure 17:
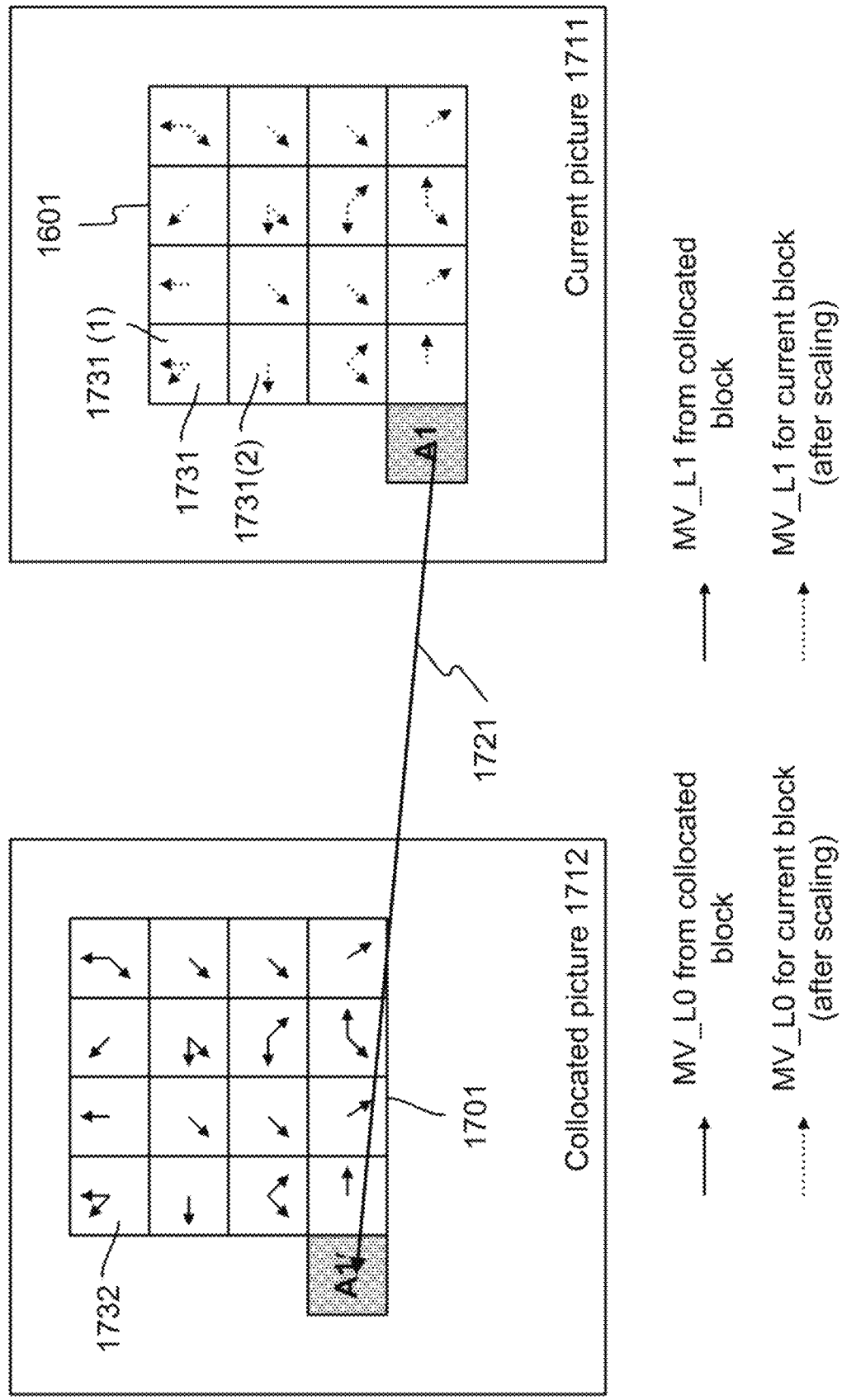

FIGS. 16-17 show an exemplary SbTMVP process used in the SbTMVP mode. The SbTMVP process can predict MVs of sub-CUs (e.g., subblocks) within a current CU (e.g., a current block) (1601) in a current picture (1711), for example, in two steps. In the first step, a spatial neighbor (e.g., A1) of the current block (1601) in FIGS. 16-17 is examined. If the spatial neighbor (e.g., A1) has an MV (1721) that uses a collocated reference picture (1712) as a reference picture of the spatial neighbor (e.g., A1), the MV (1721) can be selected to be a motion shift (or a DV) to be applied to the current block (1601). If no such MV (e.g., an MV that uses the collocated reference picture (1712) as a reference picture) is identified, the motion shift or the DV can be set to a zero MV (e.g., (0, 0)). In some examples, MV(s) of additional spatial neighbors, such as A0, B0, B1, and the like are checked if no such MV is identified for the spatial neighbor A1.

In the second step, the motion shift or the DV (1721) identified in the first step can be applied to the current block (1601) (e.g., the DV (1721) is added to coordinates of the current block) to obtain sub-CU level motion information (e.g., including MVs and reference indices) from the collocated reference picture (1712). In the example shown in FIG. 17, the motion shift or the DV (1721) is set to be the MV of the spatial neighbor A1 (e.g., a block A1) of the current block (1601). For each sub-CU or subblock (1731) in the current block (1601), motion information of a corresponding collocated block (1701) (e.g., motion information of the smallest motion grid that covers a center sample of the collocated block (1701)) in the collocated reference picture (1712) can be used to derive the motion information for the sub-CU or subblock (1731). After the motion information of the collocated sub-CU (1732) in the collocated block (1701) is identified, the motion information of the collocated sub-CU (1732) can be converted to the motion information (e.g., MV(s) and one or more reference indices) of the current sub-CU (1731), for example, using a scaling method, such as in a similar way as the TMVP process used in HEVC, where temporal motion scaling is applied to align reference pictures of temporal MVs to reference pictures of a current CU.

The motion field of the current block (1601) derived based on the DV (1721) can include motion information of each subblock (1731) in the current block (1601), such as MV(s) and one or more associated reference indices. The motion field of the current block (1601) can also be referred to as an SbTMVP candidate and corresponds to the DV (1721).

FIG. 17 shows an example of the motion field or the SbTMVP candidate of the current block (1601). For example, the motion information of the subblock (1731(1)) that is bi-predicted includes a first MV, a first index indicating a first reference picture in a reference picture list 0 (L0), a second MV and a second index indicating a second reference picture in a reference picture list 1 (L1). In an example, the motion information of the subblock (1731(2)) that is uni-predicted includes an MV and an index indicating a reference picture in L0 or L1.

In an example, the DV (1721) is applied to a central position of the current block (1601) to locate a displaced central position in the collocated reference picture (1712). If a block including the displaced central position is not inter-coded, the SbTMVP candidate is considered not available. Otherwise, if a block (e.g., the collocated block (1701)) including the displaced central position is inter-coded, the motion information of the central position of the current block (1601), referred to as central motion of the current block (1601), can be derived from motion information of the block including the displaced central position in the collocated reference picture (1712). In an example, a scaling process can be used to derive the central motion of the current block (1601) from the motion information of the block including the displaced central position in the collocated reference picture (1712). When the SbTMVP candidate is available, the DV (1721) can be applied to find the corresponding subblock (1732) in the collocated reference picture (1712) for each subblock (1731) of the current block (1601). The motion information of the corresponding subblock (1732) can be used to derive the motion information of the subblock (1731) in the current block (1601), such as in the same way used to derive the central motion of the current block (1601). In an example, if the corresponding subblock (1732) is not inter-coded, the motion information of the current subblock (1731) is set to be the central motion of the current block (1601).

In some examples, such as in VVC, a combined subblock based merge list which includes an SbTMVP candidate and affine merge candidate(s) is used in the signaling of a subblock based merge mode. The SbTMVP mode can be enabled or disabled by a sequence parameter set (SPS) flag. If the SbTMVP mode is enabled, the SbTMVP candidate (or the SbTMVP predictor) can be added as the first entry of the subblock based merge list including subblock based merge candidates, and followed by the affine merge candidate(s). The size of the subblock based merge list can be signaled in the SPS. In an example, the maximum allowed size of the subblock based merge list is 5 in VVC. In an example, multiple SbTMVP candidates are included in the subblock based merge list.

In some examples, such as in VVC, the sub-CU size used in the SbTMVP mode is fixed to be 8×8, such as used for the affine merge mode. In an example, the SbTMVP mode is only applicable to a CU with both a width and a height being larger than or equal to 8. The subblock size (e.g., 8×8) may be configurable to other sizes, such as 4×4 in an ECM software model use for exploration beyond VVC. In an example, multiple collocated reference pictures, such as two collocated frames, are utilized to provide temporal motion information for the SbTMVP and/or the TMVP in the AMVP mode.

In some examples of the SbTMVP mode, such as in VVC and ECM, a DV (e.g., the DV (1721) in FIG. 17) of a current CU is derived from an MV of a neighboring CU of the current CU. In some examples, a DV offset (DVO) is used in the SbTMVP mode. In an example, to get a more accurate matching, an initial DV (e.g., derived from an MV of a neighboring CU of the current CU) can be modified by the DV offset to determine an updated DV'. In an example, the updated DV' is a vector sum of the initial DV and the DVO. The initial DV can be determined using any method, such as described in FIGS. 16-17. By using the DVO, a location of a collocated CU (or a collocated block) within a collocated reference picture can be adjusted, and thus an MV field of the collocated CU (or the collocated block) can vary based on the DVO. Referring to FIG. 17, instead of using the initial DV (e.g., the DV (1721)) that is the MV of the spatial neighbor A1, the updated DV' can be used to determine a collocated block for the current block.

The DVO can be indicated, for example, by signaling an index indicating the DVO from DVO candidates (e.g., possible DVOs to be used by the current block). One or more indices can be signaled to indicate which DVO candidate of the DVO candidates is to be selected as the DVO.

In an example, the DVO is signaled using the MMVD mode. The SbTMVP mode with the DVO signaled using the MMVD mode can be referred to as the SbTMVP-MMVD mode. Embodiments described in the disclosure can be applied with the SbTMVP mode or a variation of the SbTMVP mode (e.g., the SbTMVP-MMVD mode). For examples, two indices including a first index (e.g., a distance index) indicating a magnitude of a DVO candidate and a second index (e.g., a direction index) indicating a direction of the DVO candidate are signaled to indicate the DVO candidate, such as described in Tables 2-3.

Referring back to FIG. 14, the distance index and the direction index may be predefined as described above with reference to the MMVD mode. The distance index indicates motion magnitude information such as the magnitude of the DVO. For example, the distance index indicates a predefined distance from the starting point (e.g., the initial DV). In an example, available predefined distances are shown in Table 2. The direction index represents a direction of the DVO relative to the starting point (e.g., the initial DV). The direction index can indicate one of multiple directions, such as the four directions shown in Table 3.

In an embodiment, the DVO is signaled directly, for example, using any signaling method used to signal an MVD, such as in the AMVP mode.

Bilateral matching (BM)-based motion vector (MV) refinement can be applied to refine motion information of a block (or a subblock) based on matching reference blocks (or reference subblocks) in two respective reference pictures, for example, by minimizing a distortion between two reference blocks (or two reference subblocks) in a reference picture list L0 and a reference picture list L1.

Examples of the BM-based MV refinement include DMVR or a variation thereof, a multi-pass (MP) decoder-side motion vector refinement (MP-DMVR) or a variation thereof, and/or the like. In order to increase the accuracy of the MVs of the merge mode, a BM-based DMVR can be applied, such as in VVC. In a bi-prediction operation, refined MVs can be searched around initial MVs in the reference pictures in L0 and L1. The BM method can calculate a distortion between two reference blocks in the reference pictures in L0 and L1.

In an embodiment, the DMVR can be applied to a CU (1801) in a current picture (1811) coded in the regular merge mode, such as in VVC. An initial MV pair (e.g., MV0-MV1) is an input to the DMVR process, and may also be referred to as an input or an input MV pair. The initial MV pair can be obtained from a regular merge candidate, such as in the regular merge mode. MV0 indicates a block (1831) in a first reference picture (1812) in L0 and MV1 indicates a block (1832) in a second reference picture (1813) in L1.

The BM can be applied in the DMVR to refine the input MV pair. An output of the DMVR (or a refined MV pair MV0'-MV1') can be determined. The refined MV pair can be related to the input MV pair as follows.

$$mv_{refinedL0} = mv_{L0} + \Delta mv$$

$$mv_{refinedL1} = mv_{L1} - \Delta mv \qquad \text{Eq. (1)}$$

In Eq. 1, parameters $mv_{L0}$ and $mv_{L1}$ represent MV0 and MV1, respectively. Parameters $mv_{refinedL0}$ and $mv_{refinedL1}$ represent MV0' and MV1', respectively. A motion vector difference (MVD) Amy can be applied to the input MV pair to obtain the refined MV pair by using an MVD mirroring property, and Amy is applied to MV0 and (−Δmv) is applied to MV1. In an example, MV0 and MV1 point to two different reference pictures (1812)-(1813) that have an equal difference in a picture order count (POC) to the current picture (1811) and the two reference pictures (1812)-(1813) are at different temporal directions. For example, a first POC difference (ΔPOC1) is a POC of the reference picture (1812) minus the POC of the current picture (1811), and a second POC difference (ΔPOC2) is a POC of the reference picture (1813) minus the POC of the current picture (1811)). The first POC difference and the second POC difference have the same magnitude and different signs, for example, ΔPOC1=−ΔPOC2.

The refined MVs can be used in the motion compensated prediction of a luma component and a chroma component.

Figure 18:
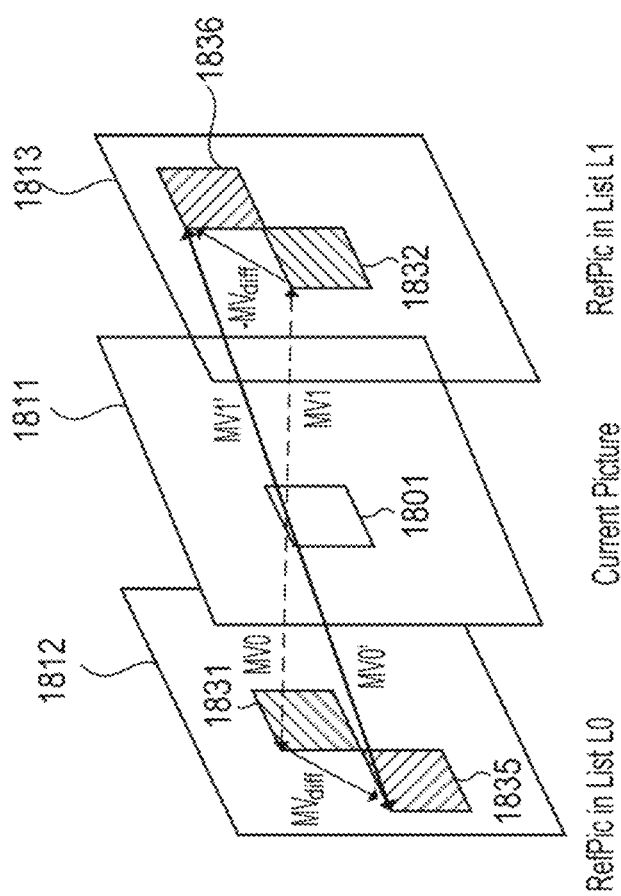
FIG. 18 shows an example of bilateral matching based decoder side motion vector refinement (DMVR).

In an example, the DMVR shown in FIG. 18 is used to refine an MV pair of a block, when the block size satisfies a condition, such as the block size is less than or equal to a threshold $M_D \times N_D$ (e.g., 16×16). $M_D$ and $N_D$ are positive integers. $M_D$ and $N_D$ can be identical or different.

In another embodiment, a luma coded block larger than the threshold $M_D \times N_D$ (e.g., 16×16) can be divided into subblocks having a size of, for example, $M_D \times N_D$ (e.g., 16×16) for the MV refinement process. The DMVR, such as shown in FIG. 18, can be applied to each of the subblocks to refine an MV pair of the respective subblock. In this case, the blocks shown in FIG. 18 (e.g., (1801), (1831)-(1832), and (1835)-(1836)) represent subblocks.

The DMVR can be applied using any suitable bilateral matching methods. In an example, the DMVR is applied in multiple steps as described below. The Amy in Eq. 1 can be derived independently for each block or subblock in the following two steps including an integer precision motion search (or the integer sample offset search) and a fractional motion search. The descriptions below are given using a subblock as an example, the descriptions can be suitably adapted to a block.

The subblock motion compensation (MC) can be applied using the refined MV pair $\{mv_{redinedL0}, mv_{refinedL1}\}$.

In the integer sample offset search in the DMVR, a search space can include multiple (e.g., 25) MV pair candidates, such as described in Eq. 2.

$$mv_{L0(i,j)} = mv_{L0(0,0)} + (i,j)$$

$$mv_{L1(i,j)} = mv_{L1(0,0)} - (i,j) \quad \text{Eq. (2)}$$

where (i, j) represents the coordinate of a search point around the initial MV pair $\{mv_{L0(0,0)}, mv_{L1(0,0)}\}$. In an example, i and j are integers between −2 and 2 inclusive, and the 25 MV pair candidates are used. Two reference blocks can be indicated by each MV pair candidate $\{mv_{L0(i,j)}, mv_{L1(i,j)}\}$ of the 25 MV pair candidates. A distortion or a difference (e.g., an SAD) between the two reference blocks can be determined, for example, using Eqs. (3)-(5). An SAD of the initial MV pair (e.g., i=j=0) can be calculated first.

$$SAD(i,j) = K \sum_{n=0}^{\frac{H}{2}} \sum_{m=0}^{W} \textit{diff}_{m,n} \quad \text{Eq. (3)}$$

$$\textit{diff}_{m,n} = \text{abs}(P0_{i,j}[m+i, 2n+j] - P1_{i,j}[m-i, 2n-j]) \quad \text{Eq. (4)}$$

$$K = \begin{cases} 3/4 & i=0, j=0 \\ 1 & \text{otherwise} \end{cases} \quad \text{Eq. (5)}$$

In Eq. 3, W and H are the weight and height of the subblock. If the SAD of the initial MV pair is smaller than a threshold, the integer sample offset search stage of the DMVR can be terminated. Otherwise, SADs of the remaining 24 points can be calculated and checked, for example, in a raster scanning order. The point (e.g., an (i, j) pair) or the MV pair with the smallest SAD can be selected as the output of the integer sample offset search stage. To reduce the penalty of the uncertainty of the DMVR refinement, the initial MV pair may be favored during the DMVR process. For example, based on Eqs. 3 and 5, a factor K associated with the difference (e.g., SAD) between the reference blocks indicated by the initial MV pair (e.g., i=j=0) is decreased by ¼ from a factor K associated with an SAD between the reference blocks indicated by another pair of MV candidate (e.g., Δmv=(i, j)).

In addition to SAD, other functions that determine a difference between two reference blocks indicated by a pair of MVs $\{mv_{L0(i,j)}, mv_{L1(i,j)}\}$ can be used, such as an SATD, an SSE, a variance, a partial SAD, a partial SSE, a partial SATD, or the like.

In the fractional sample offset search in the DMVR, the candidate MV pair selected in the integer sample offset search step can be further refined. To reduce the calculational complexity, the fractional sample refinement can be derived using a parametric error surface equation instead of an additional search that compares a difference of two reference blocks (e.g., a SAD comparison). The fractional sample refinement can be conditionally invoked based on the output of the integer sample search stage. When the integer sample search stage is terminated with a center having the smallest SAD, the fractional sample refinement can be further applied. In the parametric error surface based sub-pixel offset estimation, the center position cost (e.g., E(0,0)) and the costs at four neighboring positions (e.g., E(−1,0), E(1,0), E(0, −1), E(0,1)) from the center can be used to fit a 2-D parabolic error surface equation as below.

$$SAD(x,y) = \alpha(x-x_{min})^2 + \beta(y-y_{min})^2 + \gamma \quad \text{Eq. (6)}$$

where $(x_{min}, y_{min})$ corresponds to the fractional position with the least cost and γ corresponds to the minimum cost value. Eq. 6 can be fitted to 5 of the 25 SAD costs calculated in the first step (e.g., the integer sample offset search) to determine the 5 parameters α, β, γ, $x_{min}$, and $y_{min}$. The 5 SAD costs include E(−1,0), E(1,0), E(0,0), E(0, −1), and E(0,1). Solving Eq. 6 with the cost values (e.g., E(−1,0), E(1,0), E(0,0), E(0, −1), E(0,1)) of the five search points, $x_{min}$ and $y_{min}$ can be computed as:

$$x_{min} = (E(-1,0) - E(1,0))/(2(E(-1,0) + E(1,0) - 2E(0,0))) \quad \text{Eq. (7)}$$

$$y_{min} = (E(0,-1) - E(0,1))/(2((E(0,-1) + E(0,1) - 2E(0,0))) \quad \text{Eq. (8)}$$

The computed fractional position xmin and ymin based on Eqs. 7-8 can be from −½-pel to ½-pel. In an example, ½-pel is half pixels. The computed fractional position (xmin, ymin) can be added to the integer distance refinement MVs to get the sub-pixel accurate refinement Amv.

In some examples, such as in VVC, the values of $x_{min}$ and $y_{min}$ are automatically constrained to be between −8 and 8 since all cost values are positive and the smallest value is E(0,0), which corresponds to a ½-pel offset (e.g., from −1/2-pel to ½-pel) with ¹⁄₁₆-th-pel (¹⁄₁₆ pixel) MV accuracy.

The two steps including the integer precision motion search and the subsequent fractional motion search can be performed in the DMVR when the DMVR is applied to a block or a subblock.

Bi-directional optical flow (BDOF) in VVC, was previously referred to as BIO in the JEM. In an example, compared to the JEM version, the BDOF in VVC is a simpler version that requires less computation, especially in terms of the number of multiplications and the size of the multiplier.

BDOF can be used to refine a bi-prediction signal of a CU at a subblock (e.g., a 4×4 subblock) level. BDOF can be applied to a CU if the CU satisfies conditions such as below:
 (1) The CU is coded using a "true" bi-prediction mode, i.e., one of the two reference pictures is prior to the current picture in a display order and the other is after the current picture in the display order,
 (2) The distances (e.g., POC difference) from two reference pictures to the current picture are the same,
 (3) Both reference pictures are short-term reference pictures,
 (4) The CU is not coded using affine mode or the SbTMVP merge mode,
 (5) CU has more than 64 luma samples,
 (6) Both CU height and CU width are larger than or equal to 8 luma samples,
 (7) BCW weight index indicates equal weight,
 (8) Weighted position (WP) is not enabled for the current CU, and
 (9) CIIP mode is not used for the current CU.

In an example, BDOF may be only applied to a luma component. The BDOF mode can be based on an optical flow concept, which assumes that a motion of an object is smooth. For each subblock (e.g., 4×4 subblock), a motion refinement $(v_x, v_y)$ can be calculated by minimizing a difference between L0 and L1 prediction samples. The motion refinement can then be used to adjust the bi-predicted sample values in the subblock. BDOF can include steps as follows:

First, horizontal and vertical gradients, $$\frac{\partial I^{(k)}}{\partial x}(i,j) \frac{\partial I^{(k)}}{\partial y}(i,j),$$

k=0,1, of the two prediction signals from the reference list L0 and the reference list L1 can be computed by directly calculating a difference between two neighboring samples. The horizontal and vertical gradients can be provided in Eqs. (9)-(10) as follows:

$$\frac{\partial I^{(k)}}{\partial x}(i,j) = \left(\left(I^{(k)}(i+1,j) \gg \text{shift1}\right) - \left(I^{(k)}(i-1,j) \gg \text{shift1}\right)\right) \quad \text{Eq. (9)}$$

$$\frac{\partial I^{(k)}}{\partial y}(i,j) = \left(\left(I^{(k)}(i,j+1) \gg \text{shift1}\right) - \left(I^{(k)}(i,j-1) \gg \text{shift1}\right)\right) \quad \text{Eq. (10)}$$

where $I^{(k)}(i,j)$ can be a sample value at coordinate (i,j) of the prediction signal in list k, k=0,1, and shift1 can be calculated based on a luma bit depth, bitDepth, as shift1=max(6, bitDepth-6).

Then, an auto- and cross-correlation of the gradients, $S_1$, $S_2$, $S_3$, $S_5$ and $S_6$, can be calculated according to Eqs. (11)-(15) as follows:

$$S_1 = \Sigma_{(i,j) \in \Omega} \text{AbS}(\psi_x(i,j)) \quad \text{Eq. (11)}$$

$$S_2 = \Sigma_{(i,j) \in \Omega} \psi_x(i,j) \cdot \text{Sign}(\psi_y(i,j)) \quad \text{Eq. (12)}$$

$$S_3 = \Sigma_{(i,j) \in \Omega} \theta(i,j) \cdot \text{Sign}(\psi_x(i,j)) \quad \text{Eq. (13)}$$

$$S_5 = \Sigma_{(i,j) \in \Omega} \text{Abs}(\psi_y(i,j)) \quad \text{Eq. (14)}$$

$$S_6 = \Sigma_{(i,j) \in \Omega} \theta(i,j) \cdot \text{Sign}(\psi_y(i,j)) \quad \text{Eq. (15)}$$

where $\psi_x(i,j)$, $\psi_y(i,j)$, and $\theta(i,j)$ can be provided in Eqs. 16-18 respectively.

$$\psi_x(i,j) = \left(\frac{\partial I^{(1)}}{\partial x}(i,j) + \frac{\partial I^{(0)}}{\partial x}(i,j)\right) \gg n_a \quad \text{Eq. (16)}$$

$$\psi_y(i,j) = \left(\frac{\partial I^{(1)}}{\partial y}(i,j) + \frac{\partial I^{(0)}}{\partial y}(i,j)\right) \gg n_a \quad \text{Eq. (17)}$$

$$\theta(i,j) = \left(I^{(1)}(i,j) \gg n_b\right) - \left(I^{(0)}(i,j) \gg n_b\right) \quad \text{Eq. (18)}$$

where $\Omega$ can be a 6×6 window around the 4×4 subblock, and the values of $n_a$ and $n_b$ can be set equal to min (1, bitDepth−11) and min (4, bitDepth−8), respectively. A different window size can be used if the subblock has a different size than 4×4.

The motion refinement $(v_x, v_y)$ can then be derived using the cross- and auto-correlation terms using Eqs. (19)-(20) as follows:

$$v_x = S_1 > 0? \quad \text{clip3}(-th'_{BIO}, th'_{BIO}, -((S_3 \cdot 2^{n_b - n_a}) \gg \lfloor \log_2 S_1 \rfloor)) : 0 \quad \text{Eq. (19)}$$

$$v_y = S_5 > 0? \text{clip3}(-th'_{BIO}, th'_{BIO}, -((S_6 \cdot 2^{n_b - n_a} - ((v_x S_{2,m}) \ll n_{S_2} + v_x S_{2,s})/2) \gg \lfloor \log_2 S_5 \rfloor)) : 0 \quad \text{Eq. (20)}$$

where $$S_{2,m} = S_2 \gg n_{S_2}, \, S_{2,s} = S_2 \& (2^{n_{S_2}} - 1), \, th'_{BIO} = 2^{max(5, BD-7)}.$$

[·] is a floor function, and $n_{S_2}=12$. Based on the motion refinement and the gradients, an adjustment can be calculated for each sample in the 4×4 subblock based on Eq. 21.

$$b(x,y) = \text{rnd}\left(\left(v_x\left(\frac{\partial I^{(1)}(x,y)}{\partial x} - \frac{\partial I^{(0)}(x,y)}{\partial x}\right) + v_y\left(\frac{\partial I^{(1)}(x,y)}{\partial y} - \frac{\partial I^{(0)}(x,y)}{\partial y}\right) + 1\right)/2\right) \quad \text{Eq. (21)}$$

Finally, the BDOF samples of the CU can be calculated by adjusting the bi-prediction samples in Eq. 22 as follows:

$$\text{pred}_{BDOF}(x,Y) = (I^{(0)}(x,y) + I^{(1)}(x,y) + b(x,y) + o_{offset}) \gg \text{shift} \quad \text{Eq. (22)}$$

Values can be selected such that multipliers in the BDOF process do not exceed 15-bits, and a maximum bit-width of the intermediate parameters in the BDOF process can be kept within 32-bits.

Figure 19:
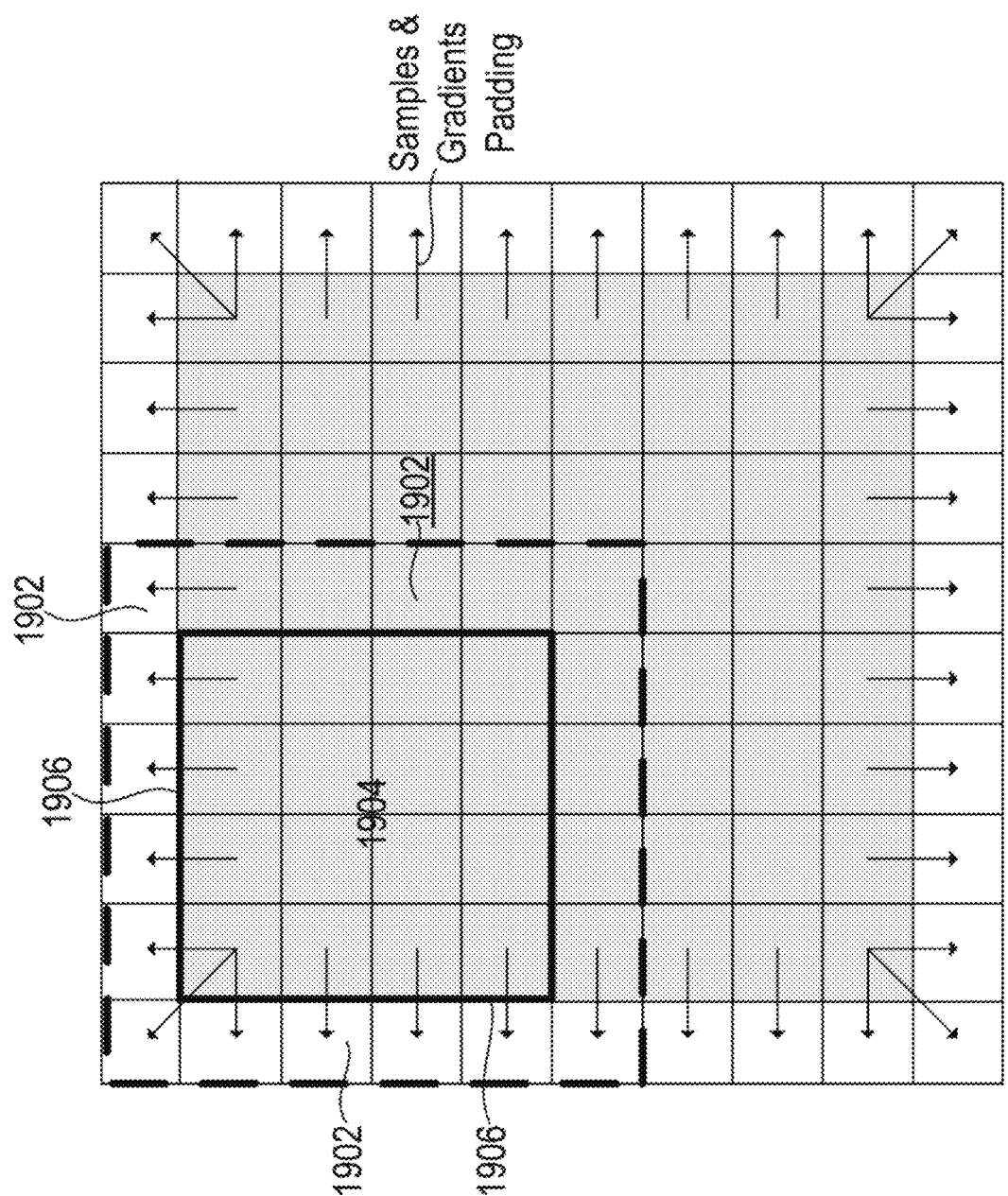
FIG. 19 shows an example of an extended coding unit (CU) region for bi-directional optical flow (BDOF).

In order to derive the gradient values, some prediction samples $I^{(k)}(i,j)$ in the list k (k=0,1) outside of the current CU boundaries need to be generated. As shown in FIG. 19, BDOF in VVC can use one extended row/column (1902) around boundaries (1906) of a CU (1904). In order to control the computational complexity of generating the out-of-boundary prediction samples, prediction samples in an extended area (e.g., unshaded region in FIG. 19) can be generated by taking the reference samples at the nearby integer positions (e.g., using a flooro operation on the coordinates) directly without interpolation, and a normal 8-tap motion compensation interpolation filter can be used to generate prediction samples within the CU (e.g., the shaded region in FIG. 19). The extended sample values can be used in gradient calculation only. For the remaining steps in the BDOF process, if sample(s) and gradient value(s) outside of the CU boundaries are used, the sample(s) and gradient value(s) can be padded (e.g., repeated) from nearest neighbors of the samples and gradient values.

In an embodiment, a BDOF, such as a sample-based BDOF can be applied. An example of sample-based BDOF is applied in ECM. In the sample-based BDOF, instead of deriving a motion refinement ($v_x$, $v_y$) on a block or subblock basis, such as described in Eqs. 19-20, the motion refinement ($v_x$, $v_y$) can be determined per sample. In an example, a coding block is divided into subblocks (e.g., 8×8 subblocks). For each subblock, whether to apply the BDOF or not can be determined by comparing a difference (e.g., an SAD) between two reference subblocks with a threshold. If the BDOF is determined to be applied to a subblock, for every sample in the subblock, a sliding window (e.g., a sliding 5×5 window) can be used and the existing BDOF process, such as described above can be applied for every sliding window to derive the motion refinement $v_x$ and $v_y$. The derived motion refinement ($v_x$, $v_y$) can be applied to adjust the bi-predicted sample value for the sample (e.g., the center sample of the sliding window).

In an embodiment, such as in ECM, an MP-DMVR can be applied. In the first pass, bilateral matching is applied to a coding block. In the second pass, BM is applied to each M1×N1 subblock (e.g., 16×16 subblock) within the coding block. In the third pass, MVs in each M2×N2 subblock (e.g., 8×8 subblock) can be refined by applying a BDOF. In an example, M1 is larger than or equal to M2, and N1 is larger than or equal to N2. The refined MVs can be stored for both spatial and temporal motion vector prediction.

In the first pass, the block-based BM MV refinement is applied to the coding block. Refined MVs (or a refined MV pair) of the coding block can be derived by applying the BM to the coding block. Similar to DMVR, in bi-prediction operation, the refined MVs can be searched around two initial MVs (MV0 and MV1) in the reference picture lists L0 and L1, respectively. The refined MVs of the first pass (MV0_pass1 and MV1_pass1) can be derived around the initial MVs based on the minimum BM cost between the two reference blocks in L0 and L1.

The BM can perform a local search to derive integer sample precision MVs (intDeltaMV). The local search can apply a search pattern (e.g., a 3×3 square search pattern) to loop through a search range [−sHor, sHor] in a horizontal direction and a search range [−sVer, sVer] in a vertical direction. The values of sHor and sVer can be determined by the block dimension. In an example, the maximum value of sHor and sVer is 8.

The BM cost (bilCost) can be calculated based on a difference (e.g., an SAD) between two reference blocks in L0 and L1. In an example, bilCost=mvDistanceCost+sadCost. A parameter sadCost indicates the difference (e.g., the SAD) between the two reference blocks in L0 and L1. A parameter mvDistanceCost indicates a cost (e.g., a rate cost) associated with a signaling overhead. When the block size cbW×cbH is greater than 64, a mean-removed SAD (MR-SAD) cost function can be applied to remove the DC effect of distortion between the two reference blocks. cbW and cbH are the block width and the block height. When the bilCost at the center point of the search pattern (e.g., the 3×3 square search pattern) has the minimum cost, the local search (e.g., the intDeltaMV local search) can be terminated. Otherwise, the current minimum cost search point becomes the new center point of the search pattern (e.g., the 3×3 square search pattern) and a search for the minimum cost can continue until the search reaches the end of the search range.

The existing fractional sample refinement can be further applied to derive the final motion refinement (e.g., the final deltaMV). The refined MVs (e.g., the output of the first pass) after the first pass can be derived as:

$$MV0\_pass1 = MV0 + deltaMV \qquad \text{Eq. (23)}$$

$$MV1\_pass1 = MV1 - deltaMV \qquad \text{Eq. (24)}$$

In the second pass, a subblock-based BM MV refinement can be performed, and a refined MV pair can be derived by applying BM to a subblock (e.g., a 16×16 grid subblock). For each subblock, the refined MV pair can be searched around the two MVs (MV0_pass1 and MV1_pass1) that are obtained from the first pass, in the reference picture lists L0 and L1, respectively. The refined MVs (MV0_pass2(sbIdx2) and MV1_pass2(sbIdx2)) can be derived based on the minimum BM cost between the two reference subblocks in L0 and L1. A parameter sbIdx2 indicates an index of the subblock.

For each subblock, BM can perform a full search to derive integer sample precision MVs (intDeltaMV) of the second pass. The full search can have a search range [−sHor, sHor] in the horizontal direction and a search range [−sVer, sVer] in the vertical direction. The values of sHor and sVer are determined by the block dimension. In an example, the maximum value of sHor and sVer is 8.

Figure 20:
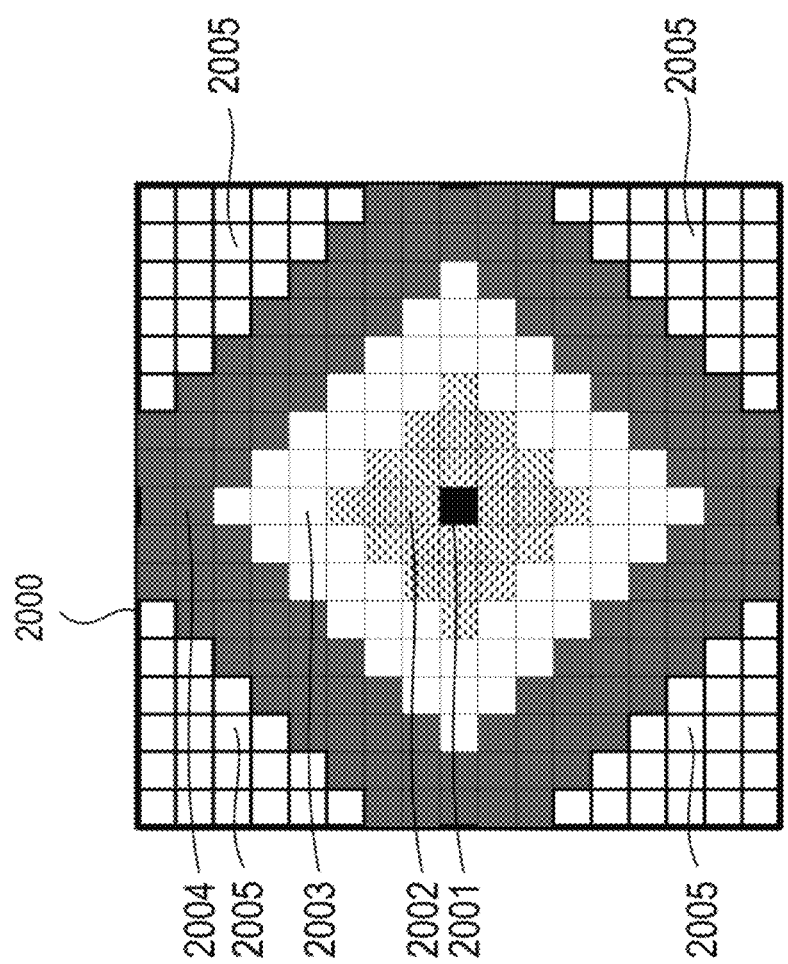
FIG. 20 shows an example of a search area including multiple search regions.

The BM cost (bilCost) can be calculated by applying a cost factor (costFactor) to a cost function (e.g., an SATD cost denoted as satdCost) between two reference subblocks as: bilCost=satdCost×costFactor. A search area (e.g., (2×sHor+1)×(2×sVer+1)) (2000) can be divided up to multiple (e.g., 5) search regions (e.g., 5 diamond shape search regions) shown in FIG. 20. In the example of FIG. 20, the search area (2000) has a square shape. The 5 search regions (2001)-(2005) include a center region (2001), 3 diamond shape search regions (2002)-(2004), and an outer region (2005).

Each search region can be assigned a cost factor (costFactor) that can be determined by a distance (e.g., intDeltaMV) between each search point and the starting MV. The search regions (2001)-(2005) can be processed in an order starting from a center (e.g., (2001)) of the search area to an outer boundary (e.g., (2005)) of the search area. For example, the search regions are processed with the following order: (2001) (e.g., the first to be processed), (2002), (2003), (2004), and (2005) (e.g., the last to be processed). In each search region, the search points can be processed in a suitable order, such as the raster scan order (e.g., from the top left to the bottom right corner of the search region). When the minimum BM cost (bilCost) within the current search region is less than a threshold (e.g., equal to the area of the subblock sbW×sbH), the integer sample precision (int-pel) full search can be terminated. Otherwise, the int-pel full search continues to the next search region until all search points in the search area (2000) are examined. In an example, additionally, if the difference between the previous minimum cost and the current minimum cost in the iteration is less than a threshold (e.g., equal to the area of the block), the search process terminates.

The DMVR fractional sample refinement, such as used in VVC, can be further applied to derive the final deltaMV (sbIdx2). The refined MVs at the second pass can be derived as:

$$MV0\_pass2(sbIdx2)=MV0\_pass1+deltaMV(sbIdx2) \quad \text{Eq. (25)}$$

$$MV1\_pass2(sbIdx2)=MV1\_pass1-deltaMV(sbIdx2) \quad \text{Eq. (26)}$$

In the third pass, a subblock-based BDOF MV refinement can be applied, and a refined MV pair can be derived by applying the BDOF to an M2×N2 subblock (e.g., an 8×8 grid subblock). For each M2×N2 subblock (e.g., 8×8 subblock), the BDOF refinement can be applied to derive scaled $v_x$ and $v_y$ without clipping starting from the refined MV pairs of the parent subblock of the second pass. The derived bioMv($v_x$, $v_y$) can be rounded to $\frac{1}{16}$-pel precision and clipped between −32 and 32.

The refined MVs (MV0_pass3(sbIdx3) and MV1_pass3(sbIdx3)) at the third pass are derived as:

$$MV0\_pass3(sbIdx3)=MV0\_pass2(sbIdx2)+bioMv \quad \text{Eq. (27)}$$

$$MV1\_pass3(sbIdx3)=MV0\_pass2(sbIdx2)-bioMv \quad \text{Eq. (28)}$$

A parameter sbIdx3 indicates an index of a subblock in the third pass.

A pass in the MP-DMVR can be omitted, modified, or replaced by another BM MV refinement method. For example, the first pass or the second pass is omitted when the block size is less than or equal to M1×N1. Additional pass(es) may be included in the MP-DMVR, for example, a sample-based BDOF is performed after the third pass. In an embodiment, the MP-DMVR includes a BM MV refinement method and a BDOF. In an embodiment, the MP-DMVR includes a DMVR and a BDOF.

In related technologies, certain coding tools such as BM-based MV refinement and BDOF (e.g., a subblock-based BDOF, a sample-based BDOF, a combination of the subblock-based BDOF and the sample-based BDOF, or a variation) are not supported in the SbTMVP mode. Lack of the MV refinement for subblocks with the bi-directional prediction in the SbTMVP may have lower coding efficiency compared with other coding tools with the BM-based MV refinement (e.g., including MP-DMVR) and/or BDOF (e.g., including sample-based BDOF).

The disclosure describes embodiments related to applying the DMVR (or a variation of the DMVR) and a pixel domain BDOF on the subblock-level temporal motion vector(s) determined with the SbTMVP mode.

In an embodiment, a current block (or a coding block) in a current picture is coded with the SbTMVP mode. The current block can include a plurality of subblocks. Motion information of each subblock in the current block can be determined based on the SbTMVP mode, such as described in FIGS. 16-17. In an example, the SbTMVP mode is performed without a DVO, for example, the DV (1721) is determined from an MV of a neighboring block of the current block. In an example, the SbTMVP mode is performed with a DVO, and an MV of a neighboring block of the current block is modified by the DVO to generate the updated DV as the DV (1721) in FIG. 17. The SbTMVP mode may be referred to as an SbTMVP-MMVD mode when the DVO is signaled based on the MMVD mode.

A first subblock in the current block is predicted in bi-prediction and motion information of the subblock can be determined based on the SbTMVP mode. In an example, the motion information includes an initial MV pair, such as a first MV and a second MV, of the subblock. According to an embodiment of the disclosure, the BM-based MV refinement and/or the BDOF can be applied to the first subblock to refine the motion information of the first subblock that is determined based on the SbTMVP mode. In an example, the BM-based MV refinement and/or the BDOF is applied to the first subblock to refine the motion information of the first subblock when a refinement condition (or a checking condition) is satisfied.

In an example, a size of the first subblock is $M_{Sub} \times N_{Sub}$. $M_{Sub}$ and $N_{Sub}$ can be positive integers. In an example, if one of $M_{Sub}$ and $N_{Sub}$ is 1, another of $M_{Sub}$ and $N_{Sub}$ is larger than 1.

The BM-based MV refinement can include any MV refinement method based on bilateral matching or any suitable combination of BM-based MV refinement methods, such as a DMVR applied to a coding block, a DMVR applied to a subblock in the coding block, an MP-DMVR described above, a variation of the MP-DMVR where a BDOF and at least a DMVR is included. The BDOF can refer to a subblock-based BDOF applied to each subblock in the coding block, a sample-based BDOF applied to each sample in a subblock, a combination of the subblock-based BDOF and the sample-based BDOF, or a suitable variation.

In an example, if the refinement condition is satisfied (e.g., being true), the BM-based MV refinement and/or the BDOF is applied to the first subblock. Otherwise, if the refinement condition is not met (e.g., being false), the BM-based MV refinement and the BDOF are implicitly not applied. For example, if the refinement condition is not met, no signaling is needed to indicate that the BM-based MV refinement and the BDOF are not to be applied to the subblock.

Subblock(s) can be selected from the plurality of subblocks based on the refinement condition.

In an embodiment, when the refinement condition is true for the selected subblock(s), the BM-based MV refinement can be applied to each of the selected subblock(s). In an example, the selected subblock(s) includes the first subblock. Refined MV pair(s) (e.g., BM-refined MV pair(s)) associated with the first subblock can be determined based on the BM-based MV refinement with the motion information (e.g., the initial MV pair) of the first subblock as an input to the BM-based MV refinement. The initial MV pair of the first subblock is derived based on the SbTMVP mode. The BM-refined MV pair(s) (e.g., an output from the BM-based MV refinement) associated with the first subblock can be applied as final MV pair(s) to predict the subblock with the inter prediction.

In an embodiment, the BM-based MV refinement is the DMVR. The DMVR can be applied to an area of the first subblock to determine a refined MV pair of the area. The area can be less than or equal to the first subblock. If the area is less than the first subblock, the DMVR can be applied to each area of the first subblock to determine a refined MV pair of the respective area.

In an example, if a subblock size of the first subblock is less than or equal to a threshold (e.g., $M_D \times N_D$), the DMVR is applied to the first subblock (e.g., the entire first subblock) to determine the refined MV pair of the first subblock based on the initial MV pair. If the subblock size is larger than the threshold, the first subblock includes multiple areas. The DMVR is applied to each of the areas to determine a refined MV pair of the respective area.

In an embodiment, the BM-based MV refinement is the MP-DMVR. In an example, the subblock size of the first subblock is larger than a threshold (e.g., $M_1 \times N_1$). A first pass (e.g., a DMVR) is applied to the first subblock to determine a first refined MV pair of the first subblock. The first subblock can include multiple first areas. A second pass (e.g., a DMVR) can be applied to each of the first areas to determine a second refined MV pair of the respective first area based on the first refined MV pair. A third pass (e.g., a BDOF) can be applied to a second area in one of the first areas to determine a third refined MV pair of the second area based on the second refined MV pair. The second area can be smaller than or equal to the first area.

In an embodiment, the BM-based MV refinement is the MP-DMVR. A first pass (e.g., a DMVR) is applied to the first subblock to determine a first refined MV pair of the first subblock. A second pass (e.g., a BDOF) can be applied to a first area in the first subblock to determine a second refined MV pair of the first area based on the first refined MV pair. The first area can be smaller than or equal to the first subblock.

In an embodiment, when the refinement condition is true for the selected subblock(s), the BDOF can be applied to each of the selected subblock(s). In an example, the selected subblock(s) includes the first subblock. Refined MV pair(s) (e.g., BDOF-refined MV pair(s)) associated with the first subblock can be determined based on the BDOF and the initial MV pair of the first subblock. The BDOF-refined MV pair(s) associated with the first subblock can be applied as final MV pair(s) to predict the first subblock with the inter prediction.

In an example, the BDOF includes the sample-based BDOF. In an example, an input to the sample-based BDOF is the initial MV pair of the first subblock. The sample-based BDOF can be applied to each sample in the first subblock to refine the initial MV pair of the first subblock. For example, a motion refinement $(v_x, v_y)$ for each sample can be determined, and a refined MV pair of each sample can be determined based on the motion refinement $(v_x, v_y)$ and the initial MV pair. The BDOF-refined MV pair(s)) associated with the first subblock can include the refined MV pair of each sample in the first subblock. For example, if the first subblock includes 16 samples, the BDOF-refined MV pair(s)) associated with the first subblock includes 16 refined MV pairs of the respective 16 samples.

Alternatively, the sample-based BDOF is applied after the subblock-based BDOF, and the input to the sample-based BDOF includes the refined MV pair(s) associated with the first subblock.

In an example, the refined MV pair(s) (e.g., the BM-refined MV pair(s) and/or the BDOF-refined MV pair(s)) associated with the first subblock may be used for motion storage, for example, for spatial and/or temporal motion vector prediction. In an example, the refined MV pair of each sample in the first subblock predicted in the sample-based BDOF can be stored. For example, the refined MV pair(s) associated with the first subblock can be stored in a motion buffer (e.g., a motion information buffer that stores motion information) as predictor(s) (e.g., spatial candidate(s), temporal candidate(s), history-based candidate(s), and/or the like) of another block or another subblock in the current picture that includes the current block or in a different picture.

In an embodiment, the following operations can be performed sequentially when the refinement condition is true for the selected subblock(s). The BM-based MV refinement can be applied for the first subblock to obtain the BM-refined MV pair(s). Subsequently, the BDOF (e.g., the sample-based BDOF) can be applied to each sample based on the BM-refined MV pair(s) to obtain the final MV pairs of the first subblock. In an example, if the BDOF and the BM-based MV refinement are both performed, the following order is required: the BDOF follows the BM-based MV refinement.

In an embodiment, syntax information (e.g., a first flag) is signaled to indicate whether the BM-based MV refinement is applied or not with the SbTMVP mode (e.g., the SbTMVP with or without the DVO). In an example, the syntax information (e.g., the first flag) is signaled at a high-level, for example, higher than a CU level. The syntax information (e.g., the first flag) can be signaled at a CTU level, a slice header, a picture header, an SPS, a picture parameter set (PPS), or the like.

Syntax information (e.g., a second flag) can be signaled to indicate whether the BDOF (e.g., the sample-based BDOF) is applied or not with the SbTMVP mode (e.g., the SbTMVP with or without the DVO). In an example, the syntax information (e.g., the second flag) is signaled at a high-level, for example, higher than a CU level. The syntax information (e.g., the second flag) can be signaled at a CTU level, a slice header, a picture header, an SPS, a picture parameter set (PPS), or the like.

In an example, the first flag and the second flag are the same flag. In an example, the first flag and the second flag are different flags.

In an embodiment, the refinement condition can depend on POCs of reference pictures and the current picture. In an example, the refinement condition includes (i) a first reference picture (e.g., associated with the first MV of the first subblock) that is prior to the current picture in a display order, and a second reference picture (e.g., associated with the second MV of the first subblock) that is after the current picture in the display order; and (ii) distances from the first reference picture and the second reference picture to the current picture are identical. In an example, the first subblock is coded with a true bi-prediction mode when the above refinement condition is satisfied. For example, the first subblock is predicted in bi-directional prediction. The MV pair (e.g., the initial MV pair) points to two different reference pictures that have equal differences in POCs to the current picture and the two reference pictures are at different temporal directions.

In an embodiment, the refinement condition can depend on POCs of reference pictures and a collocated reference picture in the SBTMVP mode. Referring to FIG. 17, to apply the BM-based MV refinement and/or the BDOF with the SbTMVP mode for the first subblock, MVs fetched from an associated subblock (e.g., (1732)) in the collocated reference picture (e.g., (1712)) in the SbTMVP mode can be examined. Depending on the MVs from the associated subblock in the collocated reference picture, whether to apply the BM-based MV refinement and/or the BDOF with the SbTMVP mode for the first subblock is determined.

In an example, the refinement condition includes (i) the MVs fetched from the associated subblock in the collocated reference picture are MV pairs used for bi-prediction and (ii) the MV pair points to two different reference pictures that have an equal difference in POCs to the collocated reference picture and the two reference pictures are at different temporal directions of the collocated picture. For example, the first reference picture is prior to the collocated reference picture in the display order, and the second reference picture is after the collocated reference picture in the display order, and distances from the first reference picture and the second reference picture to the collocated reference picture are identical.

In an embodiment, the current block (e.g., the whole or entire current block) is refined based on motion information (e.g., MVs) of one or more available bi-predicted subblocks which satisfy the refinement condition.

As described above, the motion information of each subblock in the current block can be determined based on the SbTMVP mode, such as described in FIGS. 16-17. The motion information of bi-predicted subblock(s) in the current block can be checked to determine if the refinement condition is satisfied for the respective bi-predicted subblock(s). One or more bi-predicted subblocks that satisfy the refinement condition are referred to as the one or more available bi-predicted subblocks. The motion information of one of the one or more available bi-predicted subblocks can be used as input(s) to the BM-based MV refinement (e.g., the DMVR process such as in VVC or a variation, the MP-DMVR or a variation, or the like) to refine the motion information of the current block (e.g., the entire current block), and thus refining the inter predictor (e.g., predicted samples values) of the current block.

In an embodiment, the one or more available bi-predicted subblocks include multiple bi-predicted subblocks. The motion information of each of the multiple bi-predicted subblocks may be applied as initial motion information of the current block (e.g., the whole current block) and thus used as an input to the BM-based MV refinement. A BM cost associated with the motion information of the respective bi-predicted subblock may be determined by applying the BM-based MV refinement to the whole current block. For example, each of the available bi-prediction subblock MVs may be applied as initial MV(s) (e.g., an initial MV pair) to the whole current block individually, similar or identical to the DMVR or the MP-DMVR. The motion information (e.g., an MV pair) of the bi-predicted subblock with the minimal bilateral matching cost may be selected based on the BM costs. The motion information (e.g., an MV pair) of the selected bi-predicted subblock may be applied to the whole current block to determine the inter predictor.

In an embodiment, syntax information (e.g., a block level syntax) may be signaled to indicate which subblock motion information (e.g., MV(s)), for example, among the motion information of the one or more available bi-predicted subblocks, can be used as the initial motion information (e.g., the initial MV(s)) to refine the whole current block. The refinement process may be similar or identical to the DMVR process, such as in VVC or a variation, the MP-DMVR or a variation, or the like. The motion information (e.g., MV(s)) of the subblock with the minimal bilateral matching cost may be applied to the whole current block.

In one embodiment, syntax information (e.g., a block level syntax, such as a flag) may be used to indicate whether the whole block BM-based MV refinement (e.g., the DMVR, the MP-DMVR) with the motion information of a subblock as the initial MV pair can be enabled, for example, for the current block.

Figure 21:
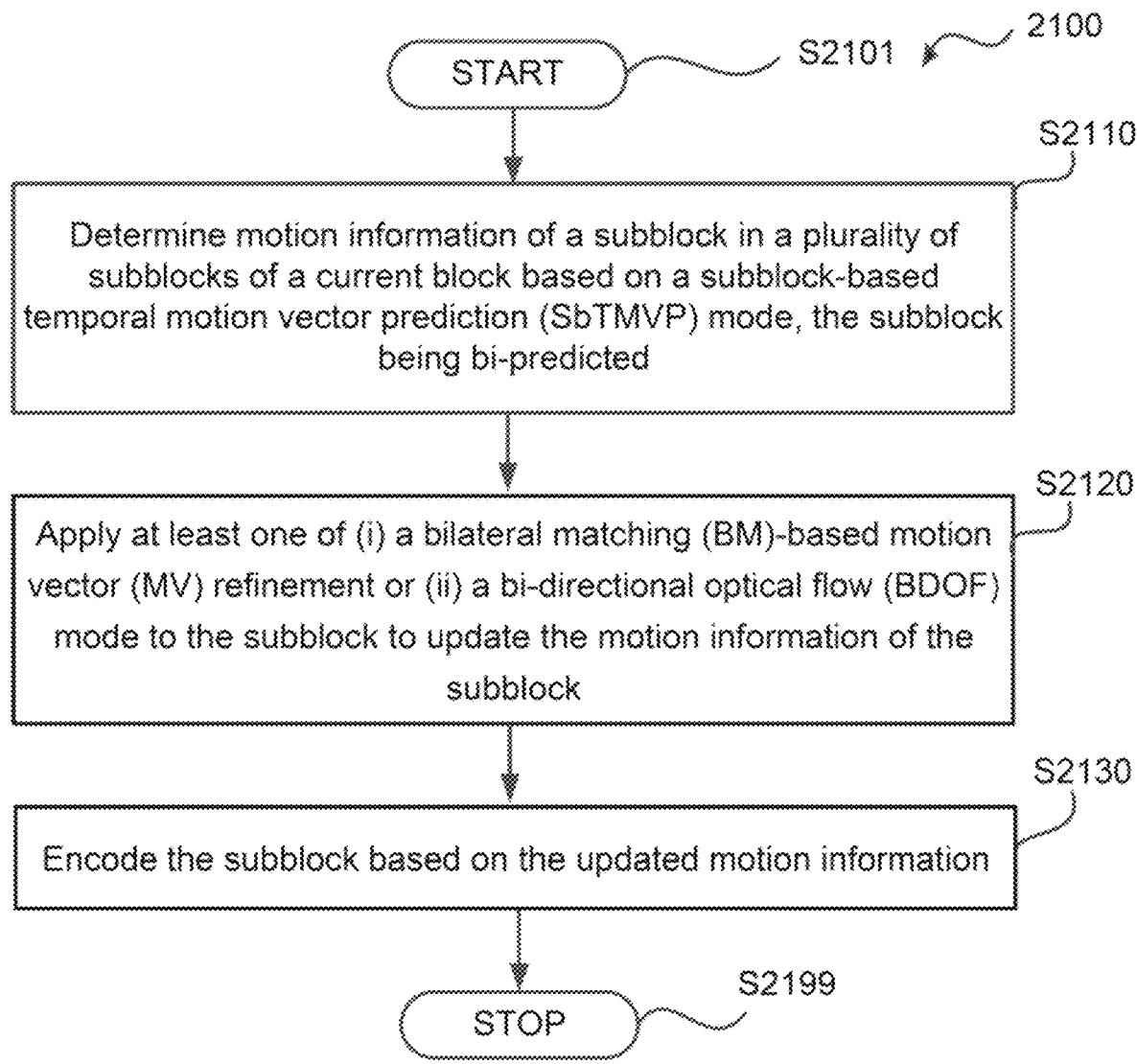
FIG. 21 shows a flow chart outlining an encoding process according to some embodiment of the disclosure.

FIG. 21 shows a flow chart outlining an encoding process (2100) according to an embodiment of the disclosure. The process (2100) can be used in a video/image encoder. The process (2100) can be executed by an apparatus for video/image coding that can include processing circuitry. In various embodiments, the process (2100) is executed by the processing circuitry, such as the processing circuitry in the terminal devices (310), (320), (330) and (340), processing circuitry that performs functions of a video encoder (e.g., (403), (603), (703)), or the like. In some embodiments, the process (2100) is implemented in software instructions, thus when the processing circuitry executes the software instructions, the processing circuitry performs the process (2100). The process starts at (S2101), and proceeds to (S2110).

At (S2110), motion information of a subblock in a plurality of subblocks of a current block can be determined based on a subblock-based temporal motion vector prediction (SbTMVP) mode. The subblock is bi-predicted with reference subblocks in a first reference picture in L0 and a second reference picture in L1, respectively. The motion information can include an initial pair of MVs indicating the reference subblocks.

At (S2120), at least one of (i) a bilateral matching (BM)-based motion vector (MV) refinement or (ii) a bi-directional optical flow (BDOF) mode can be applied to the subblock to update the motion information of the subblock.

In an example, the BM-based MV refinement is applied to determine the refined motion information of the subblock. The BM-based MV refinement can include (i) a decoder-side motion vector refinement (DMVR) or a variation thereof or (ii) a multi-pass decoder-side motion vector refinement (MP-DMVR) or a variation thereof.

At (S2130), the subblock can be encoded based on the updated motion information (or the refined motion information).

In an example, prediction information indicating that the at least one of (i) the BM-based MV refinement or (ii) the BDOF mode is applied to the subblock is encoded and included in a bitstream.

In an example, the prediction information includes a flag that indicates the at least one of (i) the BM-based MV refinement or (ii) the BDOF mode is applied to the subblock. The flag can be signaled in a high-level syntax.

The process (2100) then proceeds to (S2199), and terminates.

The process (2100) can be suitably adapted to various scenarios and steps in the process (2100) can be adjusted accordingly. One or more of the steps in the process (2100) can be adapted, omitted, repeated, and/or combined. Any suitable order can be used to implement the process (2100). Additional step(s) can be added.

In an example, the motion information includes the initial MV pair of the subblock. The BM-based MV refinement includes the DMVR. The DMVR can be applied to an area in the subblock to determine a refined MV pair of the area based on the initial MV pair. The area can be less than or equal to an area of the subblock. The area in the subblock can be reconstructed based on the refined MV pair.

In an example, the BM-based MV refinement includes the MP-DMVR. If a subblock size of the subblock is larger than a first threshold (e.g., $M_1 \times N_1$), at least one DMVR can be applied to the subblock to determine a first refined MV pair of the subblock. Subsequently, the BDOF can be applied to an area in the subblock to determine a second refined MV pair of the area based on the first refined MV pair. The area can be smaller than or equal to an area of the first subblock.

In an example, the BDOF mode is applied to each sample in the subblock to determine a refined MV pair of the respective sample. The BDOF mode includes a sample-based BDOF mode. Each sample in the subblock can be reconstructed based on the refined MV pair of the respective sample.

In an example, the refined motion information of the subblock includes one or more first refined MV pairs of respective one or more areas in the subblock. After applying the BM-based MV refinement, the BDOF mode including a sample-based BDOF mode can be applied. A refined MV pair of each sample in an area in the one or more areas can be determined based on the BDOF mode and the first refined MV pair corresponding to the area. Each sample in the area can be reconstructed based on the refined MV pair of the respective sample.

In an example, the BM-based MV refinement and the BDOF are applied based on a first reference picture and a second reference picture of the current picture. The first reference picture is prior to the current picture in a display order, and the second reference picture is after the current picture in the display order. Distances from the first reference picture and the second reference picture to the current picture are identical.

Figure 22A:
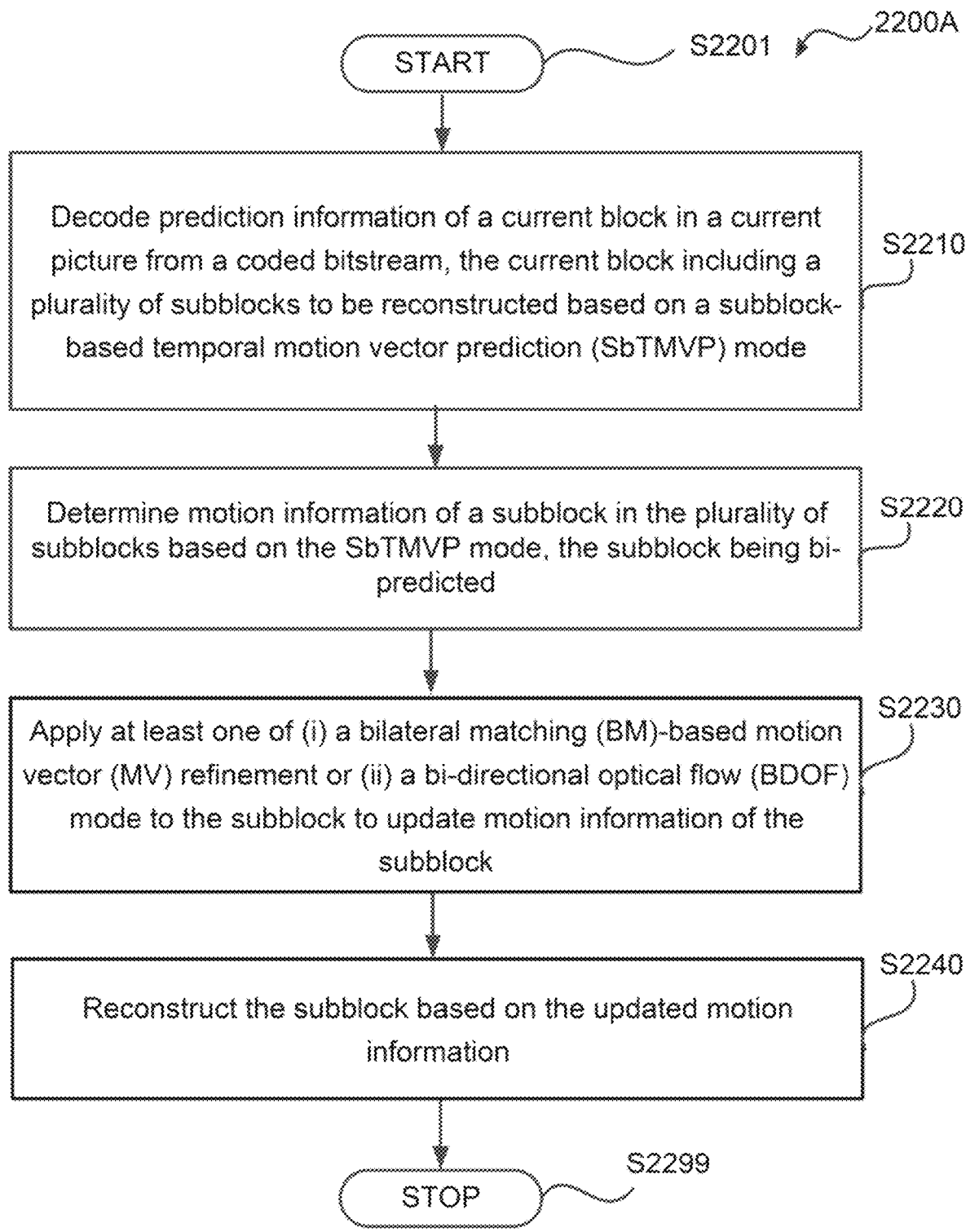
FIG. 22A shows a flow chart outlining a decoding process according to some embodiment of the disclosure.

FIG. 22A shows a flow chart outlining a decoding process (2200A) according to an embodiment of the disclosure. The process (2200A) can be used in a video/image decoder. The process (2200A) can be executed by an apparatus for video/image coding that can include receiving circuitry and processing circuitry. In various embodiments, the process (2200A) is executed by the processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2200A) is implemented in software instructions, thus when the processing circuitry executes the software instructions, the processing circuitry performs the process (2200A). The process starts at (S2201), and proceeds to (S2210).

At (S2210), prediction information of a current block in a current picture can be decoded from a coded bitstream (e.g., a coded video bitstream). The current block includes a plurality of subblocks to be reconstructed based on a subblock-based temporal motion vector prediction (SbTMVP) mode.

At (S2220), motion information of a subblock in the plurality of subblocks can be determined based on the SbTMVP mode. The subblock is bi-predicted, as described above.

At (S2230), at least one of (i) a bilateral matching (BM)-based motion vector (MV) refinement or (ii) a bi-directional optical flow (BDOF) mode can be applied to the subblock to update the motion information of the subblock.

The BM-based MV refinement can be applied to determine the refined motion information of the subblock. The BM-based MV refinement can include a decoder-side motion vector refinement (DMVR) or a multi-pass decoder-side motion vector refinement (MP-DMVR).

At (S2240), the subblock can be reconstructed based on the updated motion information (or the refined motion information).

The process (2200A) proceeds to (S2299), and terminates.

The process (2200A) can be suitably adapted to various scenarios and steps in the process (2200A) can be adjusted accordingly. One or more of the steps in the process (2200A) can be adapted, omitted, repeated, and/or combined. Any suitable order can be used to implement the process (2200A). Additional step(s) can be added.

The motion information can include an initial MV pair of the subblock.

In an example, the BM-based MV refinement includes the DMVR. The DMVR can be applied to an area in the subblock to determine a refined MV pair of the area based on the initial MV pair. The area can be less than or equal to an area of the subblock. The area in the subblock can be reconstructed based on the refined MV pair.

In an example, the BM-based MV refinement includes the MP-DMVR. If a subblock size of the subblock is larger than a first threshold $M_1 \times N_1$, at least one DMVR is applied to the subblock to determine a first refined MV pair of the subblock. The BDOF can be applied to an area in the subblock to determine a second refined MV pair of the area based on the first refined MV pair. The area is smaller than or equal to an area of the first subblock.

In an example, the BDOF mode including a sample-based BDOF mode is applied to each sample in the subblock to determine a refined MV pair of the respective sample. The BDOF mode. Each sample in the subblock is reconstructed based on the refined MV pair of the respective sample.

In an example, the refined motion information of the subblock includes one or more first refined MV pairs of respective one or more areas in the subblock. After applying the BM-based MV refinement, the BDOF mode including a sample-based BDOF mode is applied to determine a refined MV pair of each sample in an area in the one or more areas based on the first refined MV pair corresponding to the area. Each sample in the area can be reconstructed based on the refined MV pair of the respective sample.

The prediction information can indicate that the at least one of (i) the BM-based MV refinement or (ii) the BDOF mode is applied to the subblock.

The prediction information can include a flag that indicates the at least one of (i) the BM-based MV refinement or (ii) the BDOF mode is applied to the subblock. The flag can be signaled in high-level syntax (e.g., an SPS, a PPS).

The BM-based MV refinement and the BDOF are applied based on a first reference picture and a second reference picture of the current picture. The first reference picture is prior to the current picture in a display order, and the second reference picture is after the current picture in the display order. Distances from the first reference picture and the second reference picture to the current picture are identical.

Figure 22B:
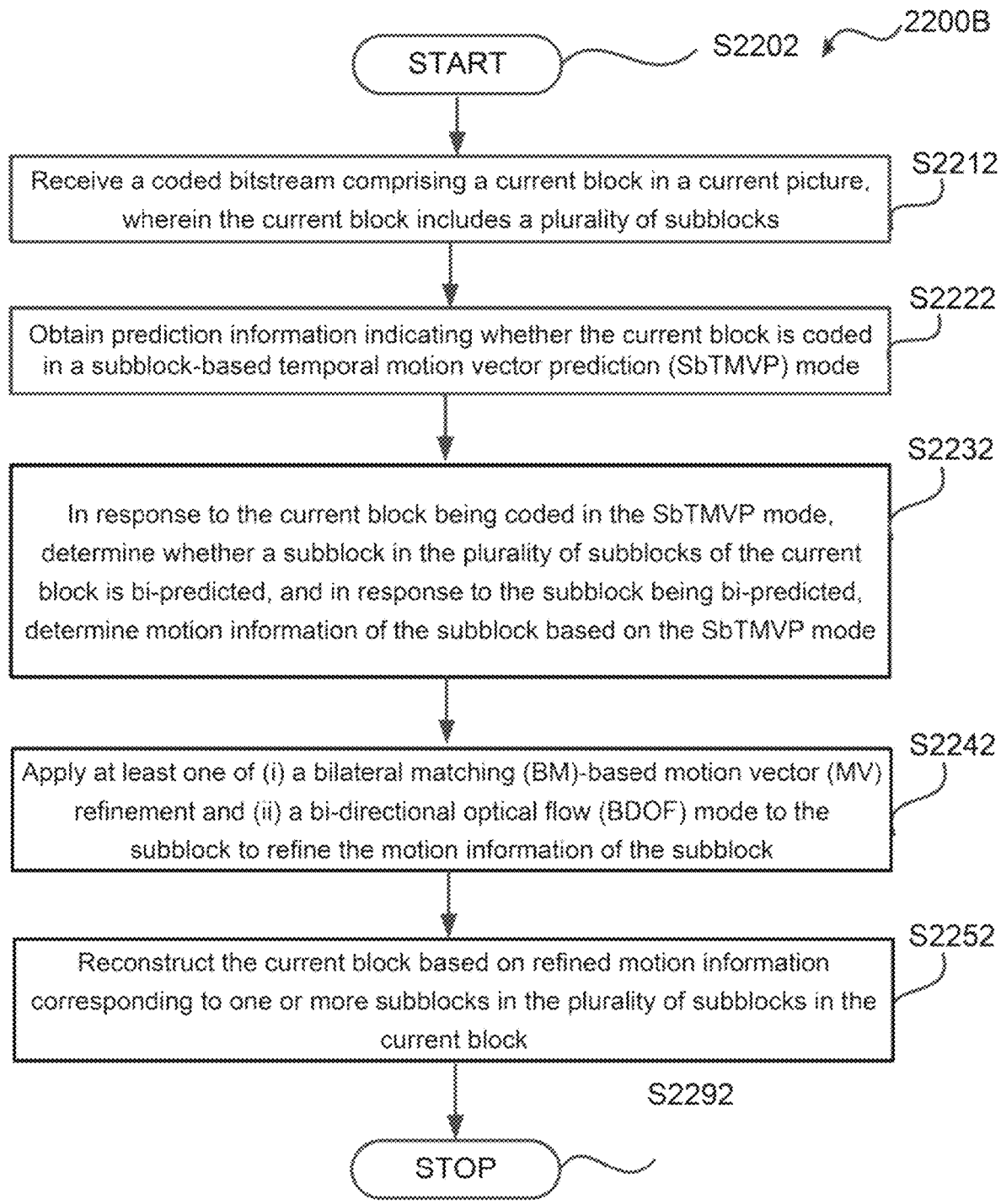
FIG. 22B shows a flow chart outlining a decoding process according to some embodiment of the disclosure.

FIG. 22B shows a flow chart outlining a process (e.g., a decoding process) (2200B) according to an embodiment of the disclosure. The process (2200B) is a variation of the process (2200A). The process (2200B) can be used in a video/image decoder. The process (2200B) can be executed by an apparatus for video/image coding that can include receiving circuitry and processing circuitry. In various embodiments, the process (2200B) is executed by the processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2200B) is implemented in software instructions, thus when the processing circuitry executes the software instructions, the processing circuitry performs the process (2200B). The process starts at (S2202), and proceeds to (S2212).

At (S2212), a coded bitstream comprising a current block in a current picture is received wherein the current block includes a plurality of subblocks.

At (S2222), prediction information indicating whether the current block is coded in a subblock-based temporal motion vector prediction (SbTMVP) mode is obtained.

At (S2232), if the current block is coded in the SbTMVP mode, whether a subblock in the plurality of subblocks of the current block is bi-predicted is determined. If the subblock is bi-predicted, motion information of the subblock is determining based on the SbTMVP mode.

At (S2242), at least one of (i) a bilateral matching (BM)-based motion vector (MV) refinement and (ii) a bi-directional optical flow (BDOF) mode is applied to the subblock to refine the motion information of the subblock.

At (S2252), the current block can be reconstructed based on refined motion information corresponding to one or more subblocks in the plurality of subblocks in the current block. The refined motion information corresponding to the one or more subblocks include the refined motion information of the subblock.

The process (2200B) proceeds to (S2292), and terminates.

The process (2200B) can be suitably adapted to various scenarios and steps in the process (2200B) can be adjusted accordingly. One or more of the steps in the process (2200B) can be adapted, omitted, repeated, and/or combined. Any suitable order can be used to implement the process (2200B). Additional step(s) can be added.

Figure 23:
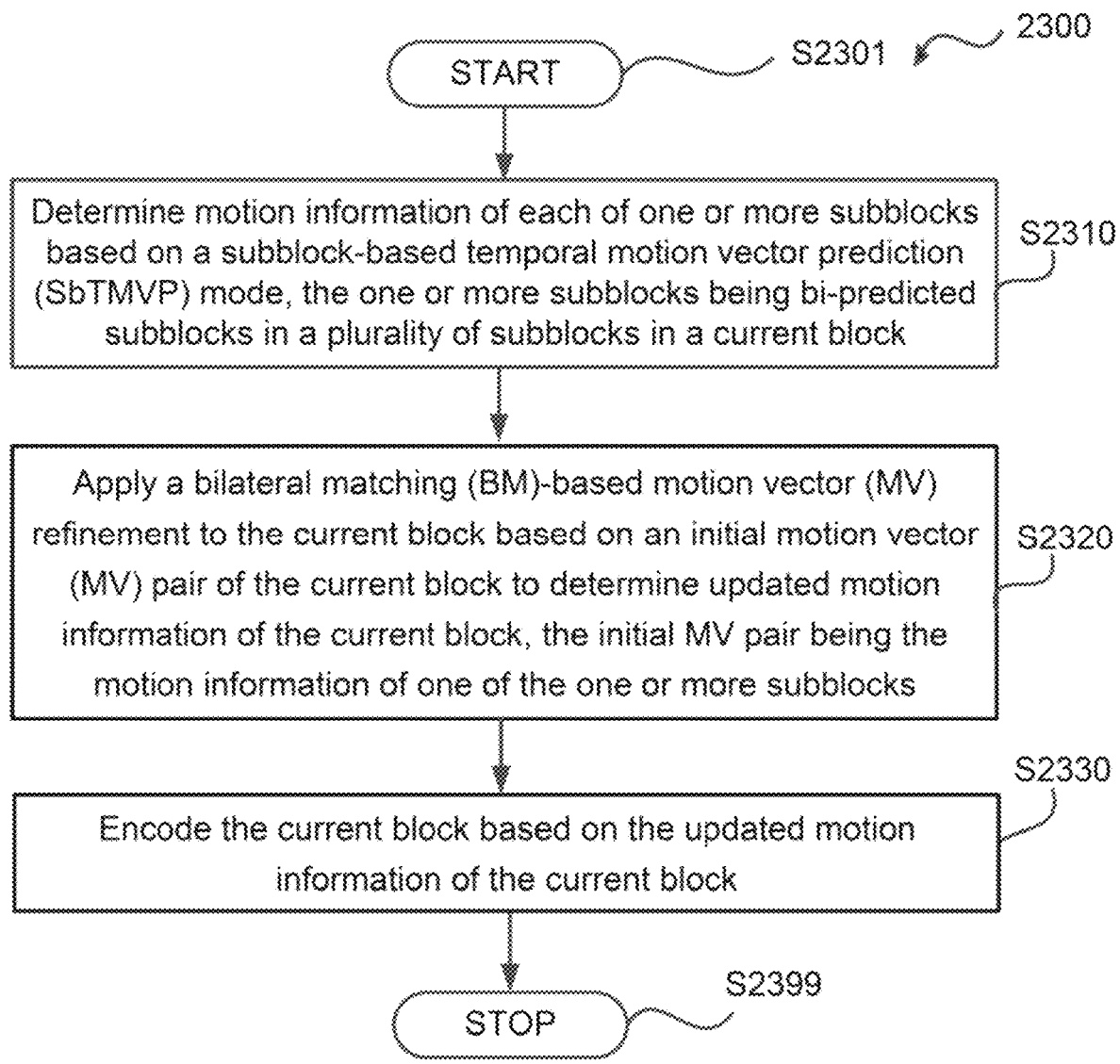
FIG. 23 shows a flow chart outlining an encoding process according to some embodiment of the disclosure.

FIG. 23 shows a flow chart outlining an encoding process (2300) according to an embodiment of the disclosure. The process (2300) can be used in a video/image encoder. The process (2300) can be executed by an apparatus for video/image coding that can include processing circuitry. In various embodiments, the process (2300) is executed by the processing circuitry, such as the processing circuitry in the terminal devices (310), (320), (330) and (340), processing circuitry that performs functions of a video encoder (e.g., (403), (603), (703)), or the like. In some embodiments, the process (2300) is implemented in software instructions, thus when the processing circuitry executes the software instructions, the processing circuitry performs the process (2300). The process starts at (S2301), and proceeds to (S2310).

At (S2310), motion information of each of one or more subblocks can be determined based on a subblock-based temporal motion vector prediction (SbTMVP) mode. The one or more subblocks can be bi-predicted subblocks in a plurality of subblocks in a current block.

At (S2320), a bilateral matching (BM)-based motion vector (MV) refinement can be applied to the current block based on an initial motion vector (MV) pair of the current block to determine updated motion information (or refined motion information) of the current block. The initial MV pair can be the motion information of one of the one or more subblocks.

At (S2330), the current block can be encoded based on the updated motion information of the current block.

The process (2300) then proceeds to (S2399), and terminates.

The process (2300) can be suitably adapted to various scenarios and steps in the process (2300) can be adjusted accordingly. One or more of the steps in the process (2300) can be adapted, omitted, repeated, and/or combined. Any suitable order can be used to implement the process (2300). Additional step(s) can be added.

In an embodiment, the one or more subblocks include multiple bi-predicted subblocks. In an example, the initial MV pair of the current block can be determined by (i) applying the BM-based MV refinement to the current block based on the motion information of each of the multiple bi-predicted subblocks to determine a bilateral matching cost associated with the respective bi-predicted subblock and (ii) determining the initial MV pair of the current block as the motion information of the subblock with the smallest bilateral matching cost in the bilateral matching costs of the respective multiple bi-predicted subblocks.

In an example, syntax information, such as an index, is encoded and included in a bitstream to indicate the subblock with the smallest bilateral matching cost.

In an example, prediction information indicating that the BM-based MV refinement is applied to the current block based on the initial MV pair that is the motion information of the one of the one or more subblocks is encoded and included in the bitstream.

Figure 24:
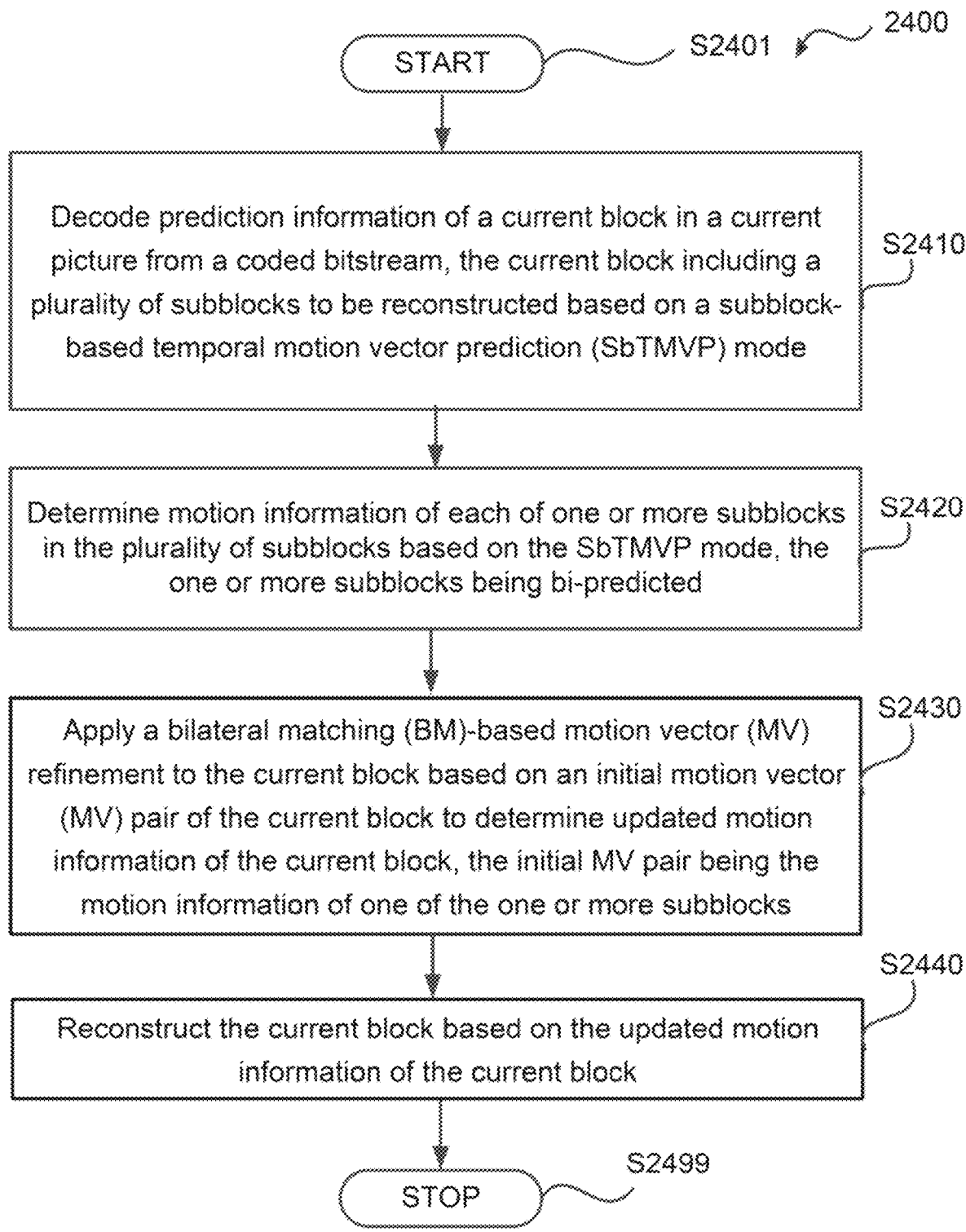
FIG. 24 shows a flow chart outlining a decoding process according to some embodiment of the disclosure.

FIG. 24 shows a flow chart outlining a decoding process (2400) according to an embodiment of the disclosure. The process (2400) can be used in a video/image decoder. The process (2400) can be executed by an apparatus for video/image coding that can include receiving circuitry and processing circuitry. In various embodiments, the process (2400) is executed by the processing circuitry, such as the processing circuitry in the terminal devices (310), (320), (330) and (340), the processing circuitry that performs functions of the video encoder (403), the processing circuitry that performs functions of the video decoder (410), the processing circuitry that performs functions of the video decoder (510), the processing circuitry that performs functions of the video encoder (603), and the like. In some embodiments, the process (2400) is implemented in software instructions, thus when the processing circuitry executes the software instructions, the processing circuitry performs the process (2400). The process starts at (S2401), and proceeds to (S2410).

At (S2410), prediction information of a current block in a current picture can be decoded from a coded bitstream (e.g., a coded video bitstream). The current block includes a plurality of subblocks to be reconstructed based on a subblock-based temporal motion vector prediction (SbTMVP) mode.

At (S2420), motion information of each of one or more subblocks in the plurality of subblocks can be determined based on the SbTMVP mode. The one or more subblocks can be bi-predicted, for example, with MV pairs.

At (S2430), a bilateral matching (BM)-based motion vector (MV) refinement can be applied to the current block based on an initial MV pair of the current block to determine updated motion information (or refined motion information) of the current block. The initial MV pair can be the motion information of one of the one or more subblocks.

At (S2440), the current block can be reconstructed based on the updated motion information of the current block.

The process (2400) proceeds to (S2499), and terminates.

The process (2400) can be suitably adapted to various scenarios and steps in the process (2400) can be adjusted accordingly. One or more of the steps in the process (2400) can be adapted, omitted, repeated, and/or combined. Any suitable order can be used to implement the process (2400). Additional step(s) can be added.

In an embodiment, the one or more subblocks include multiple bi-predicted subblocks. In an example, the initial MV pair of the current block can be determined by (i) applying the BM-based MV refinement to the current block based on the motion information of each of the multiple bi-predicted subblocks to determine a bilateral matching cost associated with the respective bi-predicted subblock and (ii) determining the initial MV pair of the current block as the motion information of the subblock with the smallest bilateral matching cost in the bilateral matching costs of the respective multiple bi-predicted subblocks.

In an example, the initial MV pair of the current block is determined as the motion information of the one of the multiple bi-predicted subblocks based on syntax information in the coded bitstream.

In an example, the prediction information indicates that the BM-based MV refinement is applied to the current block based on the initial MV pair that is the motion information of the one of the one or more subblocks.

Embodiments in the disclosure may be used separately or combined in any order. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium.

The techniques described above, can be implemented as computer software using computer-readable instructions and physically stored in one or more computer-readable media. For example, FIG. 25 shows a computer system (2500) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 25:
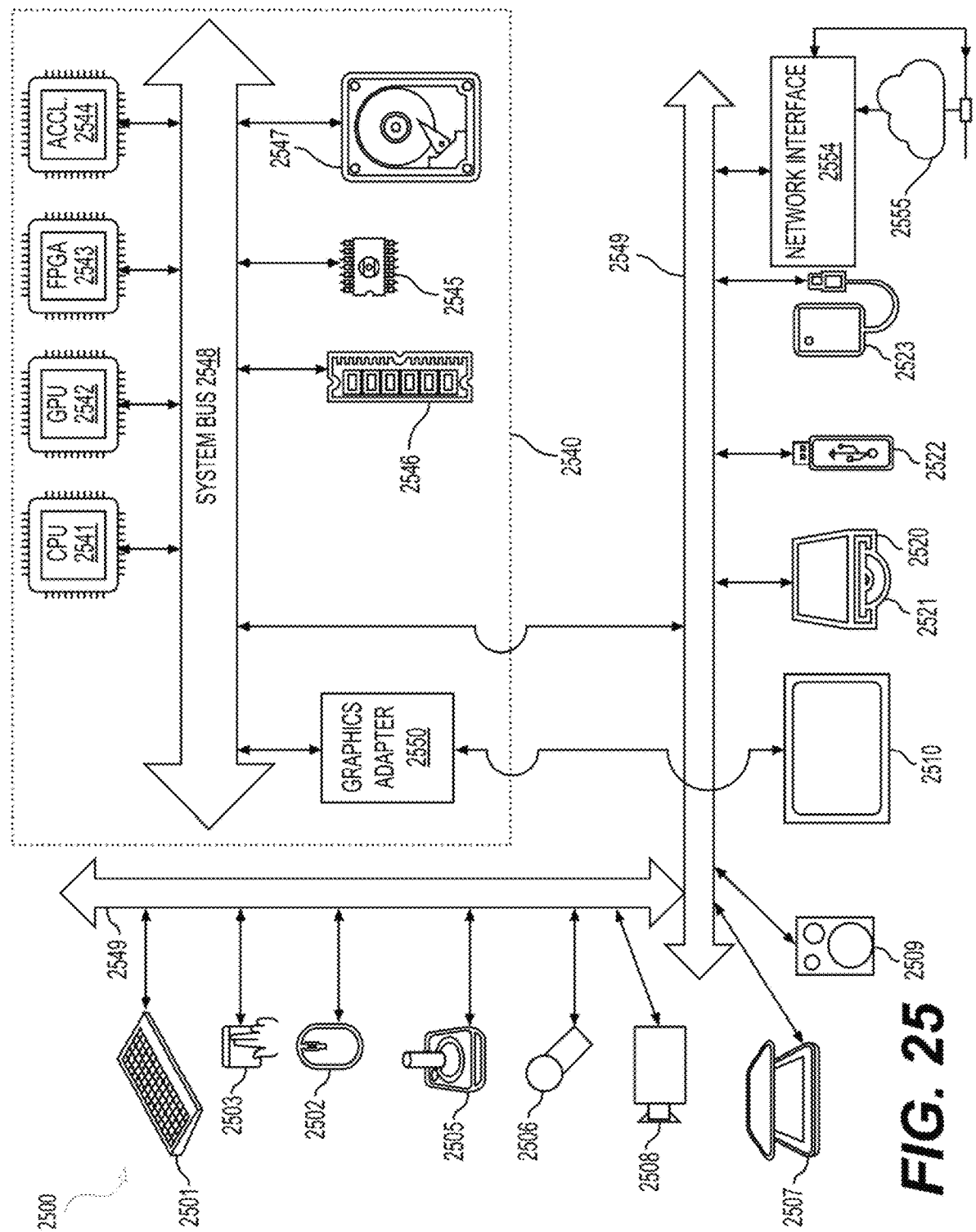
FIG. 25 is a schematic illustration of a computer system in accordance with an embodiment.

The components shown in FIG. 25 for computer system (2500) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (2500).

Computer system (2500) may include certain human interface input devices. Such a human interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard (2501), mouse (2502), trackpad (2503), touch screen (2510), data-glove (not shown), joystick (2505), microphone (2506), scanner (2507), camera (2508).

Computer system (2500) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (2510), data-glove (not shown), or joystick (2505), but there can also be tactile feedback devices that do not serve as input devices), audio output devices (such as: speakers (2509), headphones (not depicted)), visual output devices (such as touch-screens (2510) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (2500) can also include human accessible storage devices and their associated media such as optical media including CD/DVD ROM/RW (2520) with CD/DVD or the like media (2521), thumb-drive (2522), removable hard drive or solid state drive (2523), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (2500) can also include an interface (2554) to one or more communication networks (2555). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses (2549) (such as, for example USB ports of the computer system (2500)); others are commonly integrated into the core of the computer system (2500) by attachment to a system bus as described below (for example Ethernet interface into a PC computer system or cellular network interface into a smartphone computer system). Using any of these networks, computer system (2500) can communicate with other entities. Such communication can be uni-directional, receive only (for example, broadcast TV), uni-directional send-only (for example CANbus to certain CANbus devices), or bi-directional, for example to other computer systems using local or wide area digital networks. Certain protocols and protocol stacks can be used on each of those networks and network interfaces as described above.

Aforementioned human interface devices, human-accessible storage devices, and network interfaces can be attached to a core (2540) of the computer system (2500).

The core (2540) can include one or more Central Processing Units (CPU) (2541), Graphics Processing Units (GPU) (2542), specialized programmable processing units in the form of Field Programmable Gate Areas (FPGA) (2543), hardware accelerators (2544) for certain tasks, graphics adapters (2550), and so forth. These devices, along with Read-only memory (ROM) (2545), Random-access memory (2546), internal mass storage (2547) such as internal non-user accessible hard drives, SSDs, and the like, may be connected through a system bus (2548). In some computer systems, the system bus (2548) can be accessible in the form of one or more physical plugs to enable extensions by additional CPUs, GPU, and the like. The peripheral devices can be attached either directly to the core's system bus (2548), or through a peripheral bus (2549). In an example, the touch-screen (2510) can be connected to the graphics adapter (2550). Architectures for a peripheral bus include PCI, USB, and the like.

CPUs (2541), GPUs (2542), FPGAs (2543), and accelerators (2544) can execute certain instructions that, in combination, can make up the aforementioned computer code. That computer code can be stored in ROM (2545) or RAM (2546). Transitional data can also be stored in RAM (2546), whereas permanent data can be stored for example, in the internal mass storage (2547). Fast storage and retrieve to any of the memory devices can be enabled through the use of cache memory, that can be closely associated with one or more CPU (2541), GPU (2542), mass storage (2547), ROM (2545), RAM (2546), and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system (2500) having architecture, and specifically the core (2540) can provide functionality as a result of processor(s) (including CPUs, GPUs, FPGA, accelerators, and the like) executing software embodied in one or more tangible, computer-readable media. Such computer-readable media can be media associated with user-accessible mass storage as introduced above, as well as certain storage of the core (2540) that are of non-transitory nature, such as core-internal mass storage (2547) or ROM (2545). The software implementing various embodiments of the present disclosure can be stored in such devices and executed by core (2540). A computer-readable medium can include one or more memory devices or chips, according to particular needs. The software can cause the core (2540) and specifically the processors therein (including CPU, GPU, FPGA, and the like) to execute particular processes or particular parts of particular processes described herein, including defining data structures stored in RAM (2546) and modifying such data structures according to the processes defined by the software. In addition or as an alternative, the computer system can provide functionality as a result of logic hardwired or otherwise embodied in a circuit (for example: accelerator (2544)), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

Appendix A: Acronyms

JEM: joint exploration model
VVC: versatile video coding
BMS: benchmark set
MV: Motion Vector
HEVC: High Efficiency Video Coding
SEI: Supplementary Enhancement Information
VUI: Video Usability Information
GOPs: Groups of Pictures
TUs: Transform Units,
PUs: Prediction Units
CTUs: Coding Tree Units
CTBs: Coding Tree Blocks
PBs: Prediction Blocks
HRD: Hypothetical Reference Decoder
SNR: Signal Noise Ratio
CPUs: Central Processing Units
GPUs: Graphics Processing Units
CRT: Cathode Ray Tube
LCD: Liquid-Crystal Display
OLED: Organic Light-Emitting Diode
CD: Compact Disc
DVD: Digital Video Disc
ROM: Read-Only Memory
RAM: Random Access Memory
ASIC: Application-Specific Integrated Circuit
PLD: Programmable Logic Device
LAN: Local Area Network
GSM: Global System for Mobile communications
LTE: Long-Term Evolution
CANBus: Controller Area Network Bus
USB: Universal Serial Bus
PCI: Peripheral Component Interconnect
FPGA: Field Programmable Gate Areas
SSD: solid-state drive
IC: Integrated Circuit
CU: Coding Unit While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of video decoding in a decoder, comprising:
   receiving a coded bitstream comprising a current block in a current picture, wherein the current block includes a plurality of subblocks;
   obtaining prediction information indicating the current block is coded in a subblock-based temporal motion vector prediction (SbTMVP) mode, wherein a subblock in the plurality of subblocks of the current block is bi-predicted;
   determining motion information of the subblock based on the SbTMVP mode;
   applying at least one of (i) a bilateral matching (BM)-based motion vector (MV) refinement or (ii) a sample-based bi-directional optical flow (BDOF) mode to the subblock to refine the motion information of the subblock, wherein the BM-based MV refinement includes a decoder-side motion vector refinement (DMVR) or a multi-pass decoder-side motion vector refinement (MP-DMVR)), and the BDOF mode is applied after applying the BM-based MV refinement when the BM-based MV refinement and the BDOF mode are applied; and
   reconstructing the current block based on the refined motion information of the subblock in the plurality of subblocks.

2. The method of claim 1, wherein
   the applying includes applying the BM-based MV refinement to determine the refined motion information of the subblock; and
   the reconstructing includes reconstructing the subblock based on the refined motion information.

3. The method of claim 2, wherein
   the motion information includes an initial MV pair of the subblock;
   the BM-based MV refinement includes the DMVR;
   the applying includes applying the DMVR to an area in the subblock to determine a refined MV pair of the area based on the initial MV pair, the area being less than or equal to an area of the subblock; and the reconstructing includes reconstructing the area in the subblock based on the refined MV pair.

4. The method of claim 2, wherein
the motion information includes an initial MV pair of the subblock;
the BM-based MV refinement includes the MP-DMVR; and
when a subblock size of the subblock is larger than a first threshold $M_1 \times N_1$,
applying at least one DMVR to the subblock to determine a first refined MV pair of the subblock; and
applying the BDOF mode to an area in the subblock to determine a second refined MV pair of the area based on the first refined MV pair, the area being smaller than or equal to an area of the subblock.

5. The method of claim 1, wherein
the motion information includes an initial MV pair of the subblock;
the applying includes applying the BDOF mode to each sample in the subblock to determine a refined MV pair of the respective sample; and
the reconstructing includes reconstructing each sample in the subblock based on the refined MV pair of the respective sample.

6. The method of claim 2, wherein the refined motion information of the subblock includes one or more first refined MV pairs of respective one or more areas in the subblock;
a refined MV pair of each sample in an area in the one or more areas is determined based on the BDOF mode and the first refined MV pair corresponding to the area; and
the reconstructing includes reconstructing each sample in the area based on the refined MV pair of the respective sample.

7. The method of claim 1, wherein the prediction information indicates that the at least one of (i) the BM-based MV refinement or (ii) the BDOF mode is applied to the subblock.

8. The method of claim 1, wherein the prediction information includes a flag that indicates the at least one of (i) the BM-based MV refinement or (ii) the BDOF mode is applied to the subblock.

9. The method of claim 1, wherein
the BM-based MV refinement or the BDOF mode is applied based on a first reference picture and a second reference picture of the current picture;
the first reference picture is prior to the current picture in a display order, and the second reference picture is after the current picture in the display order; and
distances from the first reference picture and the second reference picture to the current picture are identical.

10. A method for video encoding in a video encoder, the method comprising:
determining a current block in a current picture is to be coded in a subblock-based temporal motion vector prediction (SbTMVP) mode, wherein a subblock in a plurality of subblocks of the current block is bi-predicted;
determining motion information of the subblock based on the SbTMVP mode;
applying at least one of (i) a bilateral matching (BM)-based motion vector (MV) refinement or (ii) a sample-based bi-directional optical flow (BDOF) mode to the subblock to refine the motion information of the subblock, wherein the BM-based MV refinement includes a decoder-side motion vector refinement (DMVR) or a multi-pass decoder-side motion vector refinement (MP-DMVR), and the BDOF mode is applied after applying the BM-based MV refinement when the BM-based MV refinement and the BDOF mode are applied; and
encoding the current block in a bitstream based on the refined motion information of the subblock in the plurality of subblocks.

11. The method of claim 10, wherein
the applying includes applying the BM-based MV refinement to determine the refined motion information of the subblock; and
the encoding includes encoding the subblock based on the refined motion information.

12. The method of claim 11, wherein
the refined motion information of the subblock includes one or more first refined MV pairs of respective one or more areas in the subblock;
a refined MV pair of each sample in an area in the one or more areas is determined based on the BDOF mode and the first refined MV pair corresponding to the area; and
the encoding includes encoding each sample in the area based on the refined MV pair of the respective sample.

13. The method of claim 11, wherein
the motion information includes an initial MV pair of the subblock;
the BM-based MV refinement includes the DMVR;
the applying includes applying the DMVR to an area in the subblock to determine a refined MV pair of the area based on the initial MV pair, the area being less than or equal to an area of the subblock; and
the encoding includes encoding the area in the subblock based on the refined MV pair.

14. The method of claim 11, wherein
the motion information includes an initial MV pair of the subblock;
the BM-based MV refinement includes the MP-DMVR; and
when a subblock size of the subblock is larger than a first threshold $M_1 \times N_1$,
applying at least one DMVR to the subblock to determine a first refined MV pair of the subblock; and
applying the BDOF mode to an area in the subblock to determine a second refined MV pair of the area based on the first refined MV pair, the area being smaller than or equal to an area of the subblock.

15. A method of processing video data, the method comprising:
processing a bitstream of the video data, the bitstream comprising a current block in a current picture, wherein the current block includes a plurality of subblocks and the bitstream causes a decoder to
obtain prediction information indicating a current block is coded in a subblock-based temporal motion vector prediction (SbTMVP) mode, wherein a subblock in the plurality of subblocks of the current block is bi-predicted;
determine motion information of the subblock based on the SbTMVP mode;
apply at least one of (i) a bilateral matching (BM)-based motion vector (MV) refinement or (ii) a sample-based bi-directional optical flow (BDOF) mode to the subblock to refine the motion information of the subblock, wherein the BM-based MV refinement includes a decoder-side motion vector refinement (DMVR) or a multi-pass decoder-side motion vector refinement (MP-DMVR)), and the BDOF mode is applied after applying the BM-based MV refinement when the BM-based MV refinement and the BDOF mode are applied; and reconstruct the current block based on the refined motion information of the subblock in the plurality of subblocks.

16. The method of claim 15, wherein the bitstream causes the decoder to:

apply the BM-based MV refinement to determine the refined motion information of the subblock; and reconstruct the subblock based on the refined motion information.

17. The method of claim 15, wherein the motion information includes an initial MV pair of the subblock;

the BM-based MV refinement includes the DMVR;

the bitstream causes the decoder to:

apply the DMVR to an area in the subblock to determine a refined MV pair of the area based on the initial MV pair, the area being less than or equal to an area of the subblock; and reconstruct the area in the subblock based on the refined MV pair.

18. The method of claim 15, wherein the motion information includes an initial MV pair of the subblock;

the BM-based MV refinement includes the MP-DMVR; and when a subblock size of the subblock is larger than a first threshold $M_1 \times N_1$, the bitstream causes the decoder to:

apply at least one DMVR to the subblock to determine a first refined MV pair of the subblock; and apply the BDOF mode to an area in the subblock to determine a second refined MV pair of the area based on the first refined MV pair, the area being smaller than or equal to an area of the subblock.

19. The method of claim 15, wherein the motion information includes an initial MV pair of the subblock; and the bitstream causes the decoder to:

apply the BDOF mode to each sample in the subblock to determine a refined MV pair of the respective sample, and reconstruct each sample in the subblock based on the refined MV pair of the respective sample.

20. The method of claim 15, wherein the refined motion information of the subblock includes one or more first refined MV pairs of respective one or more areas in the subblock;

a refined MV pair of each sample in an area in the one or more areas is determined based on the BDOF mode and the first refined MV pair corresponding to the area; and the bitstream causes the decoder to reconstruct each sample in the area based on the refined MV pair of the respective sample.

* * * * *